US012695309B2

(12) United States Patent
Avery et al.

(10) Patent No.: US 12,695,309 B2
(45) Date of Patent: Jul. 28, 2026

(54) MICROGRID

(71) Applicant: G & W ELECTRIC COMPANY, Bolingbrook, IL (US)

(72) Inventors: Patrick M. Avery, Orland Park, IL (US); John T. Pederson, Jr., Batavia, IL (US); Katherine M. Cummings, Steger, IL (US); Erich M. Keller, Plainfield, IL (US); Amin Zamani, Mississauga (CA); Rahim Jafari, St. Catherines (CA)

(73) Assignee: G & W ELECTRIC COMPANY, Bolingbrook, IL (US)

( * ) Notice: Subject to any disclaimer, the term of this patent is extended or adjusted under 35 U.S.C. 154(b) by 607 days.

(21) Appl. No.: 17/744,438

(22) Filed: May 13, 2022

(65) Prior Publication Data

US 2023/0369864 A1      Nov. 16, 2023

(51) Int. Cl.
H02J 3/388 (2026.01)
H02J 3/32 (2006.01)
H02J 3/38 (2006.01)

(52) U.S. Cl.
CPC ............... H02J 3/381 (2013.01); H02J 3/32 (2013.01); H02J 3/388 (2020.01); H02J 2300/24 (2020.01)

(58) Field of Classification Search
CPC .... H02J 3/388; H02J 3/381; H02J 3/32; H02J 2300/24
See application file for complete search history.

(56) References Cited

U.S. PATENT DOCUMENTS

| | | | |
|---|---|---|---|
| 10,263,446 B2 * | 4/2019 | Park | H02J 7/0068 |
| 10,593,497 B2 | 3/2020 | Pabst et al. | |
| 10,886,737 B2 | 1/2021 | Zietlow et al. | |
| 11,881,742 B2 * | 1/2024 | Carnemark | H02J 9/062 |
| 2014/0265573 A1 * | 9/2014 | Kreutzman | F24H 1/0027 |
| | | | 307/31 |

(Continued)

FOREIGN PATENT DOCUMENTS

| | | | |
|---|---|---|---|
| WO | WO 2018098575 | * | 6/2018 |
| WO | 2019152981 A1 | | 2/2019 |

OTHER PUBLICATIONS

Dileep et al, "A survey on smart grid technologies and applications," Renewable Energy, vol. 146, 2020, pp. 2589-2625.

(Continued)

*Primary Examiner* — Scott T Baderman
*Assistant Examiner* — Mario M Velez-Lopez
(74) *Attorney, Agent, or Firm* — Michael Best & Friedrich LLP

(57) ABSTRACT

Microgrids and methods for controlling a microgrid. In one example, a microgrid includes a microgrid controller, a primary junction, a high-voltage supply line, a high-voltage output line, one or more switchgear connecting the primary junction to at least one other component of the microgrid, a plurality of photovoltaic (PV) panels, a breaker connected to the plurality of PV panel inverters, a first load connected to the breaker, and one or more battery banks. In some instances, the microgrid includes a ground bank transformer configured to provide a ground current path. Each of the plurality of PV panels is connected to one of a plurality of PV panel inverters. Each of the battery banks may include a plurality of battery cells.

19 Claims, 37 Drawing Sheets

(56)              References Cited

U.S. PATENT DOCUMENTS

| | | | | |
|---|---|---|---|---|
| 2015/0364919 A1* | 12/2015 | Schumer | ................... | H02J 3/28 |
| | | | | 700/291 |
| 2017/0222409 A1 | 8/2017 | Oehring et al. | | |
| 2018/0175430 A1* | 6/2018 | Modderno | ........ | H01M 8/04686 |
| 2018/0316184 A1 | 11/2018 | Hong et al. | | |
| 2019/0245348 A1* | 8/2019 | Hinderliter | ............... | H02J 3/46 |
| 2019/0258212 A1* | 8/2019 | Morton | ..................... | H02J 3/46 |
| 2020/0300073 A1* | 9/2020 | Hinderliter | ......... | E21B 43/2607 |
| 2020/0387880 A1* | 12/2020 | Haynold | ................ | G06Q 20/16 |
| 2021/0004035 A1* | 1/2021 | Yang | ......................... | H02J 3/14 |
| 2021/0376613 A1* | 12/2021 | Cummings | ............. | H02J 7/007 |
| 2022/0029391 A1* | 1/2022 | Ough | ........................ | H02B 1/20 |
| 2022/0140614 A1* | 5/2022 | Ough | ........................ | H02J 3/46 |
| | | | | 307/84 |
| 2022/0196711 A1* | 6/2022 | Rahmani | ................. | H02J 3/001 |
| 2022/0255323 A1* | 8/2022 | Mendizabal Abasolo | ................... | |
| | | | | G06Q 10/06315 |
| 2023/0369864 A1* | 11/2023 | Avery | ............... | H02J 13/00036 |
| 2023/0370017 A1* | 11/2023 | Ginsberg-Klemmt | ....................... | |
| | | | | H02S 40/38 |
| 2024/0106208 A1* | 3/2024 | Di Bartolomeo | ........ | H02H 7/26 |

OTHER PUBLICATIONS

European Search Report for Application No. 23171113.6, dated Oct. 11, 2023 (9 pages).
Jiang et al., "A Microgrid Test bed in Singapore: An electrification project for affordable access to electricity with optimal asset management," IEEE Electrification Magazine, vol. 5 (2), 2017, pp. 74-82.
Vukojevic et al, "Microgrid Protection and Contrl Schemes for Seamless Transition to Island and Grid Synchronization," IEEE Transactions on Smart Grid, vol. 11 (4), 2020, pp. 2845-2855.
Canadian Intellectual Property Office. Office Action for Application No. 3,198,329, dated Oct. 1, 2024 (4 pages).
Canadian Intellectual Property Office. Office Action for Application No. 3,198,329, dated Aug. 1, 2025 (8 pages).

* cited by examiner

*1300*

*1305*

XF-ESS-1
2200KVA/
2200KVA
12470 V /  385 V
Z% = 5.75 %
LF 1883.61kW

*1310*

FDR ESS-1
(8) Buswayc, w/
225-5000A #3000
L 10 ft (24000A)
BUS CONNECTION

MCB ESS-1
F 4000 A
T 4000 A .75 (3000A)
100% Rated
Integral w/  ESS-1

*1315* NC

VD 387V (-0.5%)
Isc 3P 54198 A
BUS 1600 A/  AIC 65
kA

*1200*

ESS-1

Voltage: 385 V
Rated Size: 1900kW /  PF = 1.000
(2) FB 500
4.0 MWh Battery

Figures 14, 15:
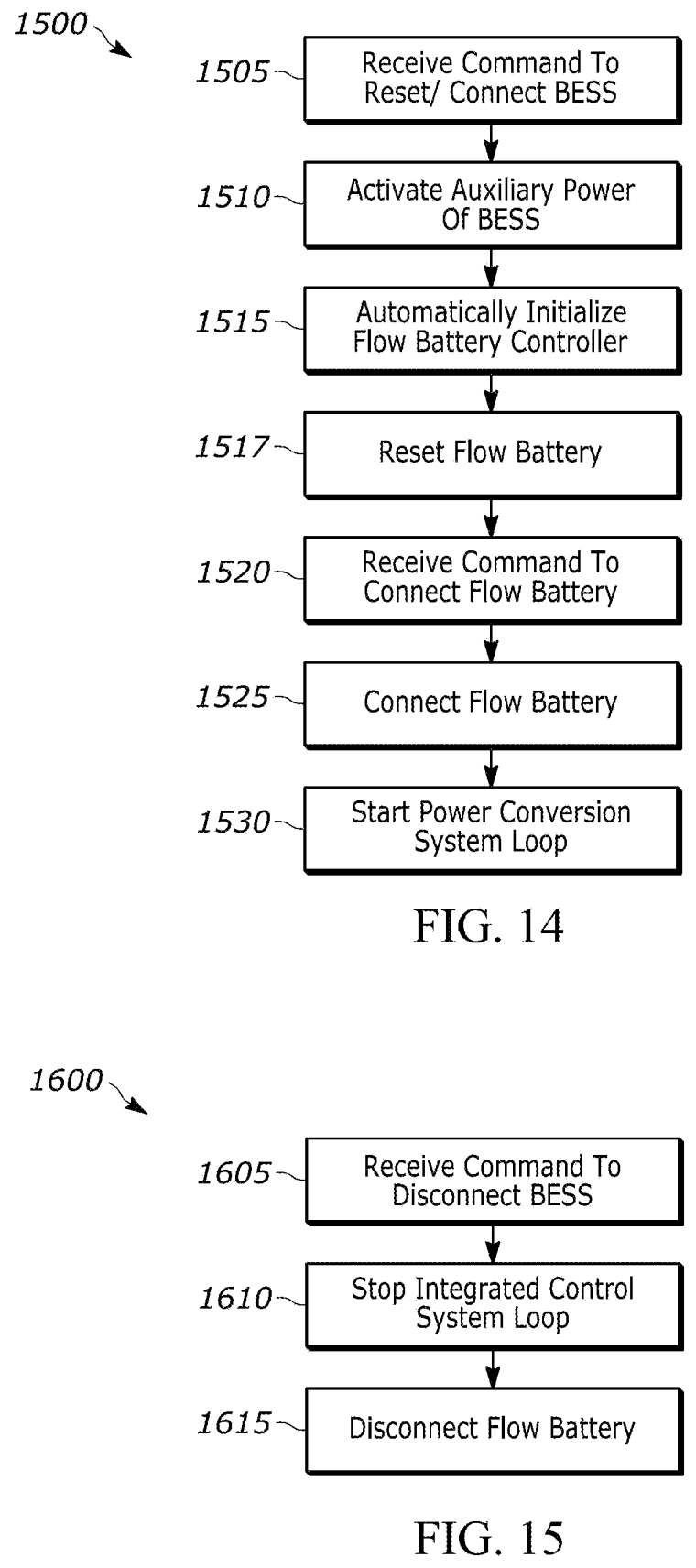

1500

1505 — Receive Command To Reset/ Connect BESS

1510 — Activate Auxiliary Power Of BESS

1515 — Automatically Initialize Flow Battery Controller

1517 — Reset Flow Battery

1520 — Receive Command To Connect Flow Battery

1525 — Connect Flow Battery

1530 — Start Power Conversion System Loop

1605 — Receive Command To Disconnect BESS

1610 — Stop Integrated Control System Loop

1615 — Disconnect Flow Battery

Receive A Supply Of Power From Utility Or Microgrid Source ~*2705*

*2710* Fault Detected?

No

Yes

*2715*~ Supply Power To Critical Load Via Flywheel

*2720*~ Isolate Faulted Line

*2725* Tie Adjacent To Fault?

Yes

No

Close Tie ~*2730*

*2735*~ Resume Reception Of Power From Utility Or Microgrid Source

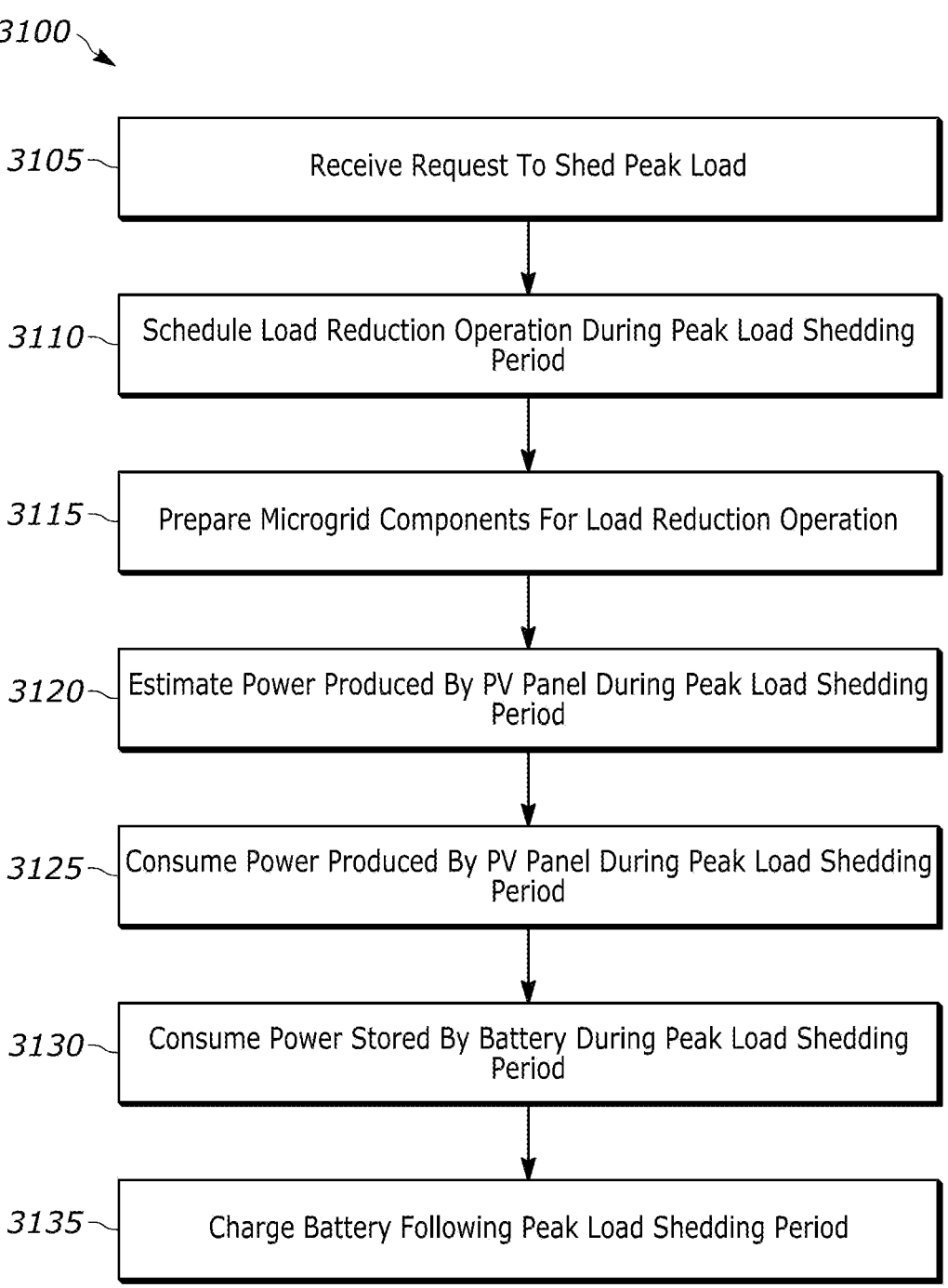

3100

3105 — Receive Request To Shed Peak Load

3110 — Schedule Load Reduction Operation During Peak Load Shedding Period

3115 — Prepare Microgrid Components For Load Reduction Operation

3120 — Estimate Power Produced By PV Panel During Peak Load Shedding Period

3125 — Consume Power Produced By PV Panel During Peak Load Shedding Period

3130 — Consume Power Stored By Battery During Peak Load Shedding Period

3135 — Charge Battery Following Peak Load Shedding Period

FIG. 29

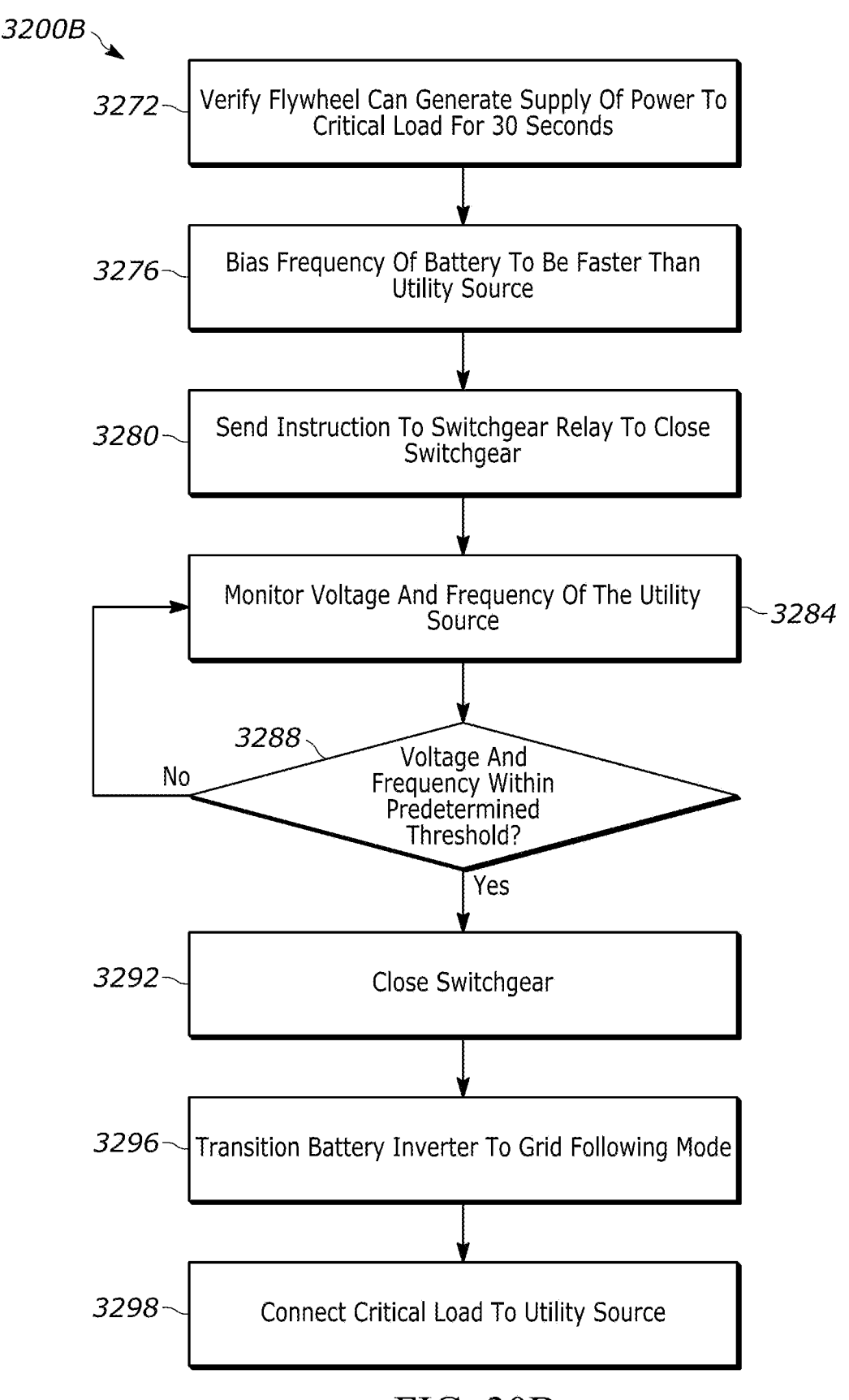

*3200B*

3272 — Verify Flywheel Can Generate Supply Of Power To Critical Load For 30 Seconds 3276 — Bias Frequency Of Battery To Be Faster Than Utility Source 3280 — Send Instruction To Switchgear Relay To Close Switchgear Monitor Voltage And Frequency Of The Utility Source   ~3284

*3288* — Voltage And Frequency Within Predetermined Threshold?

No

Yes

3292 — Close Switchgear

3296 — Transition Battery Inverter To Grid Following Mode

3298 — Connect Critical Load To Utility Source

FIG. 30B

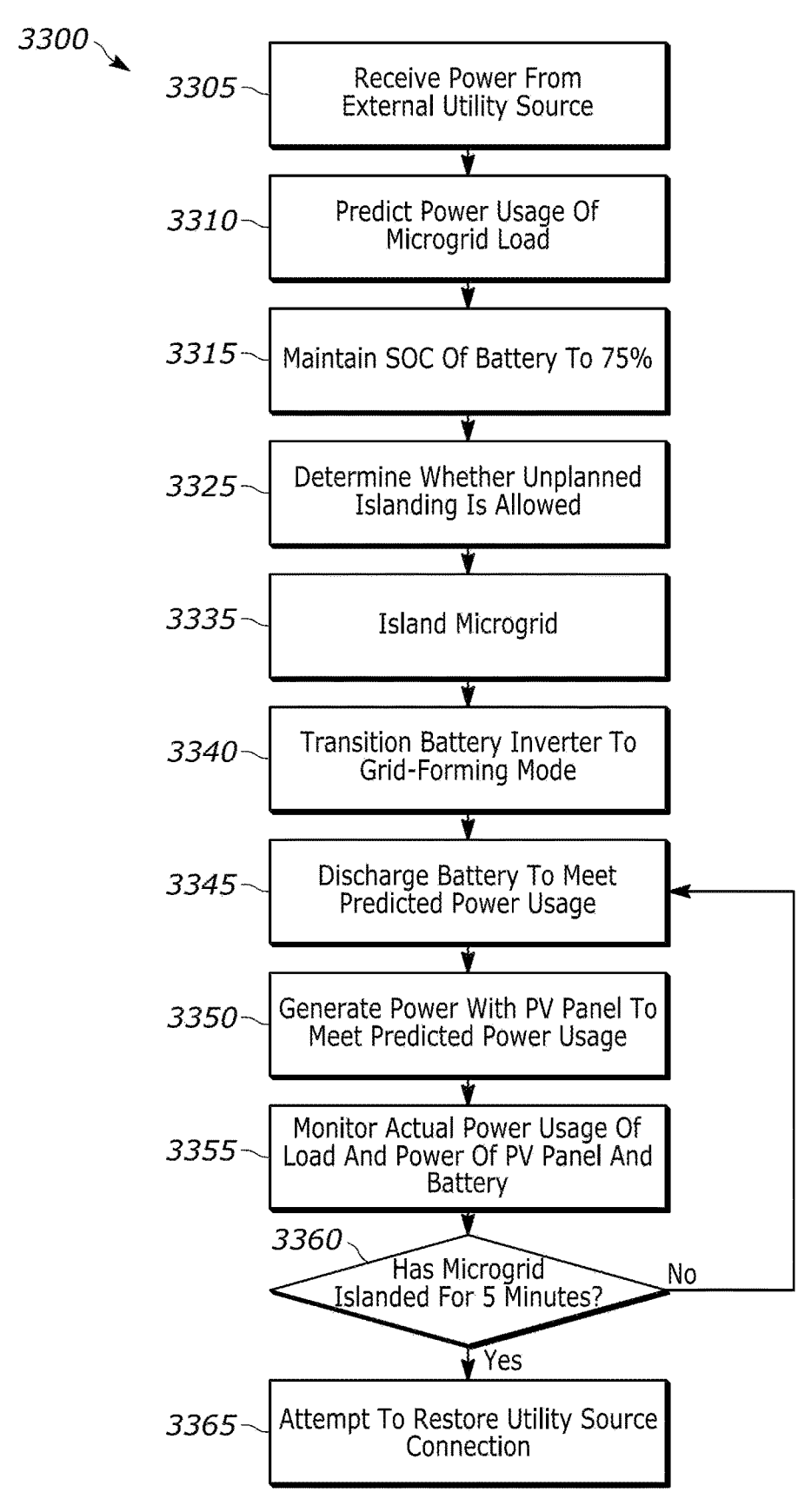

3300

3305 — Receive Power From External Utility Source

3310 — Predict Power Usage Of Microgrid Load

3315 — Maintain SOC Of Battery To 75%

3325 — Determine Whether Unplanned Islanding Is Allowed

3335 — Island Microgrid

3340 — Transition Battery Inverter To Grid-Forming Mode

3345 — Discharge Battery To Meet Predicted Power Usage

3350 — Generate Power With PV Panel To Meet Predicted Power Usage

3355 — Monitor Actual Power Usage Of Load And Power Of PV Panel And Battery

3360 — Has Microgrid Islanded For 5 Minutes?   No

Yes

3365 — Attempt To Restore Utility Source Connection

3505 — Verify Battery Inverter Is Disconnected From Microgrid

3510 — Verify PV Panel Inverter Is Disconnected From Microgrid

3515 — Verify Utility Source Is Providing A Healthy Voltage

3520 — Verify Microgrid Is Providing No Voltage

3525 — Close Switchgear

3540 — Verify Microgrid Load Is Fed

3545 — Verify Microgrid Is Online

*3700*

3705 — Determine Microgrid Resilience, Frequency Regulation Participation, And Peak Load Contribution Reduction 3710 — Control Battery To Charge To At Least 50% Capacity At All Times 3715 — Control Battery To Charge To 75% Before Nighttime Period 3720 — Control Battery To Charge To 100% Before Peak Load Reduction Operation

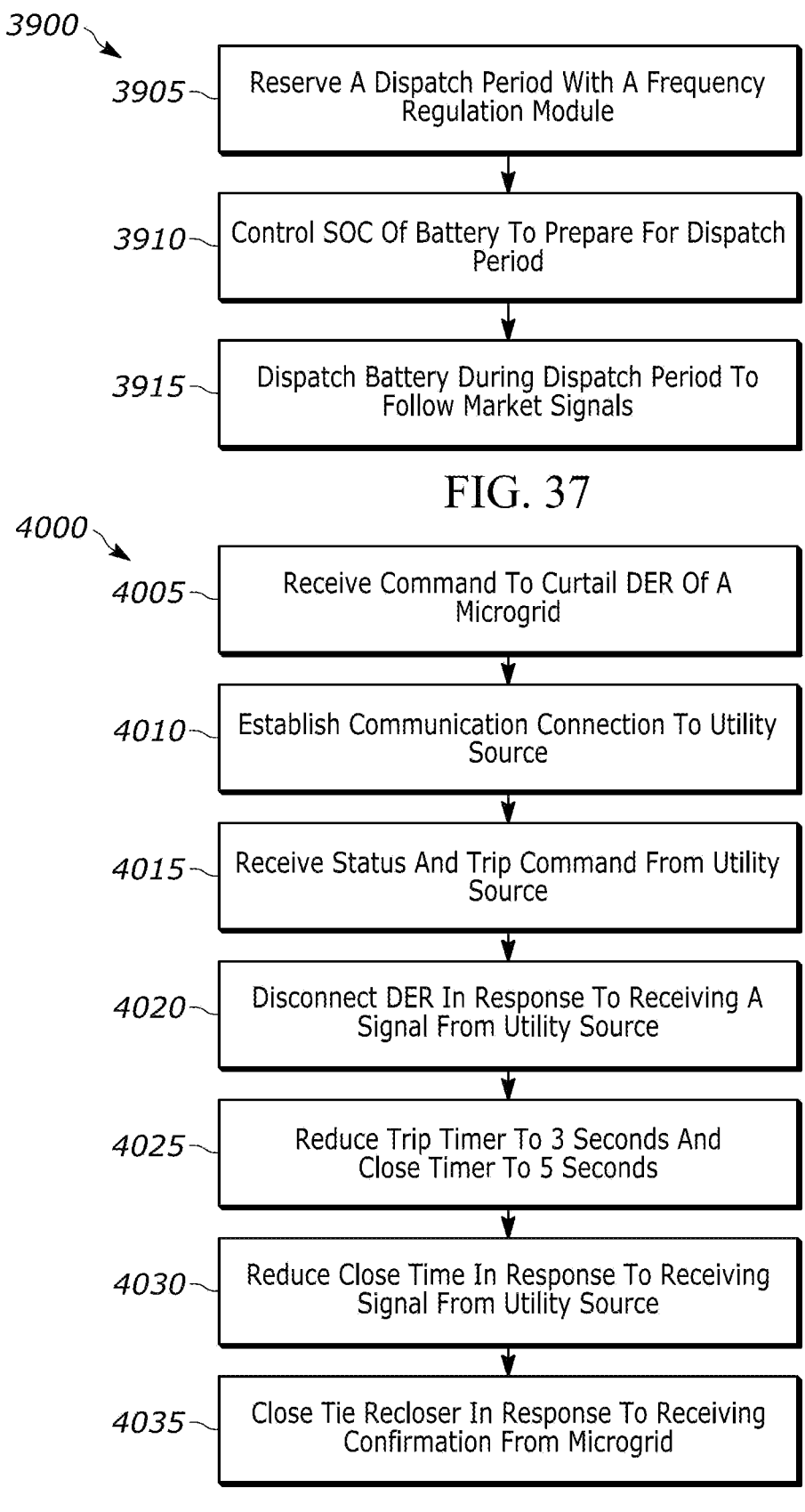

*3900*

3905 — Reserve A Dispatch Period With A Frequency Regulation Module

3910 — Control SOC Of Battery To Prepare For Dispatch Period

3915 — Dispatch Battery During Dispatch Period To Follow Market Signals

4005 — Receive Command To Curtail DER Of A Microgrid

4010 — Establish Communication Connection To Utility Source

4015 — Receive Status And Trip Command From Utility Source

4020 — Disconnect DER In Response To Receiving A Signal From Utility Source

4025 — Reduce Trip Timer To 3 Seconds And Close Timer To 5 Seconds

4030 — Reduce Close Time In Response To Receiving Signal From Utility Source

4035 — Close Tie Recloser In Response To Receiving Confirmation From Microgrid

FIG. 38

MICROGRID

FIELD OF DISCLOSURE

Embodiments described herein relate to a microgrid used to generate and store electric power locally and configured to connect to an electric power utility source of electricity.

SUMMARY

Since the late 19$^{th}$ century electric power distribution has involved generation of electricity at a central location and distribution to customers and homes and commercial facilities via a transmission system. In many instances, electric power utility companies own or manage power generation plants and distribution systems. More recently, there is a desire for local power generation where a facility, for example, a manufacturing facility, generates all or a portion of the electric power it needs locally. Local power distribution may have benefits including for example, the ability to generate power from renewable energy sources, increased reliability (the ability to continue to have power when a utility outage occurs), and lower cost.

Embodiments, aspects, and implementations described herein provide, among other things a microgrid. In some instances, a microgrid includes components for generating and storing power, for example, photovoltaic panels, flywheels, generators, batteries, and the like. Additionally, microgrids may include a control system, such as a microgrid controller, for controlling various operations of the microgrid. The microgrid controller may store instructions to perform these operations and identify and execute these instructions in response to changes in the microgrid, or in response to the availability of electrical power from a utility source connected to the microgrid. Embodiments described herein may also provide systems and methods for installing and controlling a microgrid.

One example described herein provides microgrid having a microgrid controller, a primary junction, a high-voltage supply line, a high-voltage output line, one or more switchgear connecting the primary junction to at least one other component of the microgrid, and a plurality of photovoltaic (PV) panels. Each of the plurality of PV panels is connected to one of a plurality of PV panel inverters. A breaker is connected to a plurality of PV panel inverters, and a first load is connected to the breaker. The microgrid also includes one or more battery banks, and a ground bank transformer configured to provide a ground current path. Each of the battery banks may include a plurality of battery cells.

Additional examples described herein provide a control system for a microgrid comprising a microgrid controller, a prediction module, a frequency regulation module, a monitoring module, one or more inverters for controlling one or more photovoltaic (PV) panels of the microgrid, a generator auto transfer control, a generator controller, one or more power conversion systems (PCSs), and one or more switchgear configured to switchably connect one or more components of the microgrid based on signals received from the microgrid controller.

Other examples described herein provide a method of controlling a microgrid. One example method includes generating, during a daytime period, power with at least one photovoltaic (PV) panel without curtailment; charging, during the daytime period, at least one battery to a predetermined state-of-charge based on an anticipated nighttime frequency regulation participation; disabling, during the daytime period, a reverse flow protection circuit at a primary junction of the microgrid; discharging, during a nighttime period, the battery based on an actual nighttime frequency regulation participation; and enabling, during the nighttime period, the reverse flow protection circuit at the primary junction of the microgrid. While discharging the battery during the nighttime period, the microgrid does not backflow to an external power grid.

Another example method of controlling a microgrid includes receiving, from a utility source external to the microgrid, a supply of power; detecting, with a microgrid controller, a fault current within a distribution loop of the microgrid; supplying, with a flywheel, an amount of uninterrupted power to a critical load on the distribution loop for a period of time; isolating the faulted line; in response to determining that a tie is not adjacent to the faulted line, closing the tie; and resuming reception of the supply of power from the utility source.

Yet another example method of controlling a microgrid includes receiving, from an external utility source, a supply of power; controlling a flywheel of the microgrid to supply an amount of uninterrupted power to a critical load of the microgrid for a period of time up to 60 seconds; disconnecting, via the microgrid controller, the microgrid from the external utility source; and controlling, via the microgrid controller, at least one PV panel of the microgrid, at least one battery of the microgrid, and at least one generator of the microgrid to provide power to one or more loads on the microgrid, wherein the one or more loads includes the critical load and at least one non-critical load.

Yet another example method of controlling a microgrid includes determining, via a prediction module of the microgrid, that a load of the microgrid will exceed an alert load within a predetermined future time period; receiving, from the device external to the microgrid, an alert including an indication of a peak time within the predetermined future time period, the peak time being a time in which the load of the microgrid will exceed the alert load; preparing, with a microgrid controller, one or more components of the microgrid for a load reduction operation during a load reduction period including a first shoulder time and a second shoulder time, wherein the one or more components includes at least one battery charged to a predetermined state-of-charge and at least one photovoltaic (PV) panel, and wherein the first shoulder time is earlier than the second shoulder time; reducing, via the microgrid controller at the first shoulder time, the load of the microgrid to an acceptable load use value by: consuming available power produced by the PV panel during the load reduction period; and consuming an amount of supplemental power stored by the battery; and ending, via the microgrid controller at the second shoulder time, the load reduction operation.

Still another example method of controlling a microgrid includes receiving, from an external utility provider, a request to reduce a peak load over a predetermined period of time; scheduling within the predetermined future time period, with a microgrid controller, a load reduction operation during a peak load shedding period; preparing, via the microgrid controller, one or more components of the microgrid for the load reduction operation, wherein the one or more components includes at least one battery charged to a predetermined state-of-charge; and reducing, via the microgrid controller during the peak load shedding period, the load of the microgrid to an acceptable load use value by consuming available power produced by the PV panel during the peak load shedding period and consuming an amount of supplemental power stored by the battery.

Further examples described herein provide a method of controlling a microgrid, where the method includes preparing, via the microgrid controller, for an unplanned outage by maintaining the state-of-charge of one or more batteries of the microgrid to a predetermined percentage; detecting, via a relay on a first switchgear of the microgrid, a loss of a supply of power from a utility source external to the microgrid for a first predetermined time; and islanding, via the relay, the microgrid. In response to detecting, via the microgrid controller, that the microgrid has successfully islanded transitioning an inverter of the one or more batteries to a grid-forming mode; discharging the one or more batteries to supply power to meet one or more loads on the microgrid; generating, with one or more photovoltaic (PV) panels of the microgrid, a supply of power to meet the one or more loads on the microgrid; and monitoring, via the microgrid controller, an actual power usage of the one or more loads and an amount of power generated by the one or more PV panels. In response to determining that the one or more PV panels and the one or more batteries can provide power for a second predetermined time, generating, via a generator of the microgrid, a supply of power to meet the predicted power usage of the one or more loads on the microgrid; and alerting, via the microgrid controller, an operator of the microgrid. In response to determining, via the relay on the first switchgear, that the supply of power from the utility source has resumed for a third predetermined time, reconnecting the microgrid to the utility source via a subprocess carried out by the microgrid controller that includes verifying that a flywheel of the microgrid is fully charged; biasing a frequency of the one or more batteries such that the frequency is faster than a frequency of the utility source; sending an instruction to the relay of the first switchgear to close the first switchgear; monitoring, via the relay of the first switchgear, a voltage and the frequency of the utility source; in response to determining that the voltage and frequency of the utility source are within a predetermined threshold, closing the first switchgear; transitioning the inverter of the one or more batteries to a grid-following mode; and connecting the one or more loads to the utility source.

Yet another example method of controlling a microgrid includes preparing, via the microgrid controller, for a planned outage by predicting power usages for one or more loads on the microgrid; maintaining a state-of-charge of one or more batteries of the microgrid to a predetermined value; and determining whether a planned islanding operation is allowed based on an identity of a utility source external to the microgrid, the state-of-charge of the one or more batteries, a peak load contribution (PLC), an islanding permission, and an alarm state of the one or more batteries, a generator, and a first switchgear. The method also includes transitioning an inverter of the one or more batteries to a grid-forming mode; and islanding, via the microgrid controller, the microgrid. In response to detecting, via the microgrid controller, that the microgrid has successfully islanded, discharging the one or more batteries to supply power to meet the predicted power usages of the one or more loads on the microgrid; generating an amount of power with one or more photovoltaic (PV) panels of the microgrid and generating an amount of supplemental power stored by the battery to meet the predicted power usages of the one or more loads on the microgrid; and monitoring, via the microgrid controller, an actual power usage of the one or more loads and an amount of power generated by the one or more PV panels. In response to receiving a command to reconnect, reconnecting the microgrid to the utility source by verifying that a flywheel of the microgrid is fully charged; biasing a frequency of the one or more batteries such that the frequency is faster than a frequency of the utility source; sending an instruction to the relay of the first switchgear to close the first switchgear; monitoring, via the relay of the first switchgear, a voltage and the frequency of the utility source. In response to determining that the voltage and frequency of the utility source are within a predetermined threshold, closing the first switchgear, transitioning the inverter of the one or more batteries to a grid-following mode; and connecting the critical load to the utility source.

A further example provides a method of reconnecting a microgrid to an external utility source, where the method includes verifying, via the microgrid controller, that a medium voltage loop of the microgrid is no longer supplying power, receiving, via the microgrid controller, a command to reconnect the microgrid to the utility source, and reconnecting the microgrid to the utility source.

Further examples described herein provide a method of maximizing utilization of one or more photovoltaic (PV) panels of a microgrid, where the method includes monitoring, via a microgrid controller, a total supply power provided the PV panels and a total load power consumed by one or more battery banks of the microgrid, wherein the total supply power is a total power generated by the PV panels over the course of a year, and the total load power is a total power consumed by the batteries over the course of the year; determining whether to reduce frequency regulation participation to reduce a predicted total load power consumed by the battery banks a remainder of the year; determining whether to charge the batteries only while PV panels are generating power and only to a predetermined generation level of the batteries; maximizing, via the microgrid controller, a production level of the PV panels.

Yet another example provides a method of controlling a state-of-charge of one or more batteries of the microgrid, where the method include determining, via a microgrid controller, a microgrid resilience, a frequency regulation participation, and a peak load contribution reduction; controlling, via the microgrid controller, the one or more batteries to charge to at least a first predetermined capacity at all times; controlling, via the microgrid controller, the one or more batteries to charge to at least a second predetermined capacity at the beginning of a nighttime period when the frequency regulation participation is limited to a predetermined value; and controlling, via the microgrid controller, the one or more batteries to charge to at least a third predetermined capacity in preparation for a max load reduction operation.

Further examples described herein provide a method for maximizing uptime of a load of a microgrid, where the method includes connecting a flywheel to the load, wherein the flywheel is configured to provide an amount of power to one or more loads of the microgrid for a predetermined amount of time; in response to determining that the microgrid is operating under a normal condition, moderating, via the flywheel, a supply power to even out high and low voltages of the supply power and maintaining a velocity of a spinning mass of the flywheel to maximize an energy stored in the flywheel; in response to determining that the supply power has become unavailable, disconnecting, via a breaker of the flywheel, the load from a source of the supply power; in response to determining that the supply power has become available, synchronizing the flywheel to the source of the supply power and reconnecting, via the breaker of the flywheel, the load to the source of the supply power; and increasing the velocity of the spinning mass of the flywheel to a maximum speed.

Yet another example provides a method of scheduling a dispatch of a frequency regulation participation period of a microgrid, where the method includes reserving, with a frequency regulation module of the microgrid, a dispatch period; controlling, with a microgrid controller, a state-of-charge of one or more batteries of the microgrid to prepare for the dispatch period; and dispatching, via the frequency regulation module during the dispatch period, the one or more batteries to follow market signals.

Another example provides a method of curtailing a distributed energy resource (DER) in a microgrid, where the method includes establishing a communication connection from a first switchgear of the microgrid to a line recloser and tie recloser of a utility source connected to the microgrid, wherein the line recloser and tie recloser create an automatic throw over (ATO) upstream of the primary meter; receiving, with a microgrid controller, one or more statuses and one or more trip commands from the line recloser and the tie recloser; controlling disconnection, via the microgrid controller, one or more DERs of the microgrid in response to receiving at least one selected from a group consisting of a DER trip command from the line recloser, an indication that the line recloser is not three phase closed, an indication that the tie recloser has at least one phase closed, and an indication that the first switchgear is closed; reducing a line recloser trip timer of the ATO to three seconds and a tie recloser close timer of the ATO to five seconds; reducing the Tie Recloser close timing further in response to receiving a signal from the Line Recloser; and closing the tie recloser in response to receiving a confirmation from the microgrid via the communication connection.

Other examples and aspects of the disclosure will become apparent by consideration of the detailed description and accompanying drawings.

BRIEF DESCRIPTION OF THE DRAWINGS

FIG. 14 is a flowchart illustrating a method of starting a BESS, according to some aspects.

FIG. 15 is a flowchart illustrating a method of disconnecting a BESS, according to some aspects.

FIG. 29 is a flowchart illustrating a method of controlling a microgrid to shed a peak load, according to some aspects.

FIGS. 30A-C are flowcharts illustrating a method of controlling a microgrid to transition to a self-sustaining state during an unplanned power outage, according to some aspects.

FIG. 31 is a flowchart illustrating a method of controlling a microgrid to transition to a self-sustaining state during a planned power outage, according to some aspects.

FIG. 37 is a flowchart illustrating a method of scheduling a dispatch of a frequency regulation period of a microgrid, according to some aspects.

FIG. 38 is a flowchart illustrating a method of curtailing DER in a microgrid, according to some aspects.

DETAILED DESCRIPTION

Figure 1:
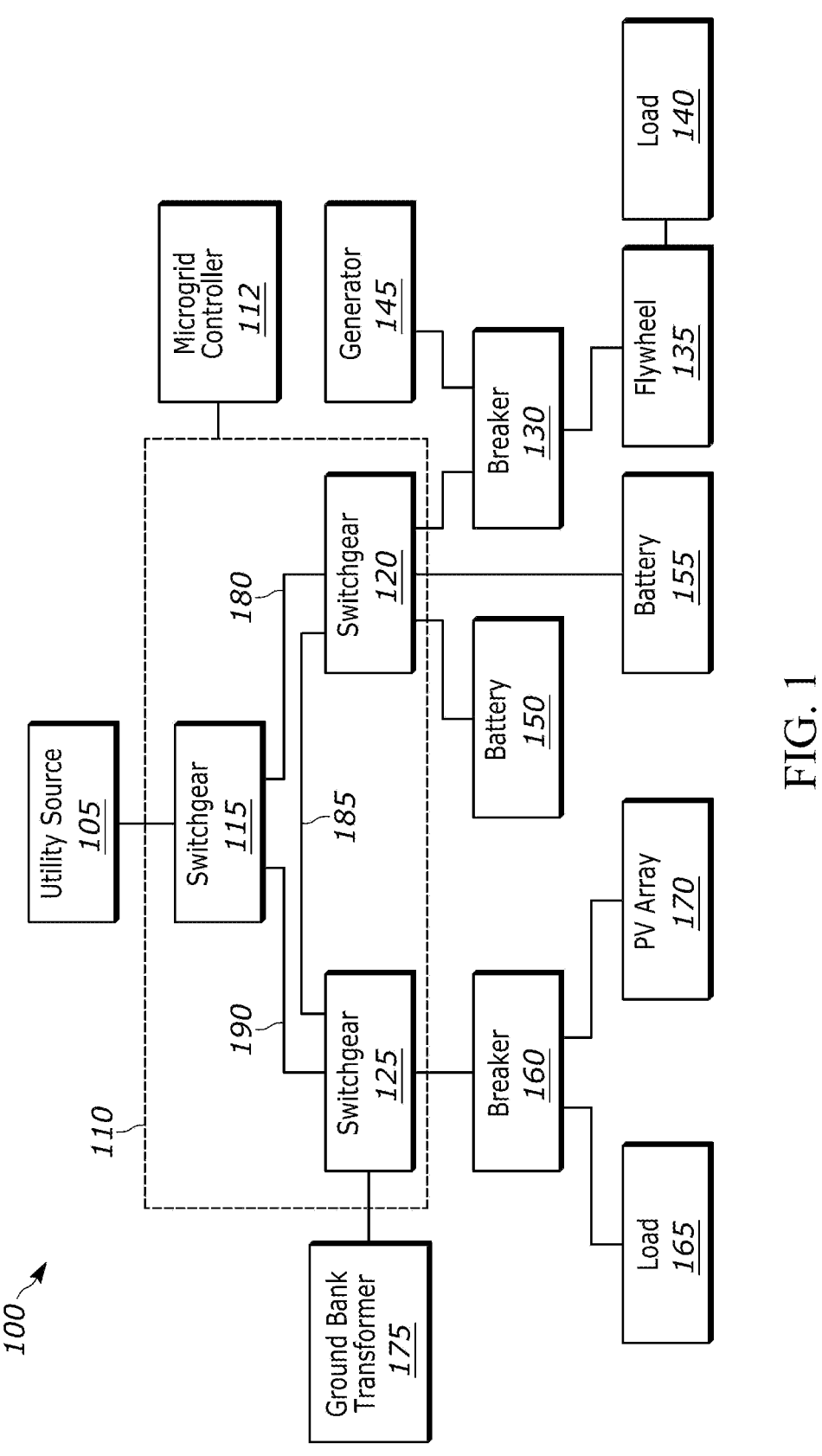
FIG. 1 is a block diagram of a microgrid, according to some aspects.

One or more embodiments, examples, and various aspects are described and illustrated in the following description and accompanying drawings. These embodiments, examples, and aspects are not limited to the specific details provided herein and may be modified or combined in various ways. Furthermore, other embodiments, examples, and aspects may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used herein, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

Also, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

FIG. 1 is a block diagram of an example microgrid 100. In some instances, the microgrid 100 includes all components shown in FIG. 1. In other instances, the microgrid 100 includes additional of the components shown in FIG. 1 (e.g., two generators rather than one), or different components. As shown in FIG. 1, the microgrid 100 is connected to an electric power utility source 105 (sometimes referred to as an external power grid, external power source, or simply utility source). The electric power utility source 105 is a source of electricity in a power grid that provides electric power (such as high-voltage power) to the microgrid 100, for example, a power grid operated by a commercial or government entity designed to provide power from centralized generation stations and to distribute the power over a large-scale grid (for example, hundreds of miles of transmission lines to customers for a fee). The electric power utility source 105 provides power of a particular voltage depending on the point in the grid that is connected to the microgrid 100. In one example, if the microgrid 100 is connected to a local substation, the microgrid 100 may receive power with a voltage level between 2000 and 36,000 volts. However, the voltage level is not limited to this example. In some instances, the microgrid 100 is configured to supply power to the utility source 105 in addition to receiving power from the utility source 105. In these embodiments, an owner of the utility source 105 may pay the owner of the microgrid 100, or otherwise reduce a cost of power from the utility source 105 consumed by the microgrid 100, for power supplied from the microgrid 100 to the utility source 105. In these embodiments, the microgrid 100 may produce power via one or more components, such as a PV array 170, a flywheel 135, or a generator 145.

The microgrid 100 includes a primary junction 110 formed by a first switchgear 115, a third switchgear 120, and a second switchgear 125. In some instances, the first switchgear 115, the third switchgear 120, and the second switchgear 125 are connected via a first conductor 180 connecting the first switchgear 115 to the third switchgear 120, a second conductor 185 connecting the third switchgear 120 to the second switchgear 125, and a third conductor 190 connecting the first switchgear 115 to the second switchgear 125. In the example shown, a microgrid controller 112 is connected to the primary junction 110 and, as will be explained below, controls a state of the first switchgear 115, the third switchgear 120, and the second switchgear 125. The microgrid controller 112 may be connected to additional components of the microgrid 100 in addition to the primary junction 110. Each of the first switchgear 115, the third switchgear 120, and the second switchgear 125 are electrically connected to one or more power sources and one or more loads. In one example, each of the first switchgear 115, the third switchgear 120, and the second switchgear 125 include a relay, such as a REC670 relay, configured to receive an instruction from the microgrid controller 112 to transition the microgrid 100 between operating modes. Each of the first switchgear 115, the third switchgear 120, and the second switchgear 125 are configured to allow power to flow in one or more directions through the first switchgear 115, the third switchgear 120, or the second switchgear 125 based on a control instruction received by the relay indicating a selected operating mode of the microgrid 100. Additionally, each of the first switchgear 115, the third switchgear 120, and the second switchgear 125 include a plurality of switches configured to be controlled by the microgrid controller 112. In one example, in a first operating mode, the first switchgear 115 opens so that a power source connected to the first switchgear 115 supplies power to a load of the third switchgear 120 and a load of the second switchgear 125. Similarly, in a second operating mode, the third switchgear 120 and the second switchgear 125 opens so that a power source of the third switchgear 120 and a power source of the second switchgear 125 supply power to a load of the first switchgear 115.

The first switchgear 115 is connected to the utility source 105. In a first instance, the first switchgear 115 is configured so that the microgrid 100 receives power from the utility source 105. In as second instance, the first switchgear 115 is configured so that the microgrid 100 supplies power to the utility source 105. Similarly, in other instances, the first switchgear 115 is configured so that the microgrid 100 can both receive and supply power from and to the utility source 105 or is configured so that the microgrid 100 is entirely disconnected from the utility source 105.

The third switchgear 120 is connected to a first breaker 130 and configured to form or break a circuit between one or more components. In the example shown, the first breaker 130 is connected to a flywheel 135 and a generator 145. The flywheel 135 is a spinning mass which stores electrical energy as mechanical energy. The flywheel 135 can similarly convert the stored mechanical energy back into electrical energy to be consumed by a first load 140. In one example, the flywheel 135 is connected to the first load 140. The first load 140 is a component of the microgrid 100 that consumes power supplied to or produced by the microgrid 100, for example, electrical device (motors, computer equipment, appliances, etc. in a building (e.g., a manufacturing plant). The first load 140 may be a critical load, that is, a load of the microgrid 100 that has a higher priority than other loads of the microgrid 100 for receiving power. For example, in a situation where the microgrid 100 does not have the necessary power received or stored to power all loads of the microgrid 100, the first load 140 receives the available power from the flywheel 135 before the remaining loads.

The flywheel 135 may be configured to temporarily provide power to the first load 140 while the microgrid 100 transitions between operating modes so that an uptime of the first load 140 is maximized. For example, when fully charged, the flywheel 135 is able to provide power to the first load 140 for at least 60 seconds.

The generator 145 is configured to generate power through a conventional means, such as diesel, gasoline, or the like, in response to the microgrid 100 not having enough power to support the first load 140. In some instances, the generator 145 includes a generator controller configured to control the generator 145 based on signals received from the microgrid controller 112. The signals may include at least one selected from a group consisting of a local detection of primary voltage, a local decision, and an under-voltage timer.

In one example, the third switchgear 120 is also connected to a first battery 150 and a second battery 155. In some instances, the first and second batteries 150 and 155 are part of a battery energy storage system (BESS) which may include additional batteries and other components. The first battery 150 and the second battery 155 are sometimes referred to as a first battery bank and a second battery bank. The first battery 150 and second battery 155 are configured to receive and store, within a plurality of battery cells within the first battery 150 and the second battery 155, electrical energy generated by the microgrid 100 (e.g., via the PV array 170 or utility Source 105. Each of the first battery 150 and the second battery 155 may be configured to charge up to a target state-of-charge (SOC) by receiving power from the microgrid 100. The microgrid controller 112 may determine the actual SOC of the first battery 150 and the second battery 155 so that the actual SOC does not exceed the target SOC. Each of the first battery 150 and the second battery 155 may include an inverter configured to transition between a grid-forming mode and a grid-following mode.

The second switchgear 125 is connected to a second breaker 160 configured to form or break a circuit between one or more components. In one example, the second breaker 160 is connected to a second load 165 and an array of photovoltaic (PV) panels 170. The second load 165 is a component of the microgrid 100 configured to consume power supplied to or produced by the microgrid 100, for example, one of the loads previously described. The second load 165 may be a non-critical load, that is, a load of the microgrid 100 that has a lower priority than other loads of the microgrid 100 for receiving power. In one example, in a situation where the microgrid 100 does not have the necessary power received or stored to power all loads of the microgrid 100, the second load 165 may not receive power unless the first load 140 receives sufficient power.

The PV array 170 is a network formed from a plurality of PV panels configured to convert solar energy into electrical energy. The first battery 150 and the second battery 155 may receive power generated by the PV array 170. In some instances, the microgrid 100 includes multiple PV arrays 170. In some instances, the PV array 170 is the primary power-producing component of the microgrid 100.

The microgrid 100 also includes a ground bank transformer 175. In some embodiments, the ground bank transformer 175 is connected to the second switchgear 125. The ground bank transformer 175 is configured to provide a ground current path in the event of a ground fault while the microgrid 100 is in an islanded state. The ground bank transformer 175 may additionally prevent over-voltages on line-to-ground rated equipment.

Figure 2:
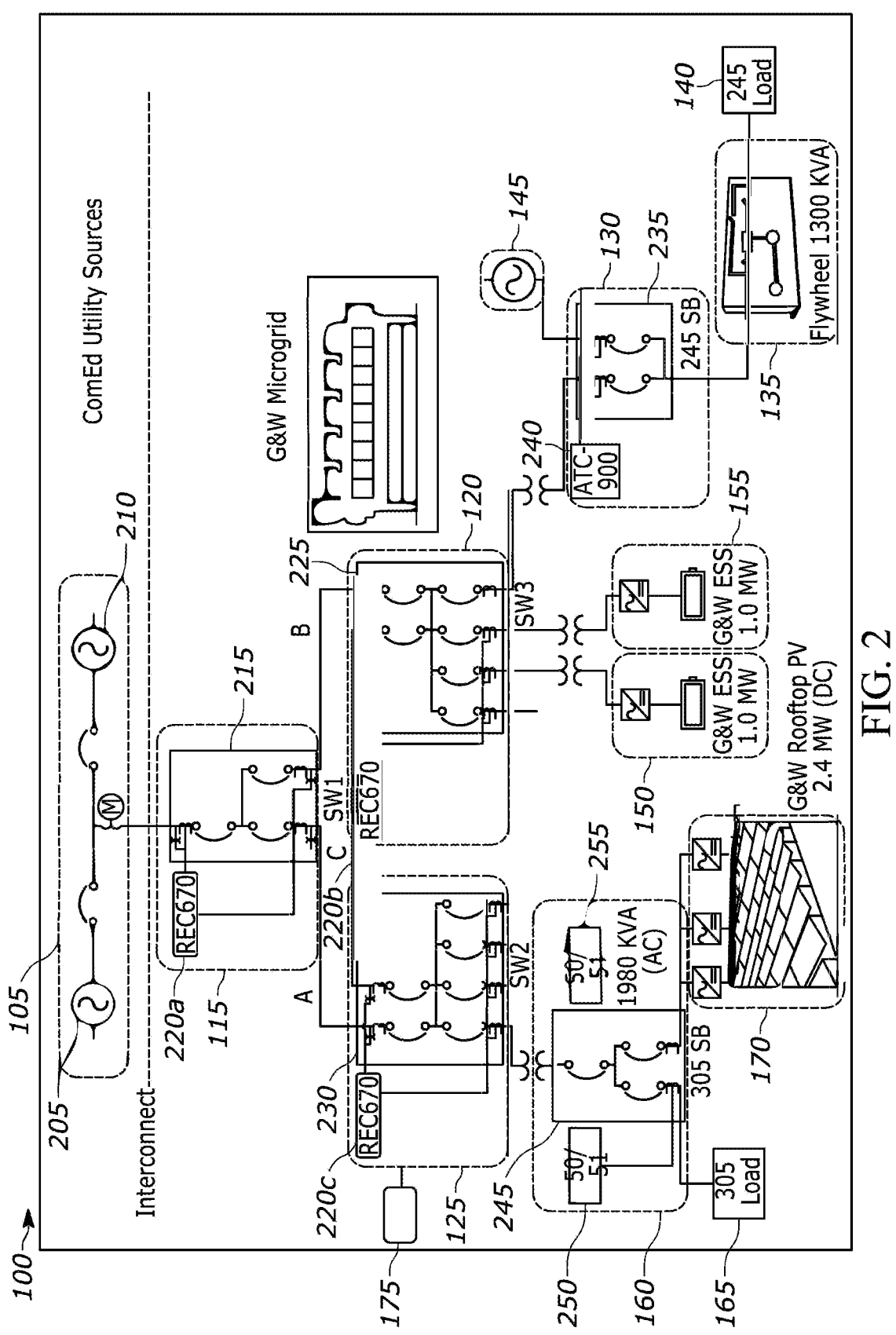
FIG. 2 is a circuit diagram of a microgrid, according to some aspects.

Each component of the microgrid 100 may include several sub-components or circuit elements to form the component. A high-level circuit diagram of the microgrid 100 is illustrated in FIG. 2. In the example shown in FIG. 2, the utility source 105 includes a first (or preferred) source 205 and a second (or alternate) source 210. Each of the first source 205 and the second source 210 connect to the microgrid 100 via a switch and are capable of providing power to the microgrid 100 when connected.

In the example shown in FIG. 2, the first switchgear 115 is formed from a first switching circuit 215 and a relay 220a. The first switching circuit 215 is formed from a plurality of electrical switches. The relay 220a may be a REC670 relay. Similarly, the third switchgear 120 is formed from a second switching circuit 225 and a relay 220b. Like the first switching circuit 215, the second switching circuit 225 is formed from a plurality of electrical switches. The relay 220b may likewise be a REC670 relay. Similarly, the second switchgear 125 is formed from a third switching circuit 230 and a relay 220c. Like the first switching circuit 215, the third switching circuit 230 is formed from a plurality of electrical switches. The relay 220c may likewise be a REC670 relay. Further details on the first switchgear 115, the third switchgear 120, and the second switchgear 125 are given with respect to FIGS. 9, 10A, and 10B, respectively. FIG. 2 shows that the first breaker 130 includes a first breaking circuit 235 composed of two switches, and an automatic transfer control (ATC) 240. The ATC 240 is configured to transfer the utility source of the first breaker 130 to another source, such as a diesel generator (for example, the generator 145). Similarly, the second breaker 160 includes a second breaking circuit 245 that includes a plurality of switches and a plurality of overcurrent relays. In one example, the breaking circuit 245 includes three switches, and a first overcurrent relay 250 and a second overcurrent relay 255. The first overcurrent relay 250 and the second overcurrent relay 255 are configured to disconnect the second breaker 160 from the microgrid 100 in response to a detection of an overcurrent event. FIG. 2 also illustrates individual electrical connections between the various components of the microgrid 100.

Figure 3:
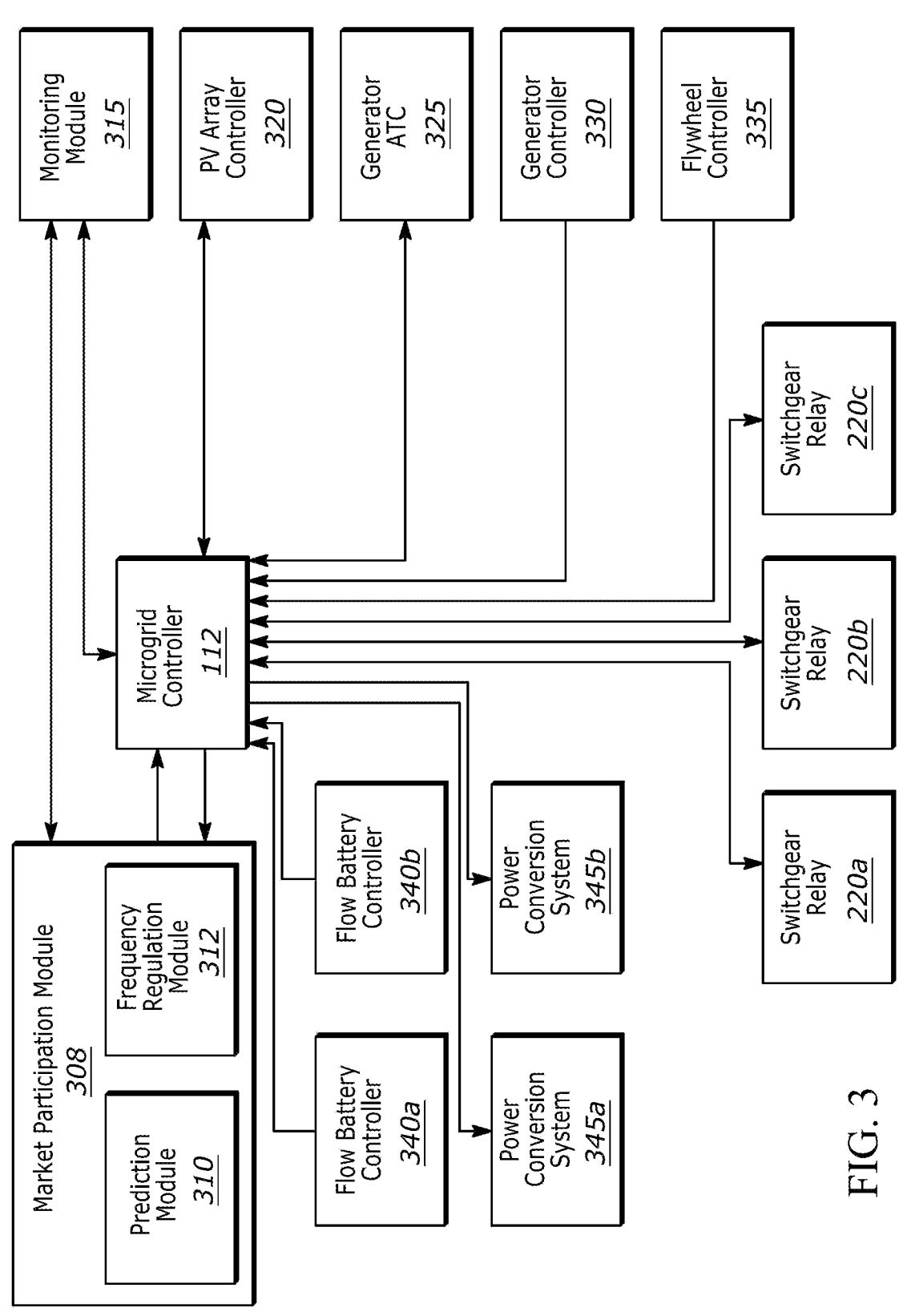
FIG. 3 is a block diagram of a controller for use in a microgrid, according to some aspects.

As noted above, the microgrid 100 is configured to transition between multiple operating states. The selected operating state may be based on several factors, such as an amount of available power from the utility source 105, an amount of power stored in the first battery 150 and/or the second battery 155, a load reduction operation, a peak load shedding operating, a frequency regulation participation, net metering, a combination of these factors, or others. The microgrid controller 112 is configured to generate control signals and provide these control signals to relays of the first switchgear 115, the third switchgear 120, and the second switchgear 125 to transition the microgrid 100 between operating modes. These control signals are generated by the microgrid controller 112 based on various factors as described herein. FIG. 3 is a block diagram illustrating how the microgrid controller 112 communicates with other controllers of the microgrid 100.

In one example, the microgrid controller 112 includes an electronic processor and a memory. In one example, the microgrid controller 112 is configured to control operation of the microgrid 100 based on data received from other components of the microgrid 100. In one example, the microgrid controller 112 is also configured to perform analytics (for example, tracking metrics and monitoring production levels of the microgrid 100); perform islanding operations to disconnect the microgrid 100 from the utility source 105; perform reconnecting operations after an islanding or loss of voltage (LOV) operation; and perform scheduling operations (for example, scheduling daytime production for the PV array 170), and scheduling SOC levels for the first battery 150 and/or the second battery 155.

The microgrid controller 112 is connected to a market participation module 308 including a prediction module 310 configured to predict various aspects of the microgrid 100 and a frequency regulation module 312. Aspects of the market participation module 308 include predicting a power consumption level of the microgrid 100, a power production level of the microgrid 100, and a frequency regulation participation of the microgrid 100. These predictions may be performed by the prediction module 310 or the frequency regulation module 312. One aspect of the prediction module 310 is predicting a coincident peak load time of the utility, independent system operator (ISO), regional transmission organization, or a combination of these entities. The peak load time is a time at which the loads of the microgrid 100 (for example, the first load 140 and the second load 165) consume the most energy over the course of a year. In some instances, an owner of the microgrid 100 is charged by the owner of the utility source 105 based on a number of peak loads over the course of one year. For example, the owner of the microgrid 100 may be charged for power consumed by the microgrid 100 on five coincident peak load hours. The prediction module 310 is configured to determine that a peak load time is approaching and provide an indication to the microgrid controller 112. In response to receiving the indication of the approaching coincident peak load time from the prediction module 310, the microgrid controller 112 can control the microgrid 100 to reduce the peak load by, for example, discharging the first battery 150 and/or the second battery 155 to reduce power consumed from the utility source 105. The market participation module 308 may be an Intelligent Generation system provided by Intelligent Generation (also referred to as IG).

The microgrid controller 112 is also connected to a monitoring module 315 configured to provide various statistics and analytics of the microgrid 100 to the microgrid controller 112. The monitoring module 315 is also configured to provide the statistics and analytics of the microgrid 100 via a graphical user interface (GUI). In the example shown, the monitoring module 315 is also connected to the market participation module 308. The monitoring module 315 provides the primary user environment of the microgrid 100 including controls to view predictions provided by the prediction module 310, states-of-charge of the first battery 150 and the second battery 155, an amount of power provided by the utility source 105, an amount of power generated by the PV array 170, an amount of power consumed by the first load 140, an amount of power consumed by the second load 165, a current operating state of the microgrid 100, and other analytics. Additionally, the monitoring module 315 is configured to provide controls to manually control the microgrid 100. In some instances, the monitoring module 315 is a SCADA system. The microgrid controller 112 is also connected to various components of the microgrid 100 to control operation of these components. For example, the microgrid controller 112 is connected to the relay 220a of the first switchgear 115, the relay 220b of the third switchgear 120, and the relay 220c of the second switchgear 125 to receive an indication of a current state of the respective switchgear and provide a control instruction to alter a state of the respective switchgear. The microgrid controller 112 is likewise connected to a PV array controller 320 configured to control an operation of the PV array 170, a generator automatic transfer control (ATC) 325 to automatically transition at least one load of the microgrid 100 to rely on power provided by the generator 145 or other alternative source of power, a generator controller 330 configured to control an operation of the generator 145, and a flywheel controller 335 configured to control an operation of the flywheel 135. The microgrid controller 112 is also connected to components of the first battery 150 and the second battery 155. For example, the microgrid controller 112 is connected to a first flow battery controller (FBC) 340a and a first power conversion system (PCS) 345a of the first battery 150, and a second FBC 340b and a second PCS 345b of the second battery 155. The FBCs 340 are configured to control a target SOC and charge/discharge state of the respective battery, and the PCSs 345 are configured to control individual cells of the respective battery.

Figure 4:
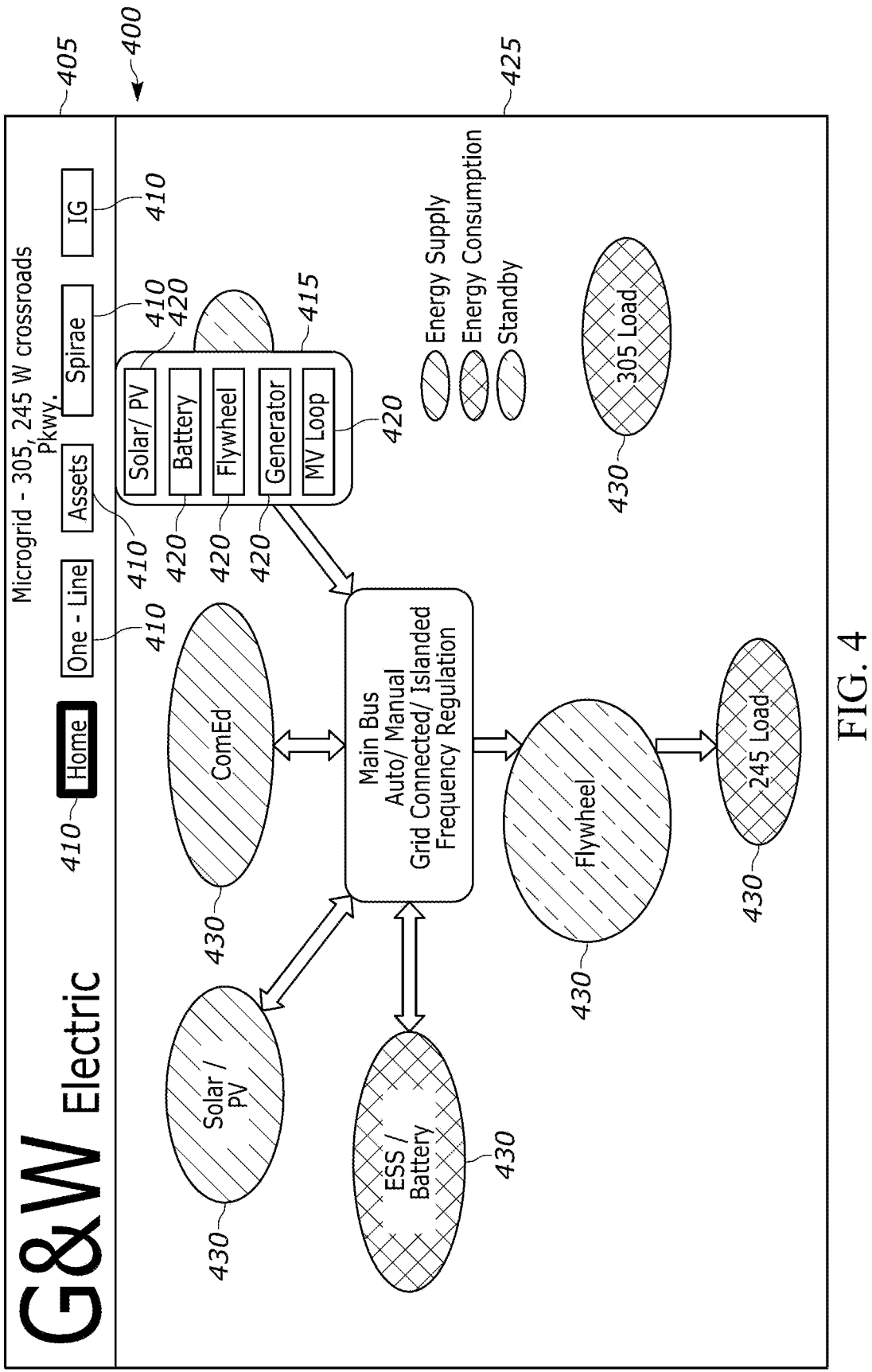
FIG. 4 is an example user interface for microgrid control software, according to some aspects.

As noted above, the microgrid controller 112 includes a monitoring module 315 configured to provide a graphical user interface (GUI) for monitoring and controlling various aspects of the microgrid 100. FIG. 4 is an example GUI 400 generated by the monitoring module 315 and displayed on a display of the microgrid 100. In the example shown, the GUI 400 includes interface components that provide visual indications of the status of individual components of the microgrid 100. In some embodiments, the display is directly connected to the microgrid 100, for example, the display of a terminal computer. In other embodiments, the display is remote to the microgrid 100, for example, the display of a personal computer, workstation, or mobile device of the operator.

In one example, the GUI 400 includes a selection panel 405 for selecting a view to be displayed on the GUI 400. The selection panel 405 includes one or more buttons 410 corresponding to selectable views. The selected view provides details from a corresponding component of the microgrid controller 112. For example, the example GUI 400 of FIG. 4 includes a "Home" button. Selecting the "Home" button alters the GUI 400 to provide a view of the overall functionality of the microgrid 100. The GUI 400 also includes a "One-Line" button, selecting which alters the GUI 400 to provide a view of the microgrid 100 as a whole; an "Assets" button, selecting which alters the GUI to provide a view of a selected component of the microgrid 100; and a "System Control" button, selecting which alters the GUI 400 to provide a secondary GUI including controls for the microgrid controller 112. The GUI 400 also includes a "Predictions" button, selecting which alters the GUI 400 to provide a secondary GUI related to the prediction module 310. Upon selecting certain buttons 410, a secondary selection panel 415 may be generated including one or more buttons 420 corresponding to selectable views. For example, selecting the "Assets" button causes the secondary selection panel 415 to include a "Solar/PV" button, selecting which alters the GUI 400 to provide a view of details of the PV array 170; a "Battery" button, selecting which alters the GUI 400 to provide a view of details of the first battery 150 and/or the second battery 155; and a "Flywheel" button, selecting which alters the GUI to provide a view of details of the flywheel 135. Additional features of the GUI 400 include a "Generator" button, selecting which alters the GUI 400 to provide a view of details of the generator 145; and an "MV Loop" button, selecting which alters the GUI 400 to provide a view of details of the medium-voltage loop. Upon a selection of one of the buttons 410 of the selection panel 405 (and, if applicable, one of the buttons 420 of the secondary selection panel 415), a display panel 425 of the GUI provides the selected view.

In the example GUI 400 illustrated by FIG. 4, the "Home" button is selected, as indicated by a background of the "Home" button having a different color than the backgrounds of the other buttons of the one or more buttons 410. The display panel 425 accordingly shows the "Home" view, which includes an overview of the various components of the microgrid 100. The "Home" view includes icons 430 corresponding to the components, with each icon 430 having a color to indicate whether the component is in an "energy supply" state, an "energy consumption" state, or a "standby" state. Each icon 430 also includes details of the component, such as power produced, power consumed, SOC, and the like. The GUI 400 also illustrates live or dead components, details on total current draw from the live components, and the load of each component in volts, amps, VA, watts, or the like.

Figure 5:
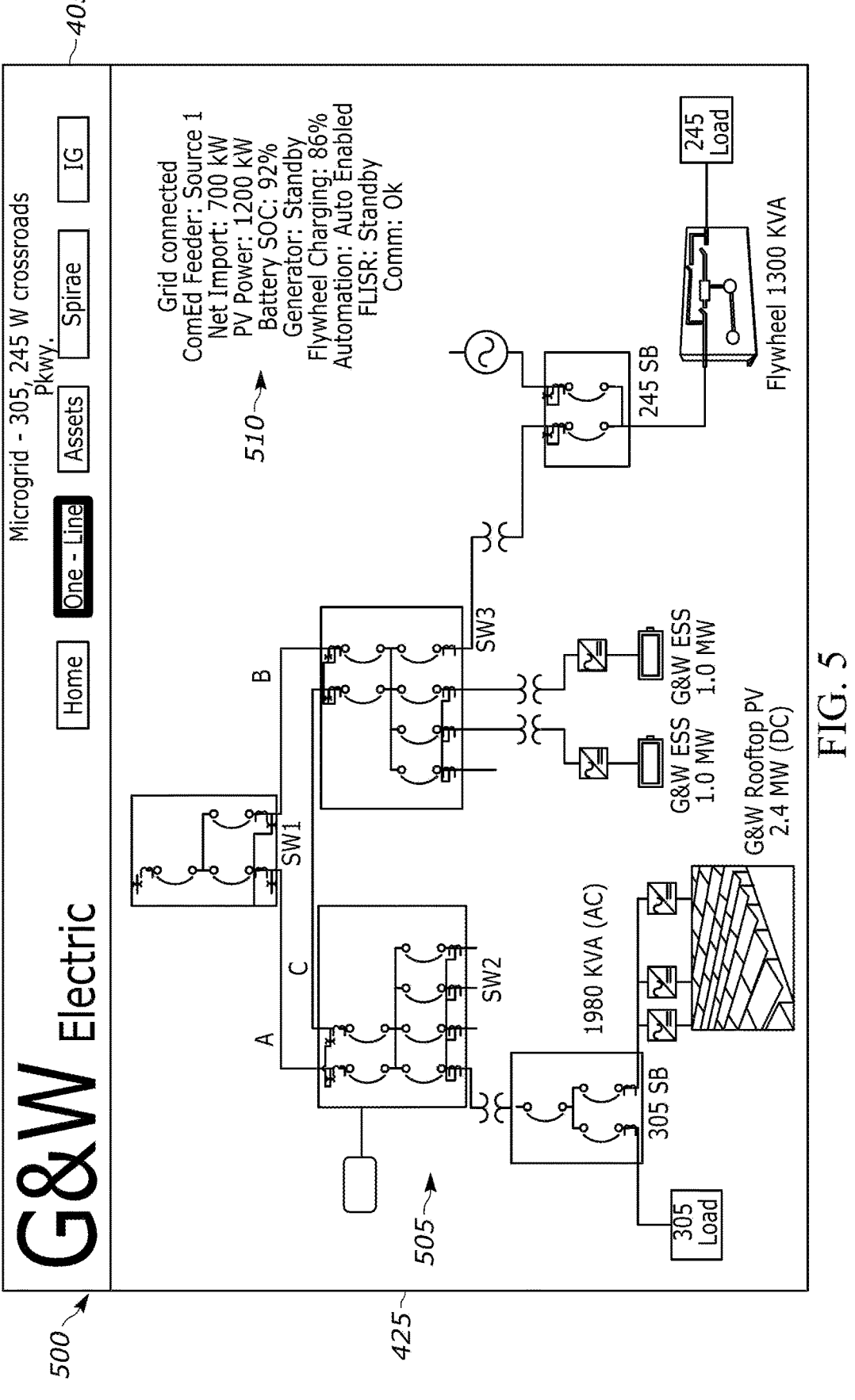
FIG. 5 is an example user interface for microgrid control software providing a single line diagram of a microgrid, according to some aspects.

Upon a selection of a different button from the selection panel 405, the display panel 425 provides a different view. For example, FIG. 5 is a GUI 500 provided in response to the "One-Line" button of the selection panel 405 being selected. The GUI 500 includes a one-line diagram 505 illustrating the microgrid 100. The one-line diagram 505 shows operating states of the various components and circuit elements of the microgrid 100. The GUI 500 also includes a data panel 510 displaying data received by the monitoring module 315 from the microgrid controller 112. The data panel 510 includes, for example, a status of the microgrid, a type of source connected to the utility source 105, an amount of power consumed from the utility source 105, an amount of power produced by the PV array 170, an SOC of the first battery 150 and/or the second battery 155, a status of the generator 145, an SOC of the flywheel 135, a current operating state of the microgrid 100, a status of microgrid 100 communications, and the like. In some instances, additional details are provided. In other instances, different details or less details are provided. Additionally, the GUI 500 may include alarms corresponding to components of the microgrid 100, as well as control panels for controlling the components of the microgrid 100.

Figure 6:
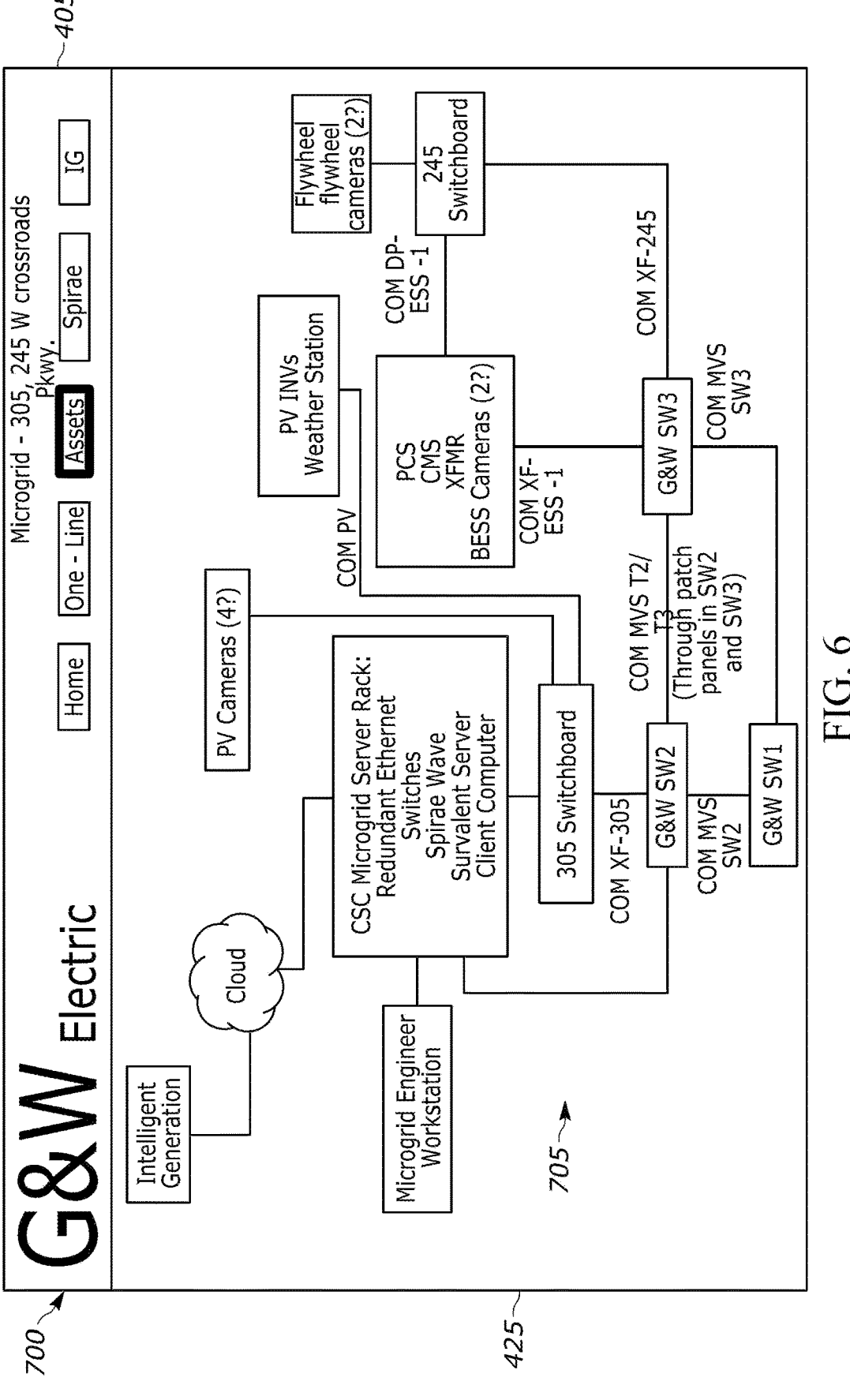
FIG. 6 is an example user interface for microgrid control software providing communication monitoring of a microgrid, according to some aspects.

Upon a selection of the "Assets" button of the selection panel 405 and the "MV Loop" button of the secondary selection panel 415, a GUI 700 illustrated by FIG. 6 is displayed. In the example GUI 700, the display panel 425 includes a graph 705 of communication statuses between the components of the microgrid 100. Each component of the microgrid 100 is represented by an icon, with edges linking components in communication with each other. For example, the first switchgear 115, the third switchgear 120, and the second switchgear 125 are linked by edges of the graph 705. The edges may have a different appearance based on the type of communication between the components. For example, communication between components via a copper Ethernet appear in a first color, while communication between components via a fiber appear in a second color. Additionally, the edges may have a different appearance based on a status of the communication. For example, components between which communication has failed may be linked by an edge of a third color. Each icon may include one or more labels corresponding to hardware associated via the corresponding component. Additionally, each edge may include a label indicating an amount of traffic between the linked components.

Figure 7:
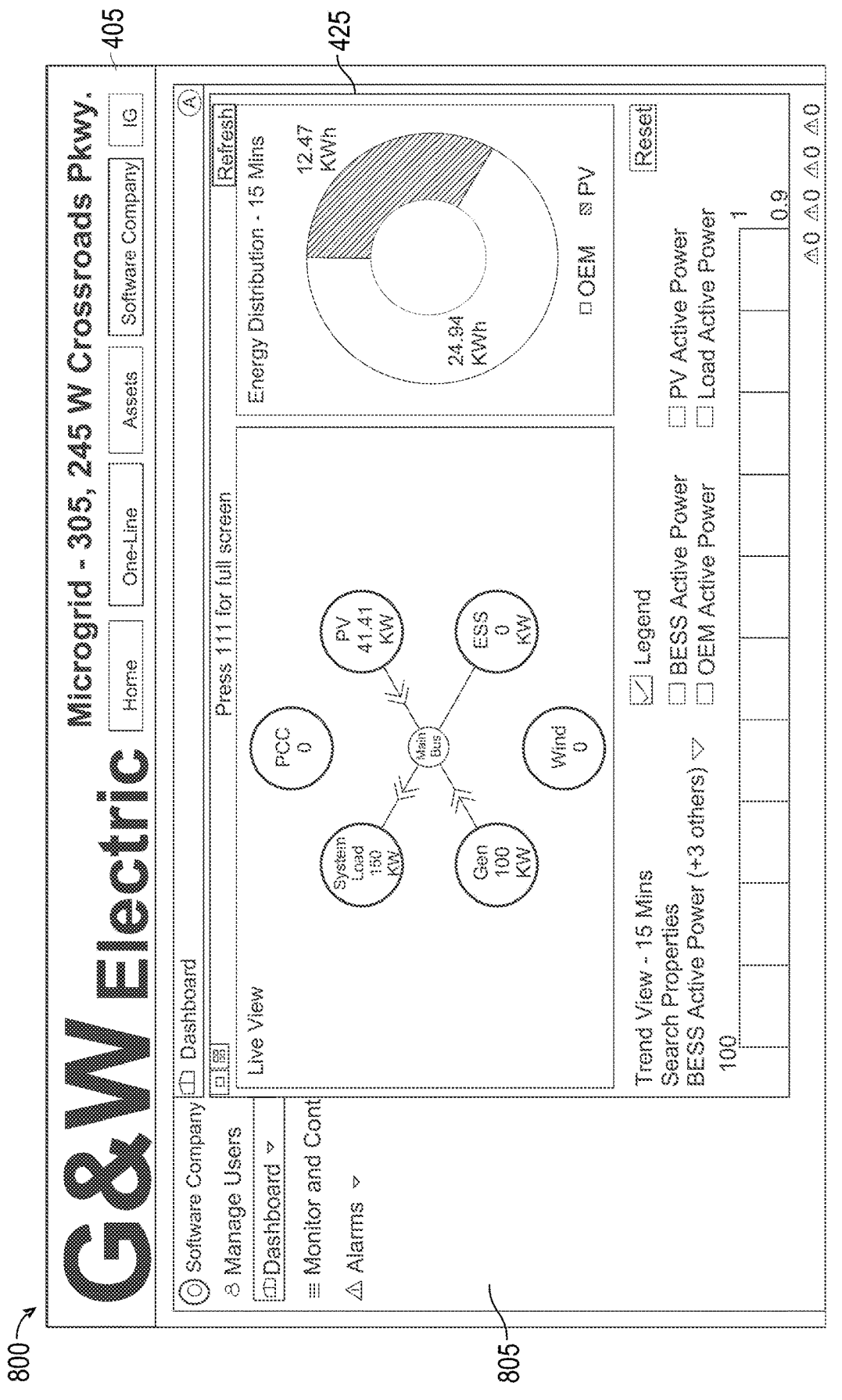
FIG. 7 is an example user interface for microgrid control software providing an overview of a microgrid, according to some aspects.

Upon a selection of the "System Control" button of the selection panel, a GUI 800 illustrated by FIG. 7 is displayed on the display panel 425. The GUI 800 includes a secondary GUI 805 that provides details about the microgrid 100 and includes input control elements configured to allow an operator of the microgrid 100 to manually input control information and selections, which ultimately result in control of various aspects of the microgrid 100. For example, the secondary GUI 805 includes visual indicators of the current operating state of the microgrid 100, statuses of each component of the microgrid 100, statuses of all communication lines to and from the microgrid controller 112, and alarms triggered within the microgrid 100, and others. The alarms may indicate an issue within the microgrid 100 that may need to be resolved by an operator of the microgrid 100, such as that one or more components of the microgrid 100 have failed. Additionally, the secondary GUI 805 includes input mechanisms configured to allow the operator to input manual control inputs to island or reconnect the microgrid 100, adjust dispatch priorities such as maximizing solar production or minimizing load, and the like.

Figure 8:
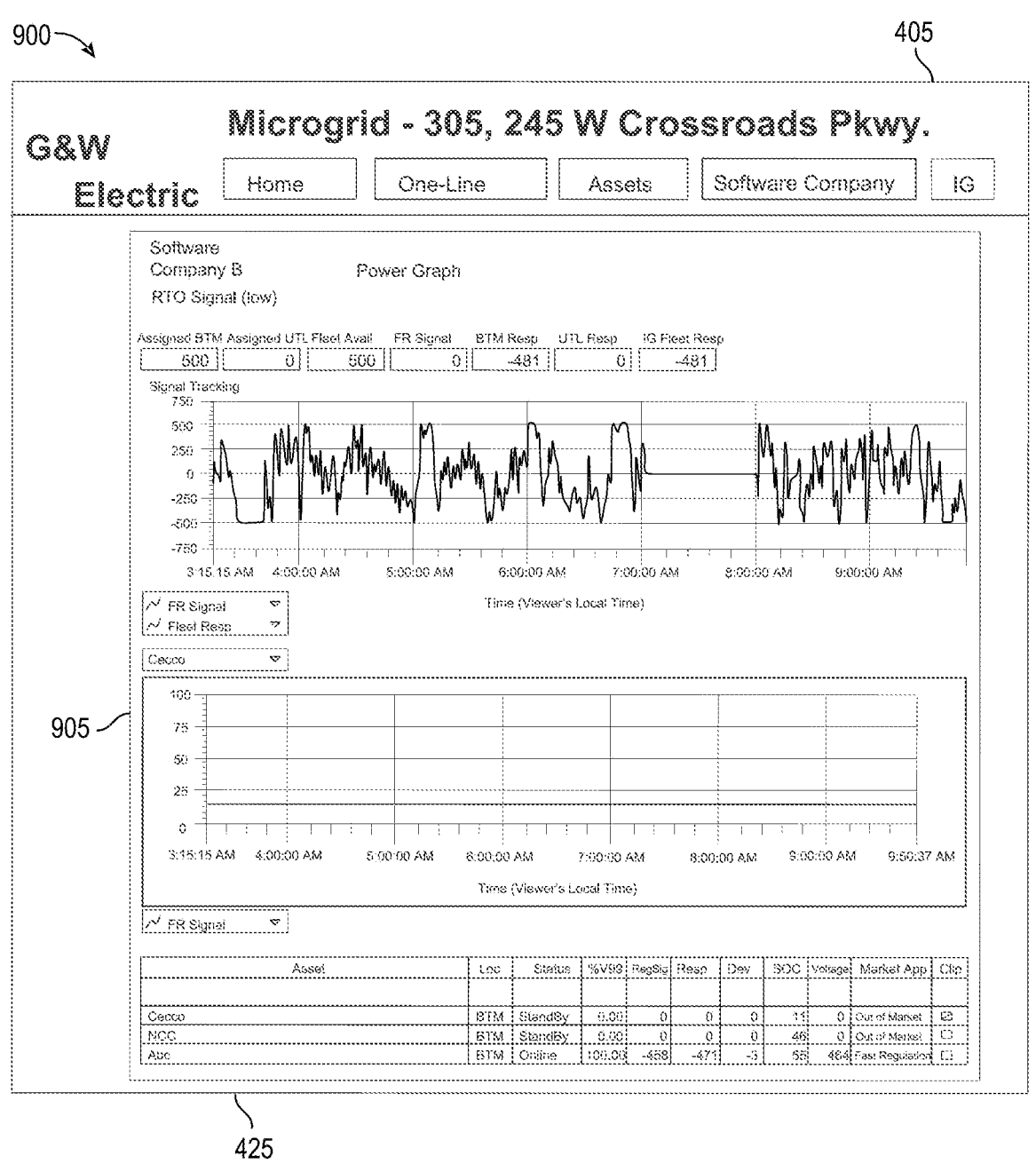
FIG. 8 is an example user interface for microgrid control software providing predictions relating to a microgrid, according to some aspects.

Upon a selection of the "Predictions" button of the selection panel 405, a GUI 900 illustrated by FIG. 8 is displayed on the display panel 425. The GUI 900 includes a secondary GUI 905. The secondary GUI 905 includes visual indicators of the predictions made by the prediction module 310 of the microgrid controller 112. In the example shown, the secondary GUI 905 provides a frequency response schedule, a peak load reduction schedule, a peak load shedding schedule, a capacity alert summary, an economics estimate, an energy management dashboard, a historic model or graph, a predictive model or graph, a component manager, a component monitor, a component alert, a battery schedule, and the like. Additionally, the secondary GUI 905 includes input control elements to receive operator inputs to modify functionality of the microgrid 100, for example adjusting frequency regulation participation, scheduling battery usage, scheduling a peak load reduction period, or the like.

Figure 9:
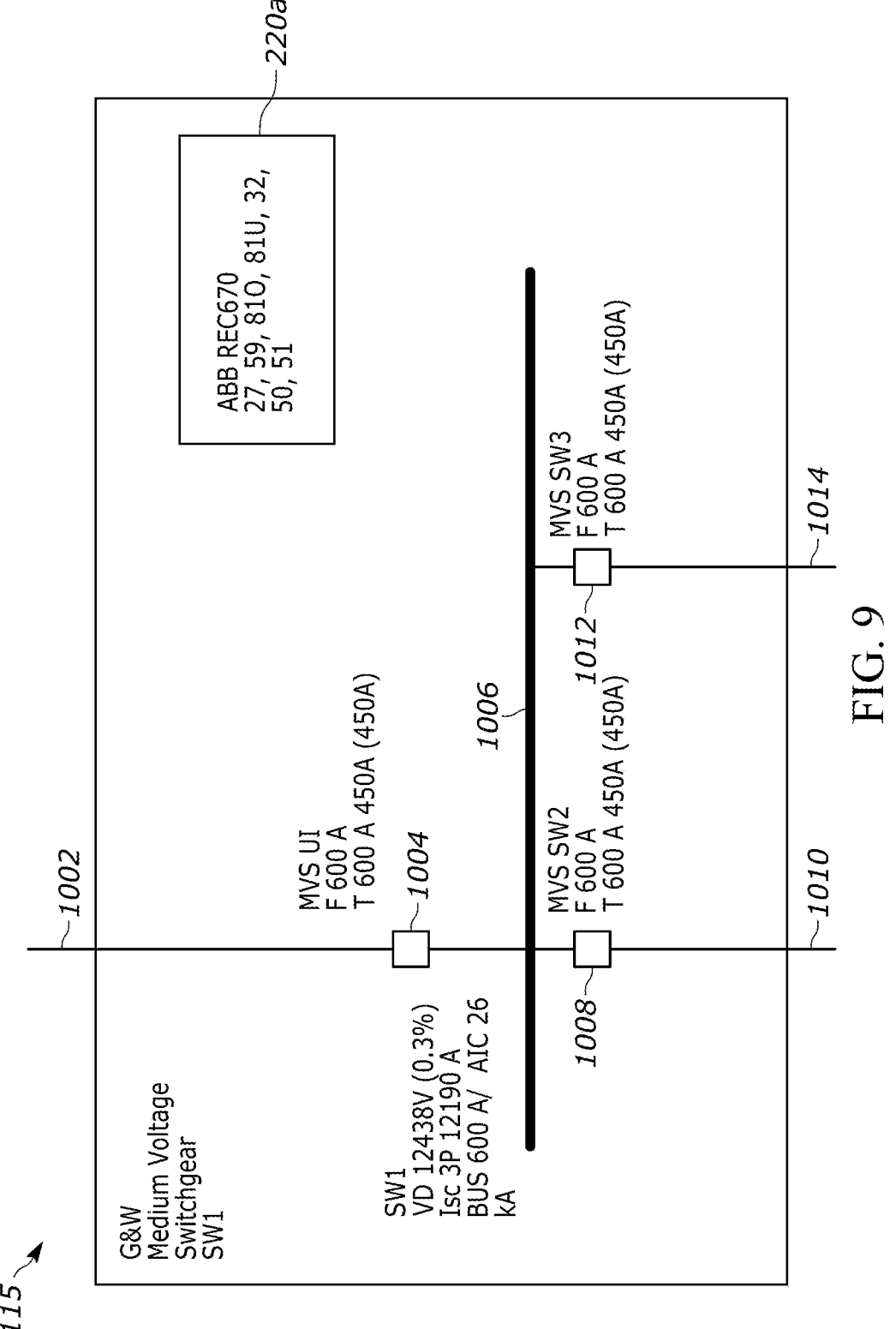
FIG. 9 is a schematic diagram of switchgear for use in a microgrid, according to some aspects.

As discussed with respect to FIGS. 1 and 2, the microgrid 100 includes a first switchgear 115, a third switchgear 120, and a second switchgear 125. The first switchgear 115 is illustrated by FIG. 9. The first switchgear 115 includes a source-side electrical connection 1002. In some instances, the source-side electrical connection 1002 is connected to the utility source 105. In some instances, the source-side electrical connection 1002 receives power from the utility source 105. In other instances, the source-side electrical connection 1002 provides power to the utility source 105. In yet other instances, the source-side electrical connection 1002 both receives and provides power from and to the utility source 105. The source-side electrical connection 1002 is connected to a first switch 1004 configured to selectively connect the source-side electrical connection 1002 to a main bus 1006 of the first switchgear 115. The main bus 1006 electrically connects the first switch 1004 to a second switch 1008 and a third switch 1012 of the first switchgear 115. The second switch 1008 is configured to selectively connect a first junction-side electrical connection 1010 to the main bus 1006. The third switch 1012 is similarly configured to selectively connect a second junction-side electrical connection 1014 to the main bus 1006. Each of the first switch 1004, the second switch 1008, and the third switch 1012 are controlled by the relay 220a of the first switchgear 115.

Figure 10A:
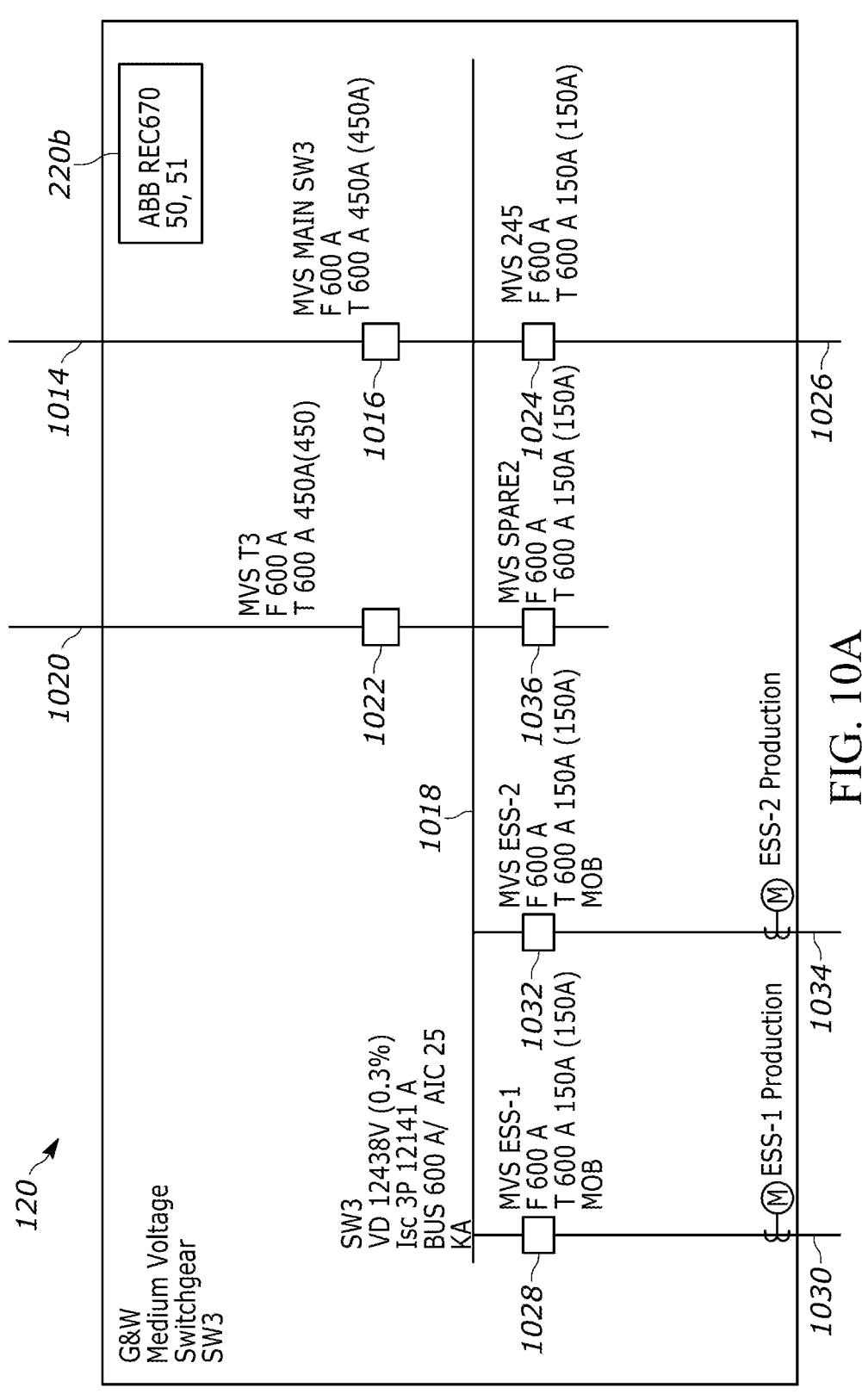
FIGS. 10A-B are schematic diagrams of switchgear for use in a microgrid, according to some aspects.

The third switchgear 120 is illustrated by FIG. 10A. The third switchgear 120 is connected to the first switchgear 115 via the second junction-side electrical connection 1014. A fourth switch 1016 selectively connects the second junction-side electrical connection 1014 to a main bus 1018 of the third switchgear 120. The third switchgear 120 is additionally connected to a third junction-side electrical connection 1020. A fifth switch 1022 selectively connects the third junction-side electrical connection 1020 to the main bus 1018. The main bus 1018 electrically connects the fourth switch 1016 and the fifth switch 1022 to a sixth switch 1024, a seventh switch 1028, and an eighth switch 1032.

The sixth switch 1024 is configured to selectively connect a first load-side connection 1026 to the main bus 1018. The first load-side connection 1026 connects the third switchgear 120 to the first breaker 130. The seventh switch 1028 is configured to selectively connect a second load-side connection 1030 to the main bus 1018. The second load-side connection 1030 connects the third switchgear 120 to the first battery 150. The eighth switch 1032 is configured to selectively connect a third load-side connection 1034 to the main bus 1018. The third load-side connection 1034 connects the third switchgear 120 to the second battery 155. In some instances, each of the first load-side connection 1026, the second load-side connection 1030, and the third load-side connection 1034 are configured to receive power provided through the third switchgear 120. In other instances, the second load-side connection 1030 and the third load-side connection 1034 are configured to provide power to other components of the microgrid 100 via the third switchgear 120. In yet other instances, some of the first load-side connection 1026, the second load-side connection 1030, and the third load-side connection 1034 are configured to receive power provided through the third switchgear 120, while others of the first load-side connection 1026, the second load-side connection 1030, and the third load-side connection 1034 are configured to provide power to other components of the microgrid 100 via the third switchgear 120.

Each of the fourth switch 1016, the fifth switch 1022, the sixth switch 1024, the seventh switch 1028, and the eighth switch 1032 are controlled by the relay 220b of the third switchgear 120. The third switchgear 120 also includes a first spare connection 1036 electrically connected to the main bus 1018, which is not connected to any other components of the microgrid 100, according to some aspects. The first spare connection 1036 may include an additional switch to selectively couple the main bus 1018 to a component connected to the first spare connection 1036. In some instances, the first spare connection 1036 may be connected to an additional component not illustrated by FIG. 10A.

Figure 10B:
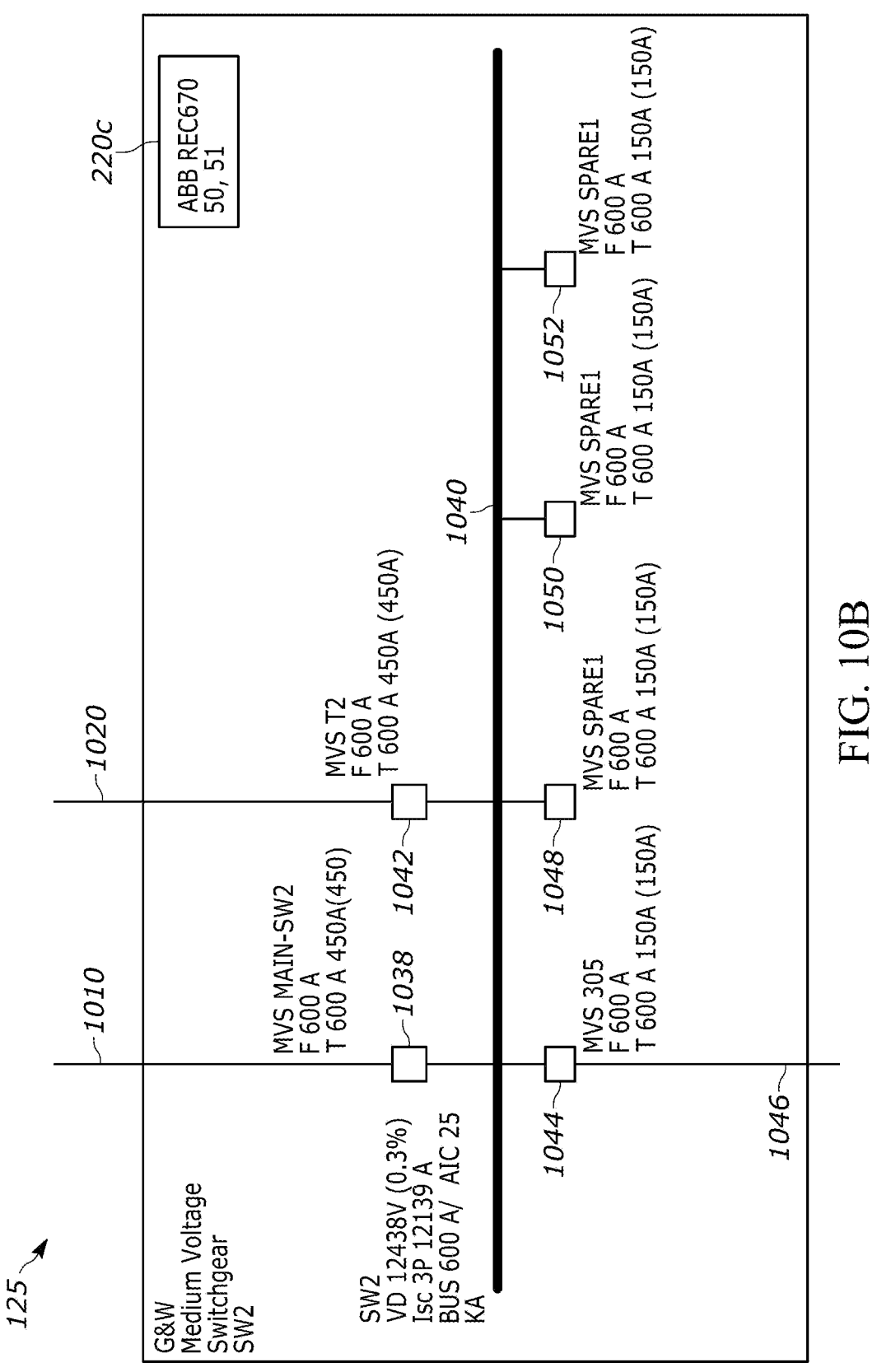

The second switchgear 125 is illustrated by FIG. 10B. In some instances, the second switchgear 125 is connected to the first switchgear 115 via the first junction-side electrical connection 1010, connected to the third switchgear 120 via the third junction-side electrical connection 1020. The first junction-side electrical connection 1010, the second junction-side electrical connection 1014, and the third junction-side electrical connection 1020 together form the primary junction 110. A ninth switch 1038 selectively connects the first junction-side electrical connection 1010 to a main bus 1040 of the second switchgear 125. A tenth switch 1042 selectively connects the third junction-side electrical connection 1020 to the main bus 1040. The main bus 1040 electrically connects the ninth switch 1038 and the tenth switch 1042 to an eleventh switch 1044.

The eleventh switch 1044 is configured to selectively connect a fourth load-side electrical connection 1046 to the main bus 1040. The fourth load-side electrical connection 1046 electrically connects the second switchgear 125 to the second breaker 160. In some instances, the fourth load-side electrical connection 1046 is configured to receive power provided through the second switchgear 125. In other instances, the fourth load-side electrical connection 1046 is configured to provide power to other components of the microgrid 100 via the second switchgear 125. The second switchgear 125 also includes a second spare connection 1048, a third spare connection 1050, and a fourth spare connection 1052, which are not connected to any components of the microgrid 100, according to some aspects. Each of the second spare connection 1048, the third spare connection 1050, and the fourth spare connection 1052 may include an additional switch to selectively couple the main bus 1040 to a component connected to the respective spare connection. In one example, the ground bank transformer 175 is connected to one of the spares 1048, 1050, or 1052.

Figure 11:
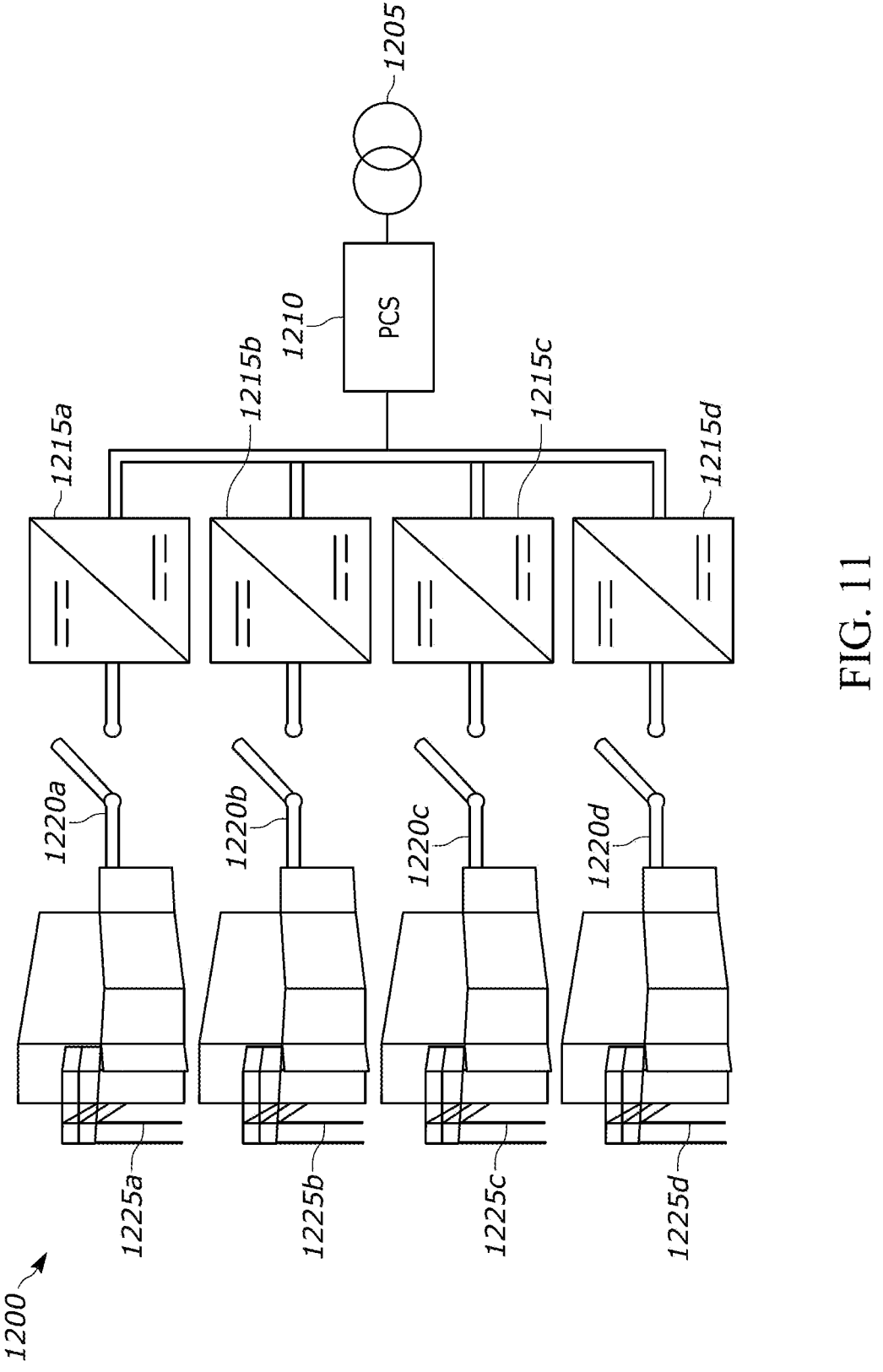
FIG. 11 is a block diagram of a battery energy storage system (BESS) for use in a microgrid, according to some aspects.

As noted above, each of the first battery 150 and the second battery 155 may be part of a battery energy storage system (BESS) 1200 formed of multiple battery storage units. A block diagram of a BESS 1200 is illustrated by FIG. 11. In the example shown, the BESS 1200 includes a transformer 1205 configured to receive or provide electrical power to or from a component of the microgrid 100 connected to the BESS 1200. The transformer 1205 is connected to a power conversion system (PCS) 1210 that is configured to control charging and discharging of the BESS 1200. The PCS 1210 is connected to one or more parallel branches. As an example, the BESS 1200 illustrated by FIG. 11 includes four branches a-d, with each branch including an inverter 1215 a-d, a switch 1220a-d, and a battery storage unit 1225a-d. The switch 1220 is configured to selectively couple the inverter 1215 to the battery storage unit 1225. The BESS 1200 is configured to charge to a target state-of-charge, or alternatively discharge stored power when additional power is needed by the microgrid 100.

Figure 12:
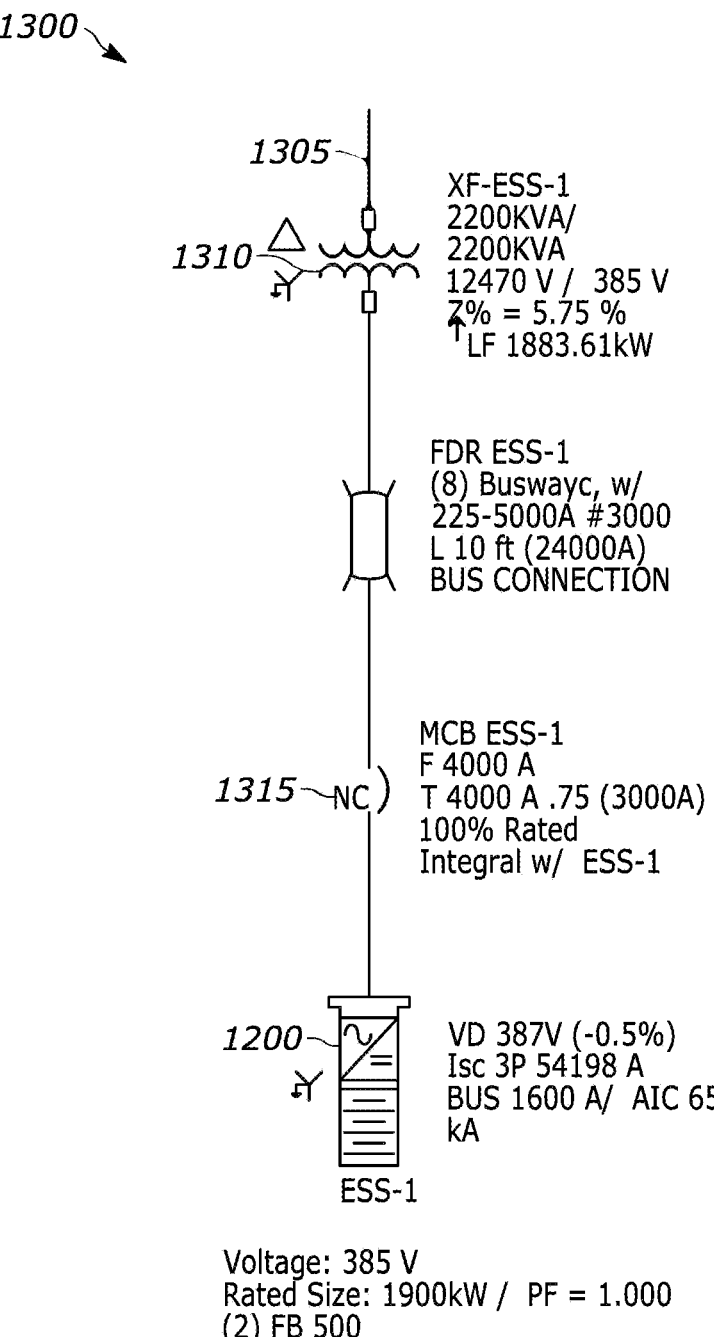
FIG. 12 is a schematic diagram of a battery for a BESS, according to some aspects.

As discussed with respect to FIG. 10A, the first battery 150 is connected to the second load-side electrical connection 1030, and the second battery 155 is connected to the third load-side electrical connection 1034. FIG. 12 illustrates a connection system 1300 for connecting one of the first battery 150 and the second battery 155 to the second load-side electrical connection 1030 or the third load-side electrical connection 1034. The connection system 1300 includes a connection point 1305 where the connection system 1300 connects to the second load-side electrical connection 1030 or the third load-side electrical connection 1034. The connection point 1305 is connected to a medium-to-low voltage transformer 1310 configured to transform medium-voltage power received from the second load-side electrical connection 1030 or the third load-side electrical connection 1034 to low-voltage power. The medium-to-low voltage transformer 1310 is connected to a switch 1315 for selectively connecting the connection system 1300 to a BESS 1200.

Figure 13:
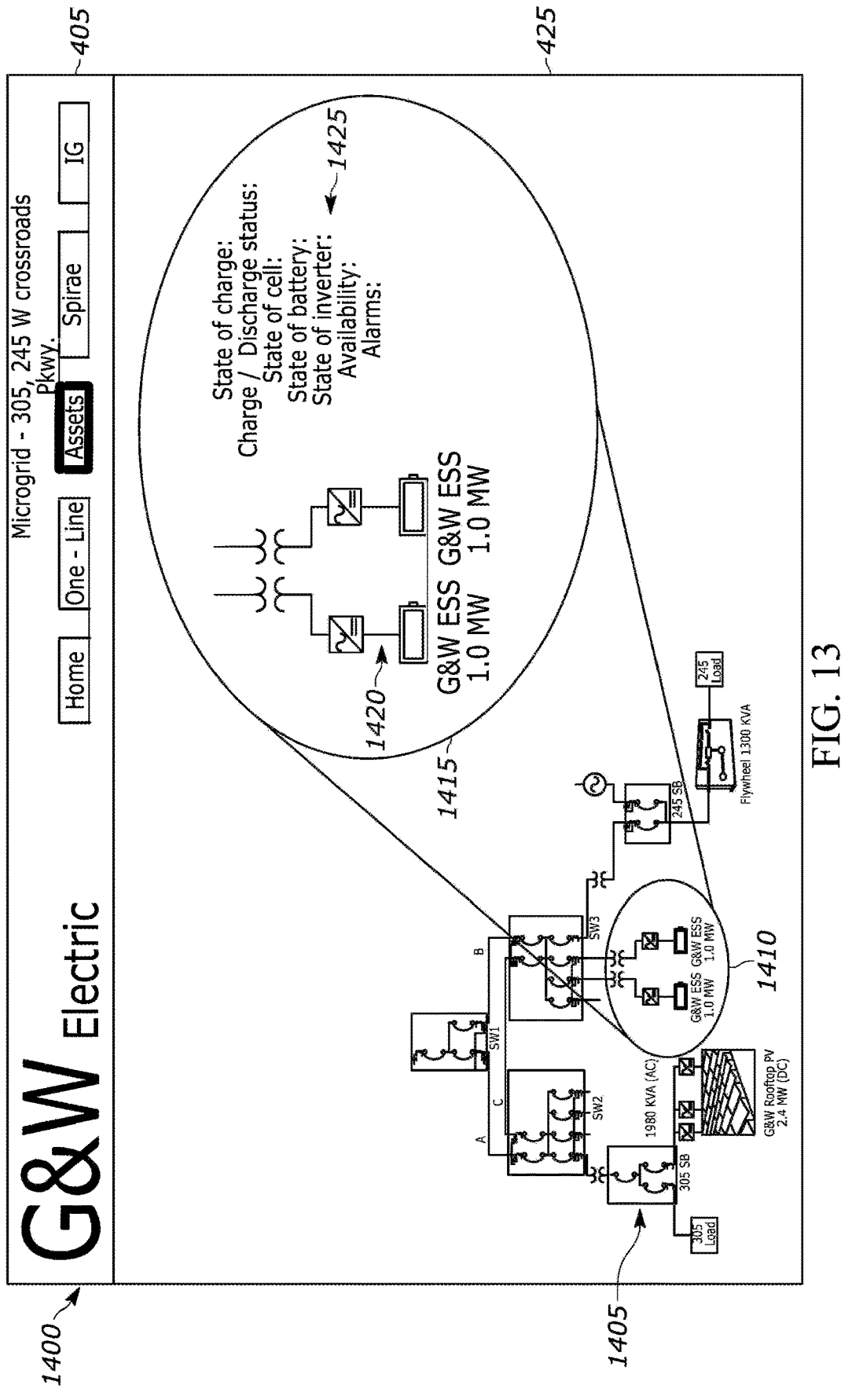
FIG. 13 is an example user interface for microgrid control software providing a BESS monitoring application, according to some aspects.

Returning to the user interface of the microgrid 100 provided by the monitoring module 315, upon a selection of the "Assets" button of the selection panel 405 and the "Battery" button of the secondary selection panel 415, a GUI 1400 illustrated by FIG. 13 is displayed. In the GUI 1400, the display panel 425 includes an icon 1405 representing the microgrid 100. The icon 1405 includes a highlighted portion 1410 highlighting the selected component(s) of the microgrid 100. The GUI 1400 additionally displays a battery detail window 1415. The battery detail window 1415 includes a detailed view 1420 of the first battery 150 and the second battery 155. The battery detail window 1415 also includes one or more data fields 1425 displaying data corresponding to the first battery 150 and the second battery 155, such as SOC, charge/discharge status, states of individual battery cells, states of individual battery units, states of inverters, availability, and alarms.

During a start-up phase of the microgrid 100, the first battery 150 and the second battery 155 may be in a disconnected state. FIG. 14 is a flowchart illustrating an example method 1500 of starting and connecting a BESS 1200. The method 1500 includes receiving a command from the microgrid controller 112 to reset and/or connect the BESS 1200 (BLOCK 1505). The method 1500 also includes activating auxiliary power of the BESS 1200 (BLOCK 1510). The method 1500 also includes automatically initializing a flow battery (FB) of the BESS 1200 (BLOCK 1515). The method 1500 also includes resetting the FB (BLOCK 1517). The method 1500 also includes receiving a command from the microgrid controller 112 to connect the FB (BLOCK 1520) and connecting the FB (BLOCK 1525). The method 1500 also includes starting a control loop of the PCS 1210 (BLOCK 1530). Once the control loop has begun, the BESS 1200 is in a connected state.

When connected, the microgrid controller 112 may determine to disconnect the first battery 150 or the second battery 155. FIG. 15 is a flowchart illustrating an example method 1600 of disconnecting a BESS 1200. The method 1600 begin and BLOCK 1605 and includes receiving a command from the microgrid controller 112 to disconnect the BESS 1200. The method 1600 also includes stopping the control loop of the PCS 1210 (BLOCK 1610) and disconnecting the FB (BLOCK 1615). Once the FB is disconnected, the BESS 1200 is in a disconnected state.

Figure 16:
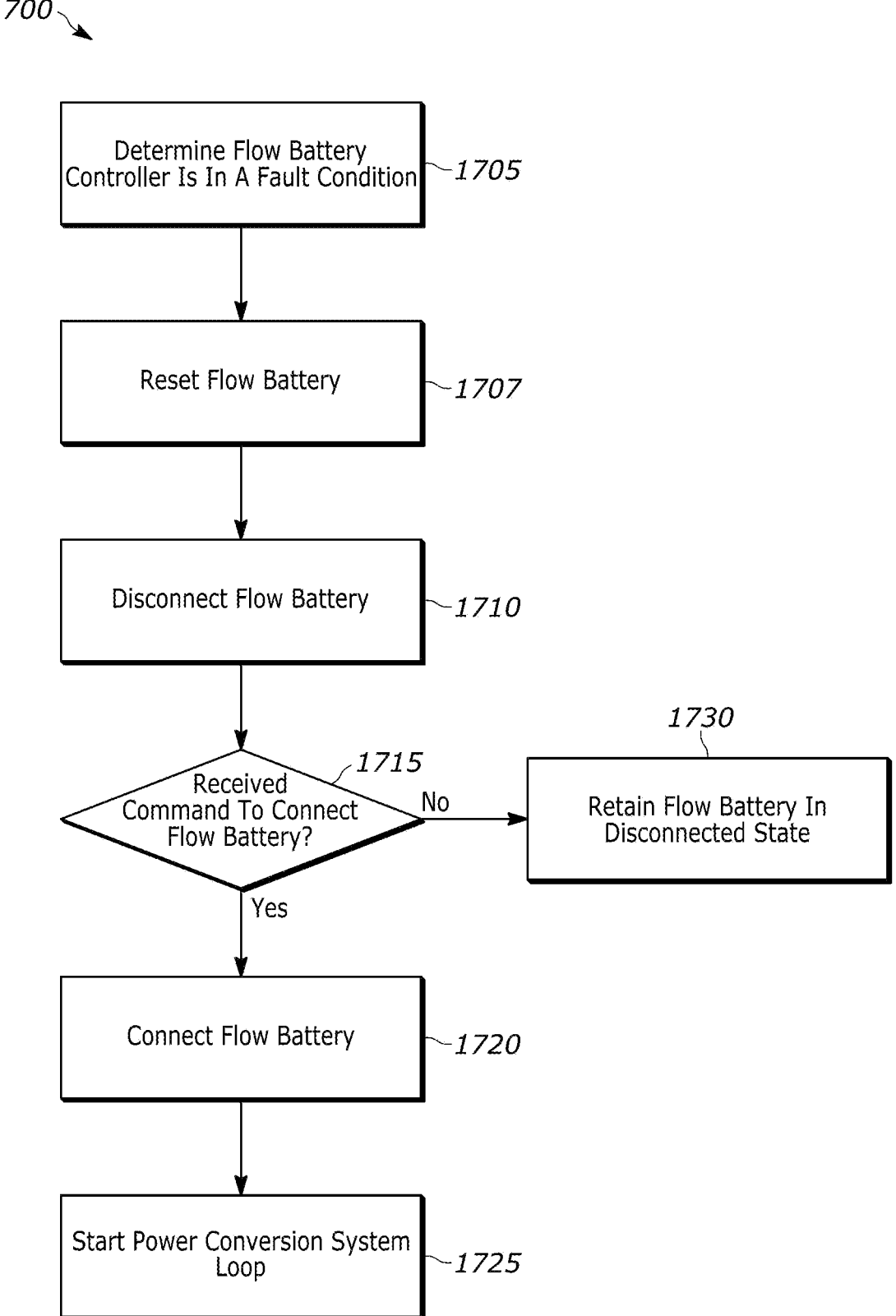
FIG. 16 is a flowchart illustrating a method of resetting a BESS to a connected state, according to some aspects.

The BESS 1200 may determine that the first battery 150 or the second battery 155 is in a fault condition. FIG. 16 is a flowchart illustrating an example method 1700 of resetting a BESS 1200 to a connected state following a fault condition. The method 1700 includes determining that the FB is in a fault condition (BLOCK 1705). The method 1700 also includes resting the FB (BLOCK 1707). The method 1700 also includes disconnecting the FB 1710. The method 1700 then includes determining whether a command has been received from the microgrid controller 112 to reconnect the FB (BLOCK 1715). If the command has been received, the method 1700 includes connecting the FB (BLOCK 1720). The method 1700 then includes starting the control loop of the PCS 1210 (BLOCK 1725). Once the control loop has begun, the BESS 1200 has been reset to a connected state. Returning to BLOCK 1715, if the command has not been received, the method 1700 includes retaining the FB in a disconnected state (BLOCK 1730). The BESS 1200 has then been reset to a disconnected state.

Figure 17:
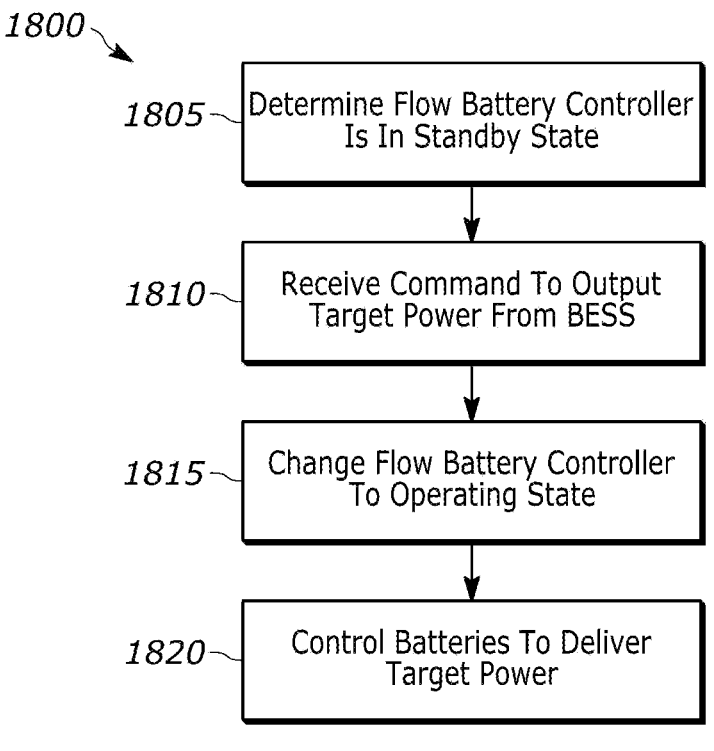
FIG. 17 is a flowchart illustrating a method of operating a BESS, according to some aspects.

Once the first battery 150 or the second battery 155 has been connected, it is in a standby mode. FIG. 17 is a flowchart illustrating an example method 1800 of operating a BESS 1200 from a standby mode. The method 1800 includes determining that the FBC is currently in a standby state (BLOCK 1805). The method 1800 also includes receiving a command from the microgrid controller 112 to output a target amount of power from the BESS 1200 (BLOCK 1810). The method 1800 also includes changing the FBC to an operating state (BLOCK 1815) and controlling one or more battery storage units 1225 of the BESS 1200 to deliver the target amount of power (BLOCK 1820).

Figure 18:
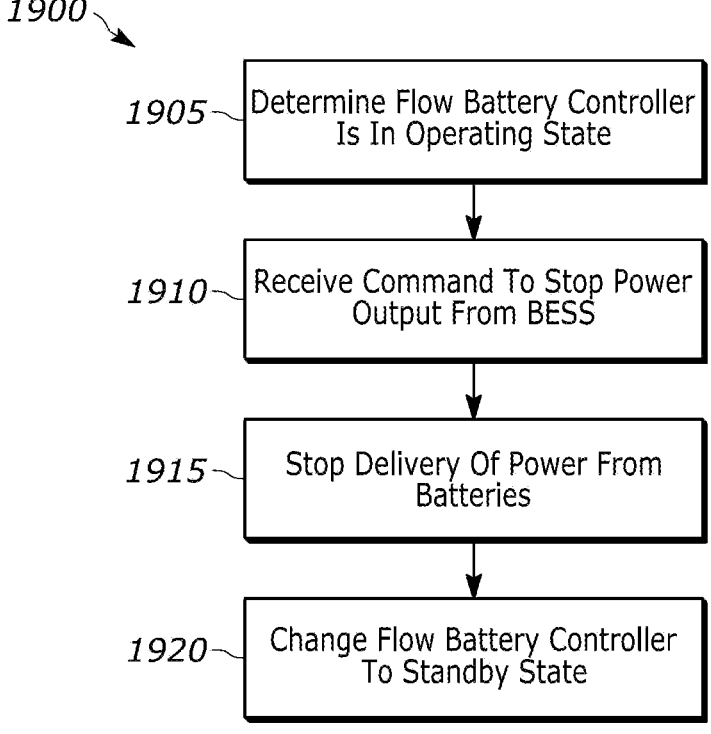
FIG. 18 is a flowchart illustrating a method of controlling a BESS to enter a standby mode, according to some aspects.

Alternatively, the microgrid controller 112 may determine that the first battery 150 or the second battery 155 is no longer needed to supply power. FIG. 18 is a flowchart illustrating an example method 1900 of controlling a BESS 1200 to enter a standby mode from an operating mode. The method 1900 includes determining that the FBC is in an operating state (BLOCK 1905). The method 1900 also includes receiving a command from the microgrid controller 112 to stop power output from the BESS 1200 (BLOCK 1910). A delivery of power from one or more battery storage units 1225 of the BESS 1200 is also stopped (BLOCK 1915). The method 1900 also includes changing the FBC to a standby state (BLOCK 1920).

Figure 19:
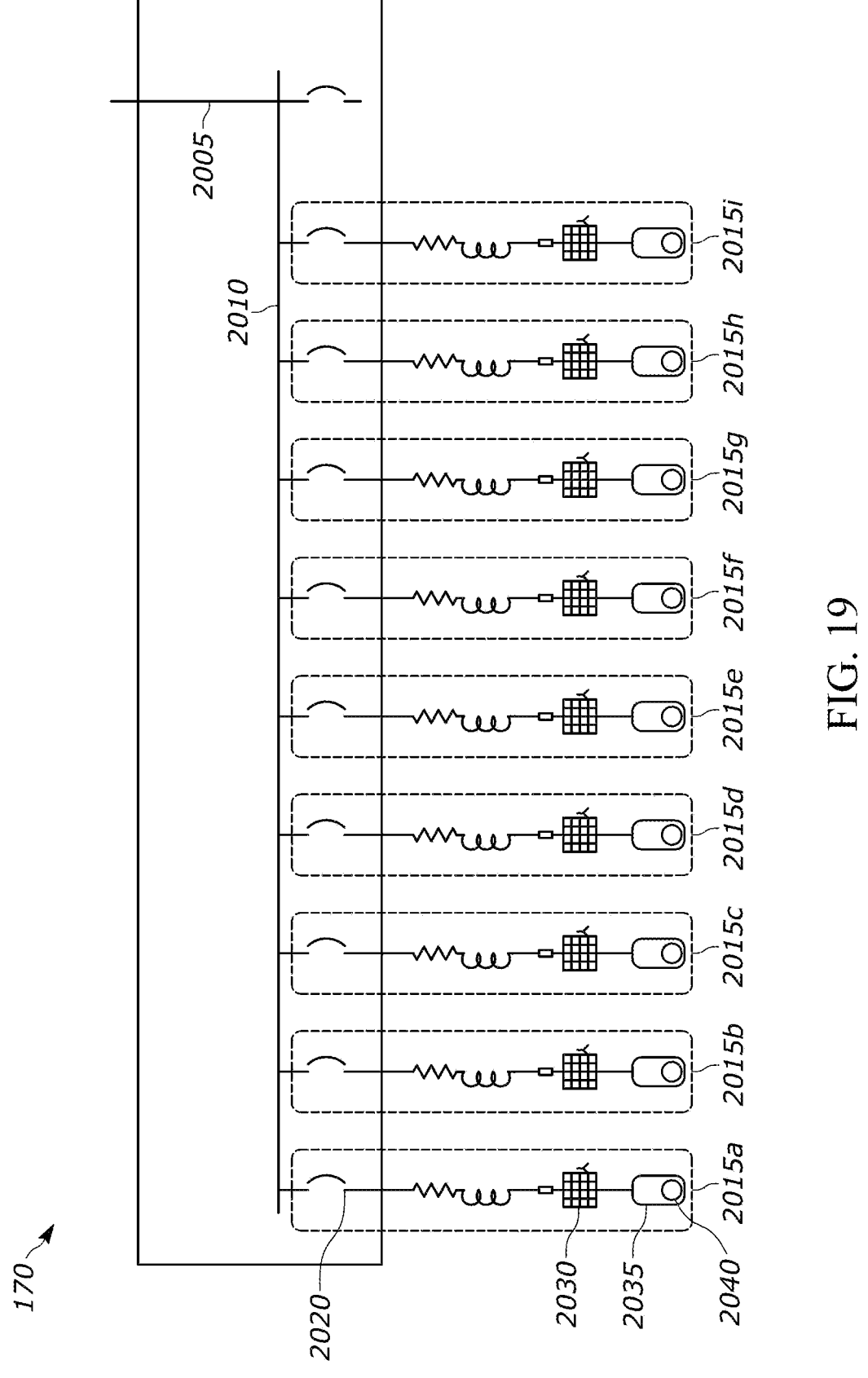
FIG. 19 is a circuit diagram of a PV panel array for use in a microgrid, according to some aspects.

As discussed previously, the microgrid 100 includes a PV array 170 connected to the second breaker 160 and configured to convert solar energy into electrical power. FIG. 19 is a circuit diagram of the PV array 170. The PV array 170 includes a connection cable 2005 for connecting the PV array 170 to the second breaker 160. In some cases, more than one connection cable is used. The connection cable 2005 is configured to transfer power collected in a main bus 2010 to the second breaker 160. At the second breaker 160, the power generated by the PV array 170 is transferred to the necessary components of the microgrid 100. One or more PV panel branches 2015 are connected in parallel to the main bus 2010. Each PV panel branch 2015 includes a switch 2020, an resistor-inductor (RL) series circuit 2025, a PV panel inverter 2030, and a PV panel 2035 connected in series. Furthermore, each PV panel 2035 includes a rapid shutdown module 2040 configured to perform a rapid shutdown process of the PV panel 2035. The rapid shutdown process allows the PV panel 2035 to be quickly and efficiently disconnected from the PV array 170 in the event of a fault or other harmful condition to prevent damage to the PV array 170 or the PV panel 2035. In the PV array illustrated by FIG. 19, the PV array 170 includes nine PV panel branches 2015a-i, but aspects with more or fewer PV panel branches 2015 are possible. In some instances, the microgrid 100 has one PV array 170. In other instances, the microgrid 100 has multiple PV arrays 170 connected to each other at the connection cable 2005.

Figure 20:
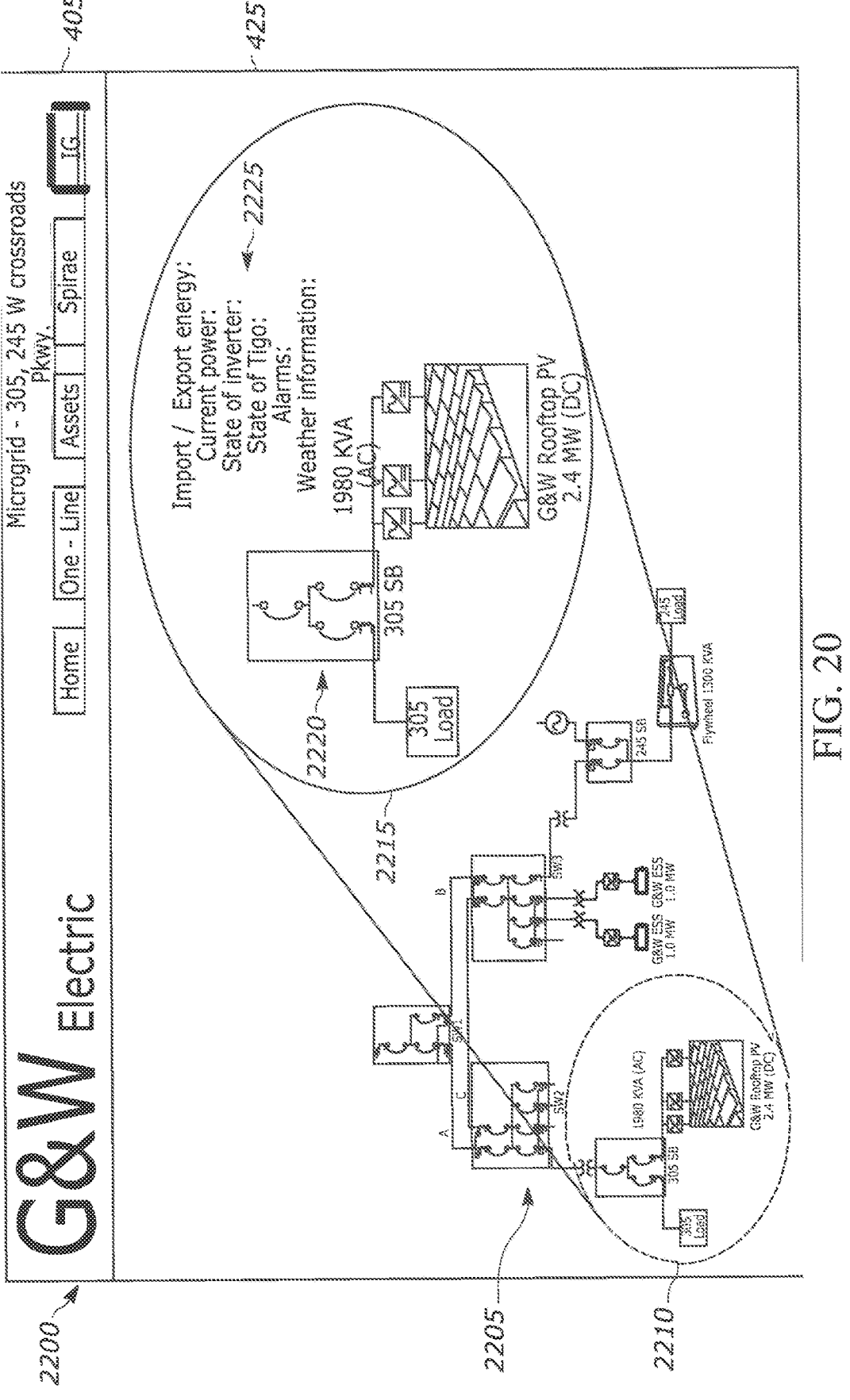
FIG. 20 is an example user interface for microgrid control software providing a PV panel monitoring application, according to some aspects.

Returning to the user interface of the microgrid 100 provided by the monitoring module 315, upon a selection of the "Assets" button of the selection panel 405 and the "Solar/PV" button of the secondary selection panel 415, a GUI 2200 illustrated by FIG. 20 is displayed. In the GUI 2200, the display panel 425 includes an icon 2205 representing the microgrid 100. The icon 2205 includes a highlighted portion 2210 highlighting the selected component(s) of the microgrid 100. The GUI 2200 additionally displays a PV array detail window 2215. The PV array detail window 2215 includes a detailed view 2220 of the PV array 170. The PV array detail window 2215 also includes one or more data fields 2225 displaying data corresponding to the PV array 170, such as import/export energy, current power, state of a rapid shutdown process, states of one or more inverters of the PV array 170, alarms, and weather information from a local weather station.

Figure 21:
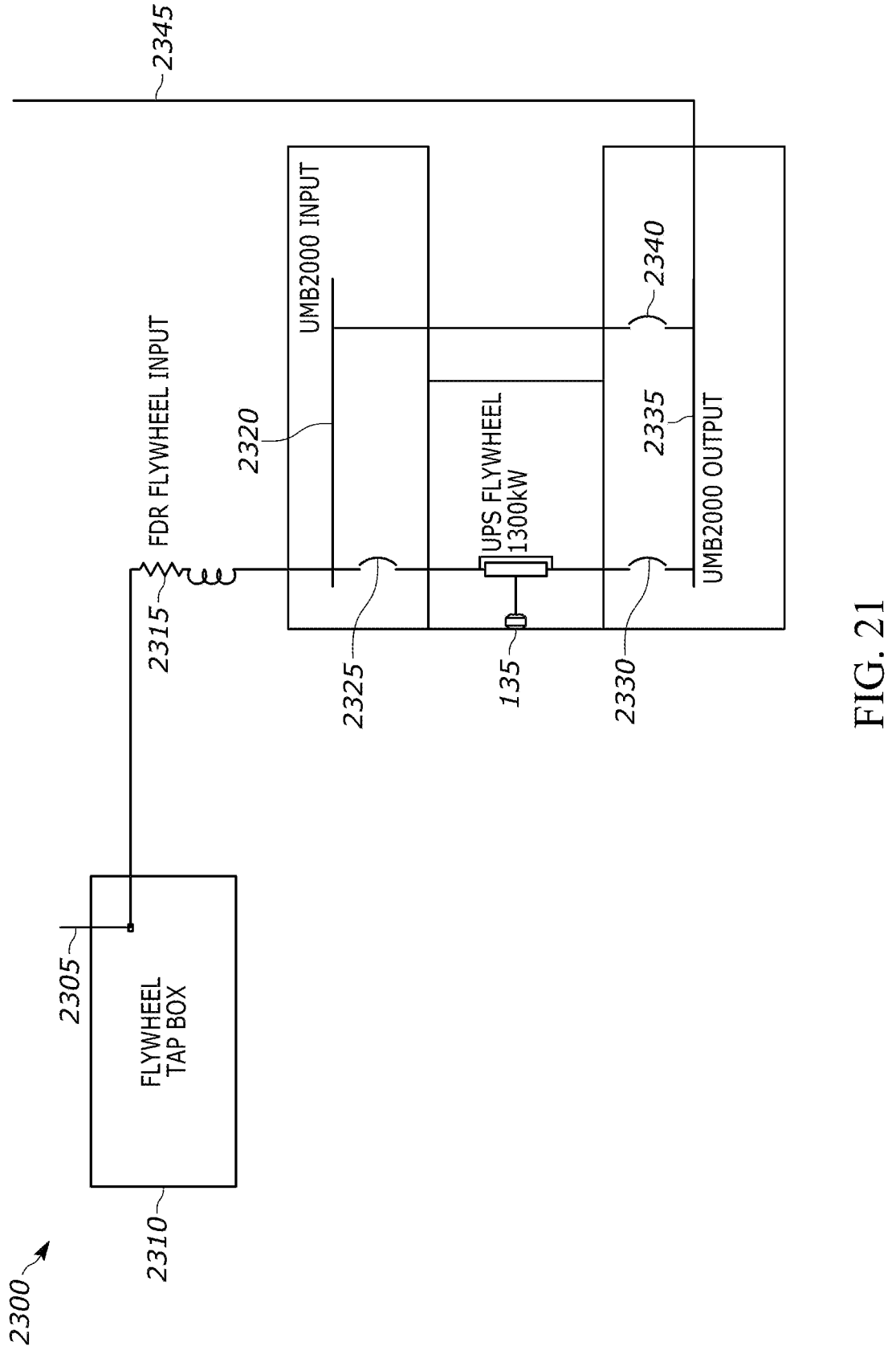
FIG. 21 is a schematic diagram of a flywheel for use in a microgrid, according to some aspects.

As noted previously, the microgrid 100 also includes a flywheel 135 connected to the first breaker 130 and configured to store power with a spinning mass. FIG. 21 is a schematic diagram of a flywheel connection circuit 2300. In the example shown, the flywheel connection circuit 2300 includes a connection cable 2305 connected to the first breaker 130. In some instances, the connection cable 2305 connects to a flywheel tap box 2310. The flywheel tap box 2310 connects to a flywheel input 2315 configured to allow connection to an input bus 2320 of the flywheel connection circuit 2300. A first switch 2325 is connected to the input bus 2320. The first switch 2325 is configured to selectively connect the input bus 2320 to the flywheel 135. The flywheel 135 is in turn connected to a second switch 2330 configured to selectively connect the flywheel 135 to an output bus 2335. Additionally, the input bus 2320 and the output bus 2335 are connected by a bypass switch 2340. The bypass switch 2340 is configured to provide a bypass path for power flowing though the flywheel connection circuit 2300, should the flywheel 135 be unneeded. An output cable 2345 is connected to the output bus 2335. The output cable 2345 is configured to connect the flywheel connection circuit 2300 to the first load 140.

Figure 22:
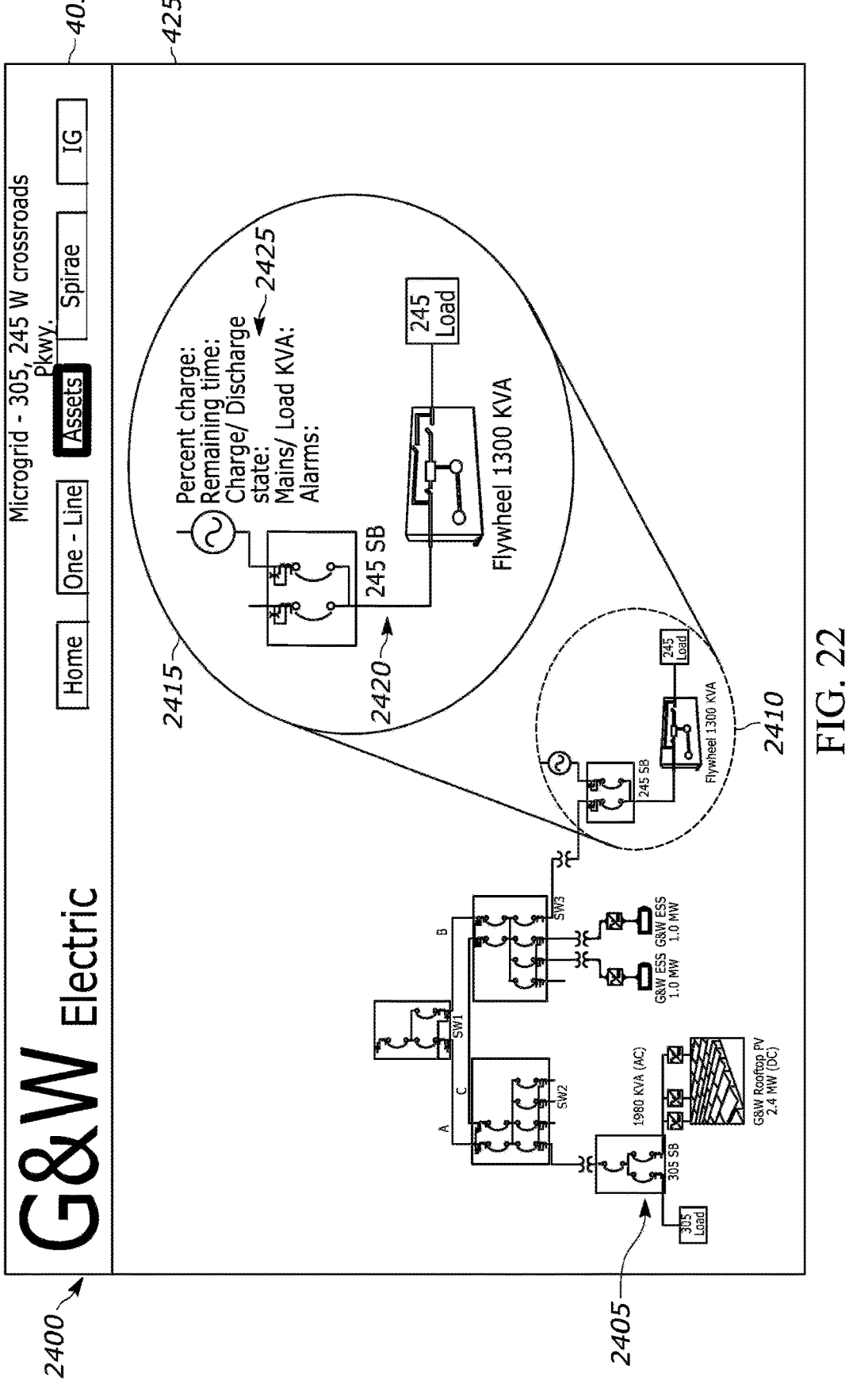
FIG. 22 is an example user interface for microgrid control software providing a flywheel monitoring application, according to some aspects.

Returning to the user interface of the microgrid 100 provided by the monitoring module 315, upon a selection of the "Assets" button of the selection panel 405 and the "Flywheel" button of the secondary selection panel 415, a GUI 2400 illustrated by FIG. 22 is displayed. In the example GUI 2400, the display panel 425 includes an icon 2405 representing the microgrid 100. The icon 2405 includes a highlighted portion 2410 highlighting the selected component(s) of the microgrid 100. The GUI 2400 additionally displays a flywheel detail window 2415. The flywheel detail window 2415 includes a detailed view 2420 of the flywheel 135. The flywheel detail window 2415 also includes one or more data fields 2425 displaying data corresponding to the flywheel 135, such as percent charge, remaining time, charge/discharge state, mains/load kVA, and alarms.

Figure 23:
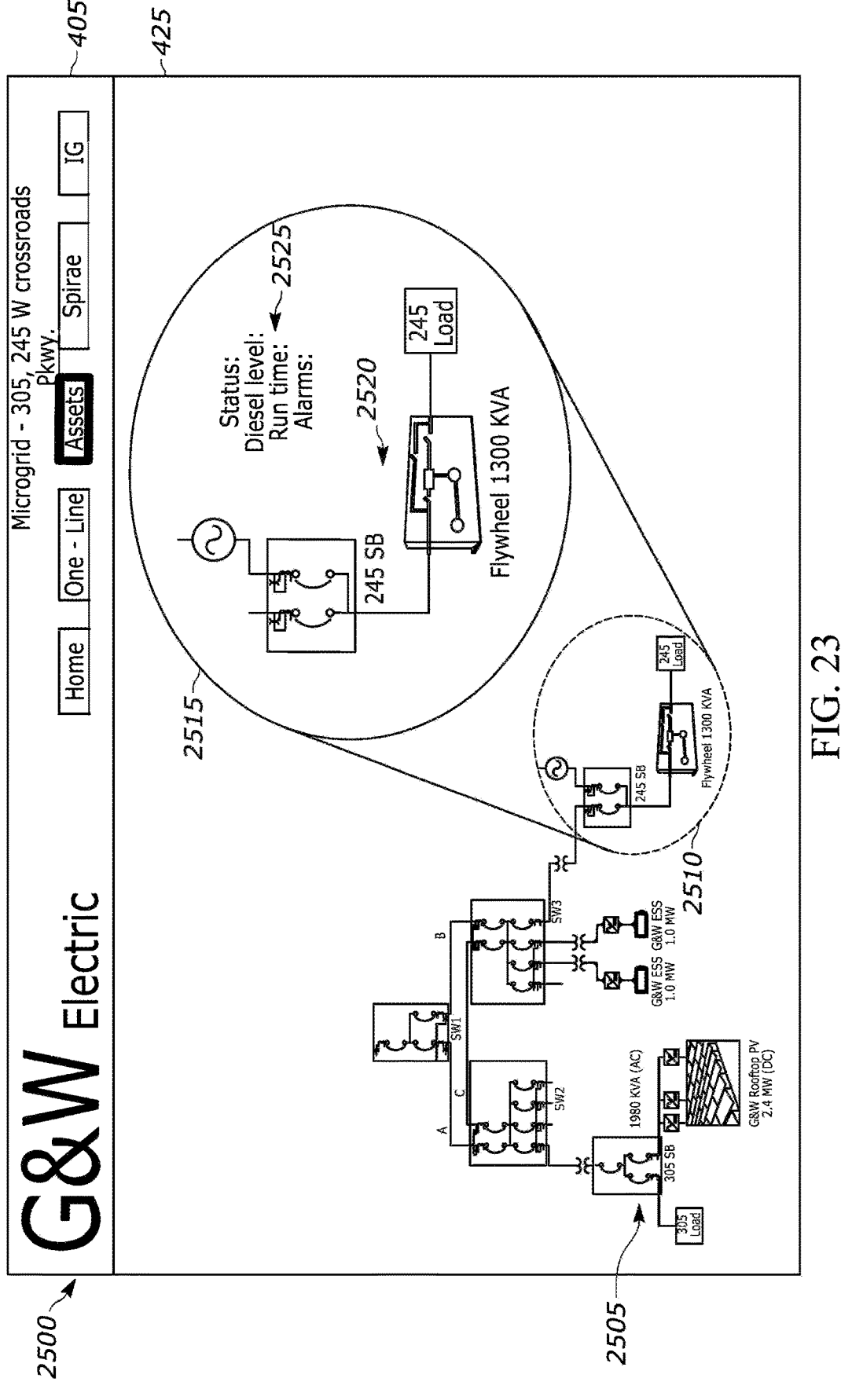
FIG. 23 is an example user interface for microgrid control software providing a generator monitoring application, according to some aspects.

Alternatively, upon a selection of the "Assets" button of the selection panel 405 and the "Generator" button of the secondary selection panel 415, a GUI 2500 illustrated by FIG. 23 is displayed. In the example GUI 2500, the display panel 425 includes an icon 2505 representing the microgrid 100. The icon 2505 includes a highlighted portion 2510 highlighting the selected component(s) of the microgrid 100. The GUI 2500 additionally displays a generator detail window 2515. The generator detail window 2515 includes a detailed view 2520 of the generator 145. The generator detail window 2515 also includes one or more data fields 2525 displaying data corresponding to the generator 145, such as status, diesel (or other fuel) level, run time, and alarms.

As noted previously, the microgrid 100 includes a microgrid controller 112 configured to generate control signals for controlling various components of the microgrid 100. The microgrid controller 112 may include an electronic processor and a memory, the memory storing instructions for directing the microgrid controller 112 to perform various operations. In some instances, the operations are performed automatically by the microgrid controller 112 based on data received by the microgrid controller 112 from the components of the microgrid 100. In other instances, the operations are performed by the microgrid controller 112 upon receiving an instruction from an operator of the microgrid 100 via a user interface (such as the user interface generated by the monitoring module 315). In either instance, the microgrid controller 112 is configured to control the components of the microgrid 100 to transition between operating modes. FIGS. 24-38 include flowcharts illustrating example methods of controlling the microgrid 100. These methods may be implemented by the microgrid controller 112. Although the methods are described in conjunction via the microgrid 100 and microgrid controller 112 as described herein, the methods could be used with other systems and devices. In addition, the methods may be modified or performed differently than the specific examples provided.

As an example, methods may be described as being performed by the microgrid controller 112. However, it should be understood that, in some aspects of the invention, portions of the methods may be performed by other devices, including for example, the prediction module 310. Additional electronic processors may also be included in the microgrid 100 (such as a controller for the PV array 170, a controller for the first breaker 130, a controller for the second breaker 160, or the like) that perform all or a portion of the methods.

Figure 24:
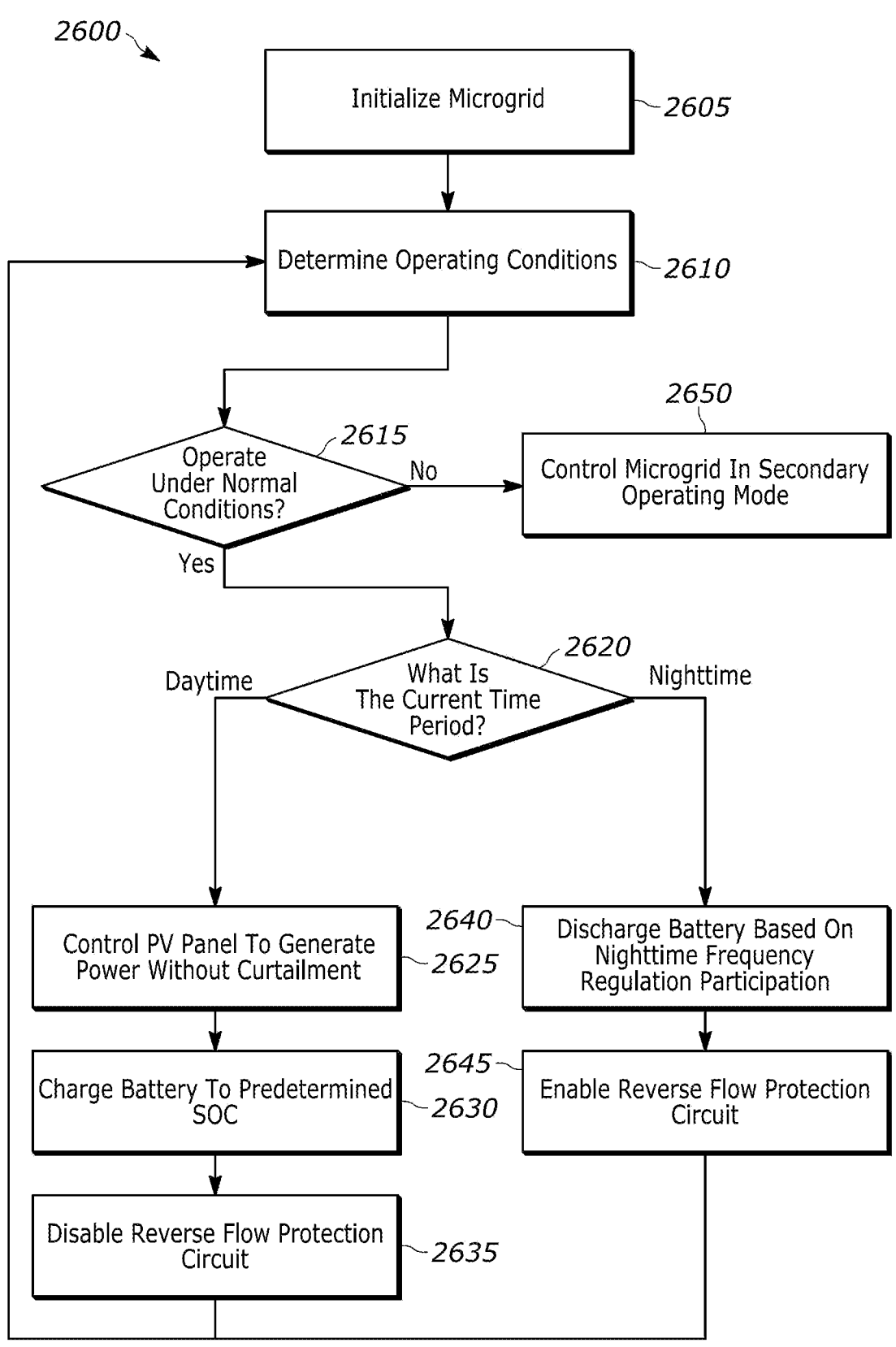
FIG. 24 is a flowchart illustrating a method of controlling a microgrid, according to some aspects.
Figure 25:
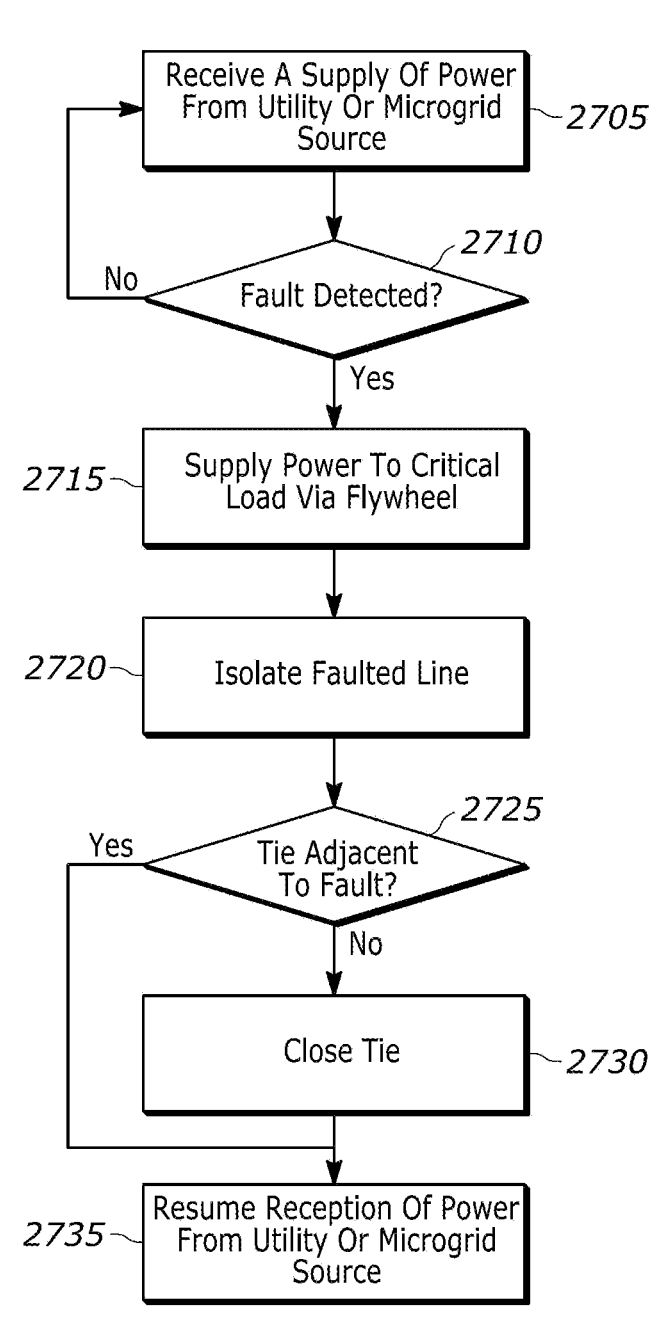
FIG. 25 is a flowchart illustrating a method of controlling a microgrid to perform a fault location, isolation, and service restoration (FLISR) operation, according to some aspects.
Figure 26:
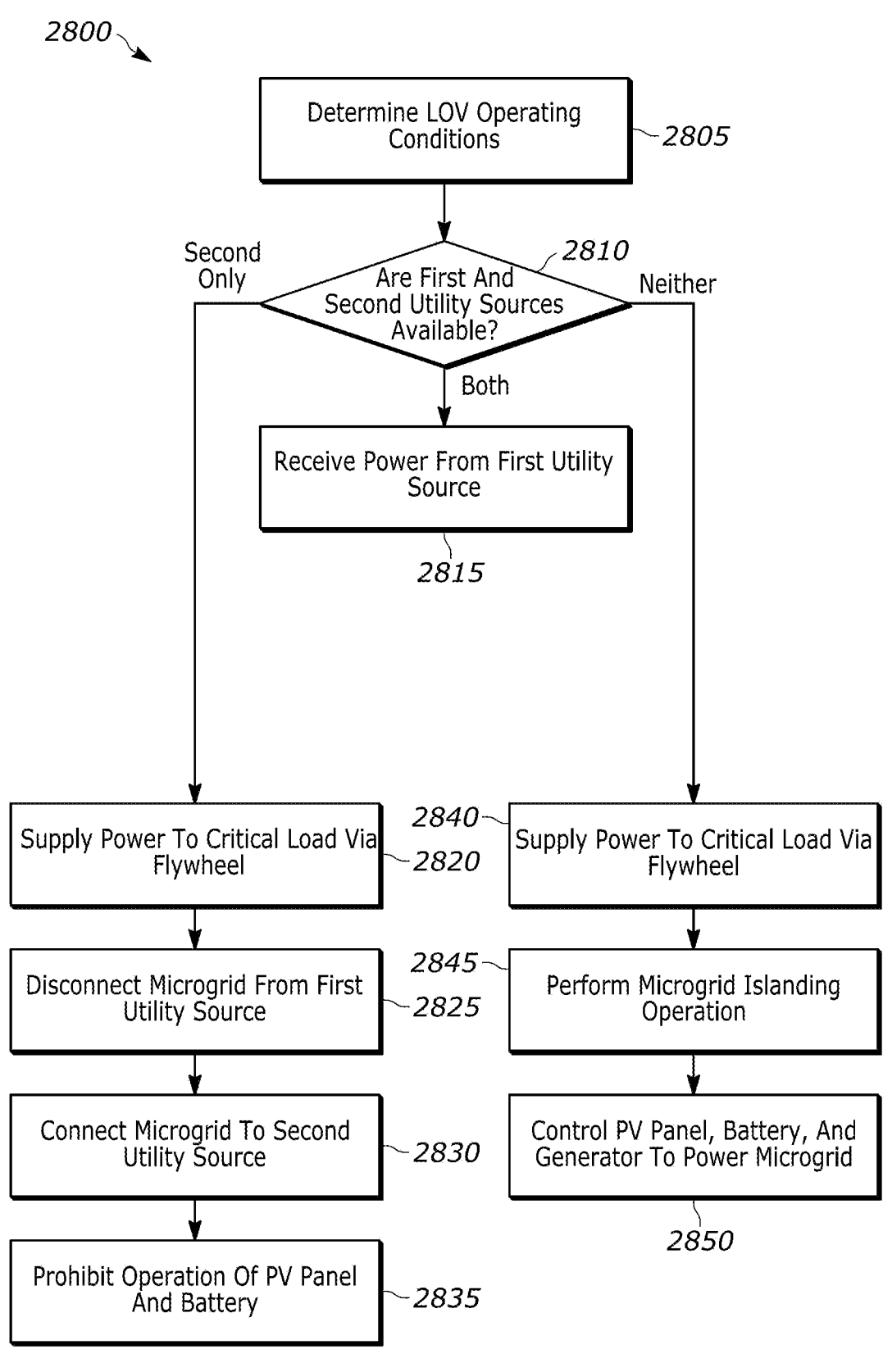
FIG. 26 is a flowchart illustrating a method of controlling a microgrid to perform a loss of utility source identification, isolation, and service restoration (LOV) operation, according to some aspects.

Under normal operating conditions, the microgrid controller 112 may control the microgrid 100 to operate in a normal operating mode, as described an example method 2600 illustrated by the flowchart of FIG. 24. The method 2600 includes initializing the microgrid 100 (BLOCK 2605). Initializing the microgrid 100 includes activating one or more essential components of the microgrid 100 and connecting the one or more essential components to the microgrid controller 112. The method 2600 also includes determining operating conditions of the microgrid 100 (BLOCK 2610). Determining the conditions is based on data received at the microgrid controller 112 from the connected components, as well as data received from the prediction module 310. The method 2600 also includes determining whether the operating conditions are normal (BLOCK 2615). Normal operating conditions are conditions in which no faults are detected within the microgrid 100, and power is being received from the utility source 105. Additionally, the microgrid controller 112 determines that no secondary operating modes (such as a peak load reduction mode, a peak load shedding mode, a PV maximization mode, an uptime maximization mode, or the like) based on data received from the prediction module 310. The microgrid controller 112 may further receive a command inputted manually at the monitoring module 315 to operate in a secondary operating mode.

If operating under normal conditions, the method 2600 includes determining a current time period (BLOCK 2620). The time period is determined to be a daytime period or a nighttime period based on available light (market participation). For example, if the prediction module disables market participation if the PV array 170 produces greater than 5% of a maximum production value, the microgrid controller 112 determines that it is a daytime period. If the prediction module enable market participation If the PV array 170 produces less than 5% of a maximum production value, the microgrid controller 112 determines that it is a nighttime period. During a daytime period, the method 2600 includes controlling the PV array 170 to generate power without any curtailment (BLOCK 2625). The method also includes charging the first battery 150 and/or the second battery 155 to a predetermined SOC (2630). The method 2600 also includes disabling a reverse flow protection circuit (BLOCK 2635).

Returning to block 2620, during a nighttime period, the method 2600 instead includes discharging the first battery 150 and/or the second battery 155 based on a nighttime frequency regulation participation (BLOCK 2640). The method 2600 also includes enabling the reverse flow protection circuit (BLOCK 2645). Returning to block 2625, if the operating conditions are not normal, the method 2600 includes controlling the microgrid 100 in a secondary operating mode (BLOCK 2650). Potential secondary operating modes are described with respect to FIGS. 25-28, 28-31, 34, 36, and 38.

In some instances, the microgrid 100 operates under a fault interruption, location, isolation, and service restoration (FLISR) condition. In these instances, the microgrid controller 112 controls the microgrid 100 by an example method 2700 illustrated by a flowchart of FIG. 25. FLISR conditions are conditions in which a fault is detected in the microgrid 100. The method 2700 includes receiving a supply of power from the utility source 105 (BLOCK 2705). The method 2700 also includes determining whether a fault is detected (BLOCK 2710). If a fault is not detected, the method 2700 returns to block 2705. Otherwise, the method 2700 includes supply power to a critical load (such as the first load 140) via the flywheel 135 (BLOCK 2715). Power may be supplied by the flywheel for up to sixty seconds. The method 2700 also includes isolating the faulted line (BLOCK 2720). The method 2700 also determines whether a tie is adjacent to the faulted line (BLOCK 2725). If so, the method 2700 includes closing the tie (BLOCK 2730) and resuming reception of power from the utility source (BLOCK 2735). Otherwise, the method 2700 only includes resuming reception of power from the utility source or microgrid source (BLOCK 2735).

In some instances, the microgrid 100 operates under a loss-of-voltage (LOV) condition. In these instances, the microgrid controller 112 controls the microgrid 100 by an example method 2800 illustrated by a flowchart of FIG. 26. LOV conditions are conditions in which the utility source 105 has stopped providing power for more than 4 milliseconds. Upon determining LOV conditions (BLOCK 2805), the method 2800 includes determining which of a first source of the utility source 105 and a second source of the utility source 105 are available (BLOCK 2810). If both sources are available, the method 2800 includes receiving power from the first source (BLOCK 2815).

If only the second source is available, the method includes supplying power to a critical load (such as the first load 140) via the flywheel (BLOCK 2820). The flywheel may provide power for up to 60 seconds. The method 2800 also includes disconnecting the microgrid 100 from the first source (BLOCK 2825). The method 2800 also includes connecting the microgrid to the second utility source (BLOCK 2830). The method 2800 also includes prohibiting operation of the PV array 170, the first battery 150, and the second battery 155 (BLOCK 2835). Returning to block 2810, if neither source is available, the method 2800 includes supplying power to a critical load (such as the first load 140) via the flywheel (BLOCK 2840). The flywheel may provide power for up to 60 seconds. The method 2800 includes performing a microgrid islanding operation to disconnect the microgrid 100 from the utility source 105 (BLOCK 2845). The method 2800 also includes controlling the PV array 170, the first battery 150, the second battery 155, and the generator 145 to power the microgrid 100 (BLOCK 2850).

In some instances, the microgrid controller 112 may island the microgrid 100 to disconnect it from the utility source 105. Islanding the microgrid 100 is performed by an example method 2900 described by a flowchart illustrated by FIG. 27. The method 2900 includes receiving power from the utility source 105 (BLOCK 2905) (that is, operating under normal conditions). The method 2900 includes receiving a command to island the microgrid 100 (BLOCK 2910). The method 2900 also includes controlling the PV array 170, the first battery 150, and the second battery 155 to power the microgrid 100 (BLOCK 2925). The method 2900 also includes providing power from the microgrid to at least one critical load (such as the first load 140) and one non-critical load (such as the second load 165). The method 2900 also includes disconnecting the microgrid 100 from the utility source 105 (BLOCK 2940). The microgrid 100 is disconnected at the first switchgear 115.

Figures 27, 28:
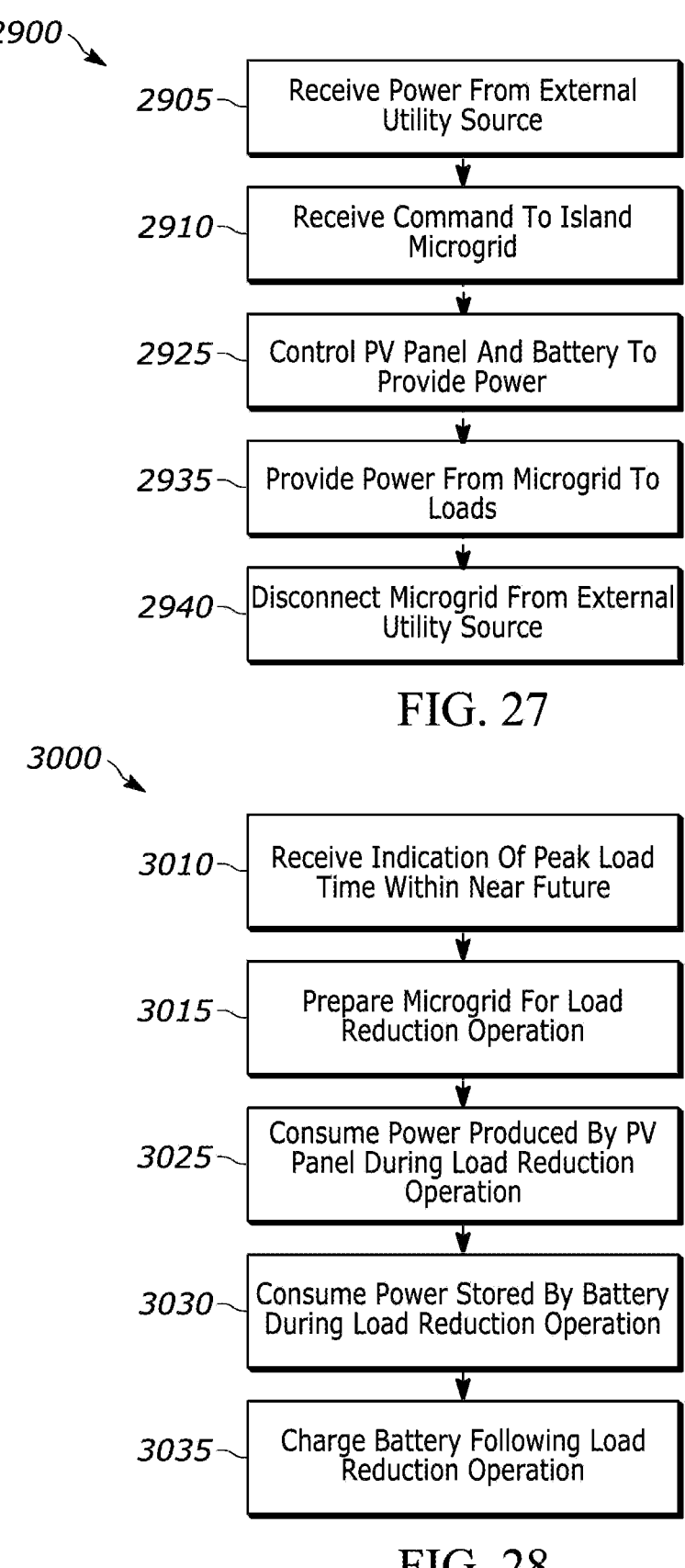
FIG. 27 is a flowchart illustrating a method of controlling a microgrid to perform an islanding operation, according to some aspects.
FIG. 28 is a flowchart illustrating a method of controlling a microgrid to reduce energy consumption during a capacity and/or transmission peak load period, according to some aspects.

As noted previously, in some instances the owner of the microgrid 100 may only be charged by an owner of the utility source 105 for power consumed from the utility source 105 on several peak-load days. Therefore, it is beneficial to predict when peak-load days are approaching and control the microgrid 100 to limit power consumed on the peak-load days. FIG. 28 is a flowchart illustrating an example method 3000 of controlling the microgrid 100 to reduce energy consumption during a peak load day. The method 3000 includes receiving a peak load alert within a near future period (BLOCK 3010). The alert may be received by the microgrid controller 112. The method 300 also includes preparing the microgrid 100 for a load reduction operation to occur during the near future period (BLOCK 3015). The method 3000 also includes consuming power produced by the PV array 170 (BLOCK 3025) and consuming power stored in the first battery 150 and the second battery 155 (BLOCK 3030) to reduce a total power consumed by the microgrid 100 to an acceptable level during the load reduction operation. Once the load reduction operation has finished, the method 3000 includes charging the first battery 150 and the second battery 155 back to a predetermined SOC.

Similarly, in some instances the microgrid controller 112 may determine that it is necessary to shed a peak load based on a request from the owner of the utility source 105. FIG. 29 is a flowchart illustrating an example method 3100 of controlling the microgrid 100 to shed a peak load. The method 3100 includes receiving an instruction from an owner of the utility source 105 to reduce the peak load over a predetermined period of time (BLOCK 3105). In some instances, the predetermined period of time is one day. The method 3100 also includes scheduling a load reduction operation during a peak load shedding period (BLOCK 3110). The method 3100 also includes preparing one or more components of the microgrid for the load reduction operation (BLOCK 3115). Preparing the components may include charging the first battery 150 and/or the second battery 155 to a SOC. The method 3100 also includes estimating an amount of power that will be produced by the PV array 170 during the peak load shedding period (BLOCK 3120). The amount of power is estimated based on forecasted irradiance conditions and forecasted weather conditions. The method 3100 also includes reducing the load of the microgrid 100 to an acceptable load use value by consuming the power produced by the PV array 170 (BLOCK 3125) and consuming the power stored by the first battery 150 and/or the second battery 155 (BLOCK 3130) during the peak load shedding period. Once the peak load shedding period has finished, the method 3100 includes charging the first battery 150 and/or the second battery 155 to the maximum SOC.

Figure 30A:
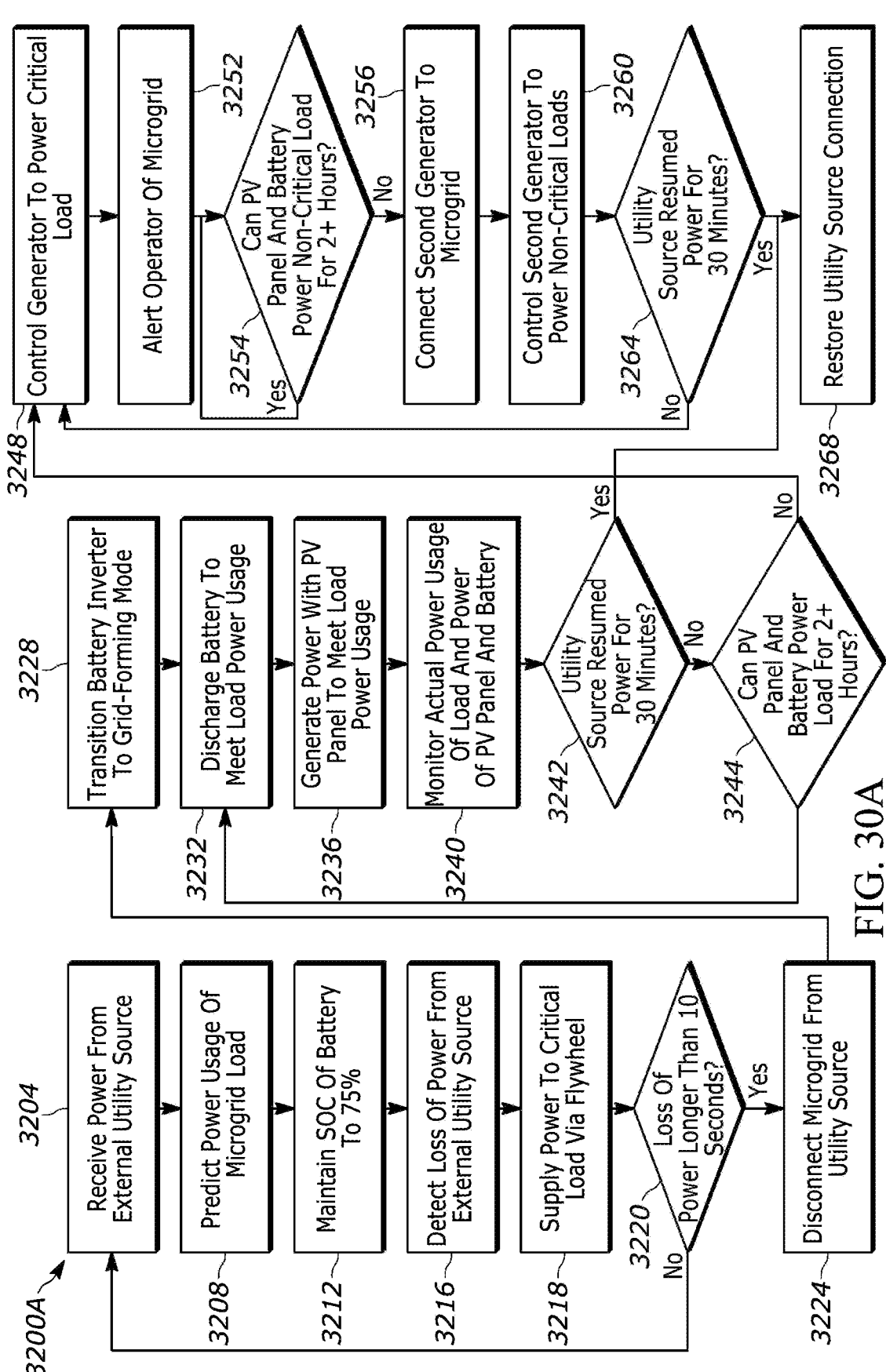

In some instances, power from the utility source 105 may become completely unavailable. In these instances, the loads of the microgrid 100 may need power restored within thirty seconds. FIG. 30A is a flowchart illustrating an example method 3200A of controlling the microgrid 100 to transition to a self-sustaining state during an unplanned power outage. The method 3200A includes receiving power from the utility source 105 under normal conditions (that is, the method 2600) (BLOCK 3204). The method 3200A includes preparing for an unplanned outage by predicting power usages for the first load 140 and the second load 165 (BLOCK 3208) and maintaining the SOC of the first battery 150 and the second battery 155 at 75% (BLOCK 3212). The method 3200A also includes detecting, via the relay 220a of the first switchgear 115, that power from the utility source 105 has been lost (BLOCK 3216). The method 3200A also includes supplying power to a critical load of the microgrid via the flywheel (BLOCK 3218). The method 3300 also includes determining whether the power has been lost for longer than ten seconds (BLOCK 3220). If the power has been lost for less than ten seconds, the method 3200A returns to block 3204. Otherwise, if the power has been lost for at least ten seconds, the method 3200A includes disconnecting the microgrid 100 from the utility source 105 (for example, by the method 2900) (BLOCK 3224).

Once the microgrid 100 has successfully islanded, the method 3200A includes transitioning at least one inverter 1215 of the first battery 150 or the second battery 155 to a grid-forming mode (BLOCK 3228). The method 3200A also includes discharging the first battery 150 and/or the second battery 155 to meet the load power usages of the microgrid 100 (BLOCK 3232). The method 3200A also includes generating power via the PV array 170 to meet the load power usages of the microgrid 100 (BLOCK 3236). The method 3200A also includes monitoring an actual load power usage of the microgrid 100, an actual amount of power generated by the PV array 170, and an amount of power left in the first battery 150 and the second battery 155 (BLOCK 3240). The method 3200A also includes determining whether the utility source 105 has resumed power for thirty minutes (BLOCK 3242). If so, the method 3200A proceeds directly to block 3268. Otherwise, the method 3200A proceeds to block 3244. The method 3200A then includes determining whether the PV array 170, the first battery 150, and the second battery 155 can meet the load requirements for at least two hours (BLOCK 3244). If so, the method 3200A returns to block 3232.

If the PV array 170, the first battery 150, and the second battery 155 cannot meet the load requirements for at least two hours, the method 3200A includes generating power with the generator 145 to meet the predicted power usage of a critical load (such as the first load 140) (BLOCK 3248). The method 3200A also includes alerting an operator of the microgrid 100 that the PV array 170, the first battery 150, and the second battery 155 can only support the microgrid 100 for two hours (BLOCK 3252). The alert may include an instruction to connect a secondary generator to the microgrid 100. The method 3200A also includes determining whether the PV array 170, the first battery 150, and the second battery 155 can meet the load requirements for at least two hours (BLOCK 3254). If so, the method 3200A repeats block 3254. Otherwise, the method 3200A also includes connecting the secondary generator to the microgrid 100 (BLOCK 3256). The method 3200A also includes generating power with the secondary generator to meet the predicted power usage of a non-critical load (such as the second load 165). The method 3200A also includes determining whether power from the utility source 105 has resumed for at least thirty minutes (BLOCK 3264). This determination may be based on the relay 220a of the first switchgear 115. If power from the utility source 105 has resumed for at least thirty minutes, the method 3200A includes restoring a connection to the utility source 105 (BLOCK 3268). Otherwise, the method 3200A returns to block 3248.

If one or more loads of the microgrid 100 are powered by power stored in the first battery 150 and/or the second battery 155, the method 3200A is continued in an example method 3200B described by a flowchart illustrated by FIG. 30B. The method 3200B describes the process for restoring a connection to the utility source 105 from block 3268. The method 3200B includes verifying that the flywheel 135 can generate enough power to power the critical load (such as the first load 140) for at least thirty seconds (BLOCK 3272). The method 3200B also includes biasing a frequency of the first battery 150 and/or the second battery 155 such that the frequency is faster than a frequency of the utility source 105 (BLOCK 3276). The method 3200B also includes sending an instruction to the relay 220a of the first switchgear 115 to prepare to close the first switchgear 115 (BLOCK 3280). The method 3200B also includes monitoring a voltage and the frequency of the utility source 105 via the relay 220a (BLOCK 3284). The method 3200B also includes determining whether the voltage and frequency are within a predetermined threshold (BLOCK 3288). If not, the method 3200B returns to block 3284. Otherwise, the method 3200B includes closing the first switchgear 115 (BLOCK 3292). The method 3200B also includes transitioning at least one inverter 1215 of the first battery 150 or the second battery 155 to a grid-following mode (BLOCK 3296). The method 3200B also includes connecting the critical load to the utility source 105 (BLOCK 3298).

Figure 30C:
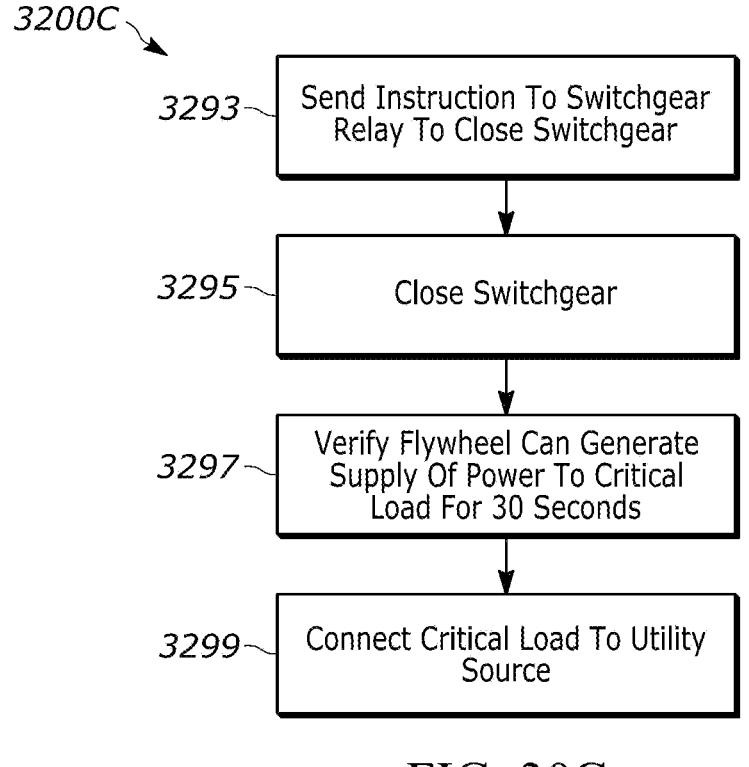
Figure 32:
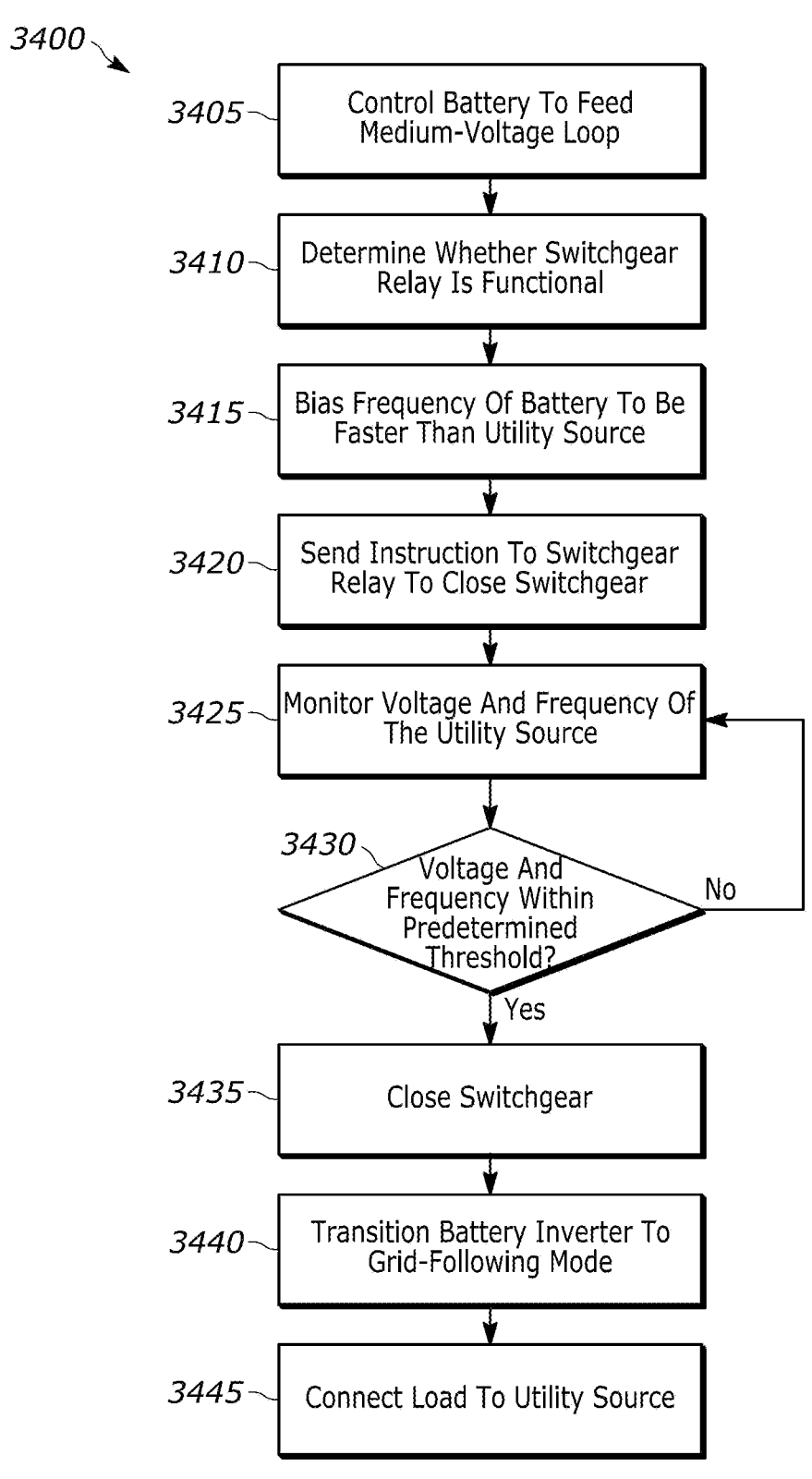
FIG. 32 is a flowchart illustrating a method of controlling a microgrid to reconnect to an external utility source, according to some aspects.

Returning to block 3268 of the method 3200A, if all loads of the microgrid 100 are powered by generators connected to the microgrid 100, the method 3200A is continued in an example method 3200C described by a flowchart illustrated by FIG. 30C. The method 3200C describes the process for restoring a connection to the utility source 105 from block 3268. The method 3200C includes sending an instruction to the relay 220a of the first switchgear 115 to prepare to close the first switchgear 115 (BLOCK 3293). The method 3200C also includes closing the relay 220a of the first switchgear 115 (BLOCK 3295). The method 3200C also includes verifying whether the flywheel 135 can generate a supply of power to the critical load for 30 seconds (BLOCK 3297). The method 3200C also includes connecting the critical load to the utility source 105 (BLOCK 3299).

The method 3200A occurs in some instances. In other instances, the microgrid 100 transitions to a self-sustaining state during an unplanned power outage according to an example method 3300 described by a flowchart illustrated in FIG. 31. The method 3300 includes receiving power from the utility source 105 under normal conditions (that is, the method 2600) (BLOCK 3305). The method 3300 includes preparing for an unplanned outage by predicting power usages for the first load 140 and the second load 165 (BLOCK 3310) and maintaining the SOC of the first battery 150 and the second battery 155 at 75% (BLOCK 3315). The method 3300 also includes determining whether a planned islanding operation is allowed (BLOCK 3325). This determination may be based on an identity of the utility source 105, the SOC of the first battery 150 and/or the second battery 155, a peak load contribution (PLC), an islanding permission, and an alarm state of the first battery 150, the second battery 155, the generator 145, and the first switchgear 115. The method 3300 includes islanding the microgrid 100 (for example, by the method 2900) (BLOCK 3335).

Once the microgrid 100 has successfully islanded, the method 3300 includes transitioning at least one inverter 1215 of the first battery 150 or the second battery 155 to a grid-forming mode (BLOCK 3340). The method 3300 also includes discharging the first battery 150 and/or the second battery 155 to meet the predicted load power usages of the microgrid 100 (BLOCK 3345). The method 3300 also includes generating power with the PV array 170 to meet the predicted load power usages of the microgrid 100 (BLOCK 3350). The method 3300 also includes monitoring an actual load power usage of the microgrid 100, an actual amount of power generated by the PV array 170, and an amount of power left in the first battery 150 and the second battery 155 (BLOCK 3355). The method 3360 also includes determining whether the microgrid 100 has islanded for at least five minutes (BLOCK 3360). If the microgrid has not islanded for five minutes, the method 3300 returns to block 3345. In some embodiments, the method 3300 may include receiving a command to reconnect the microgrid 100 to the utility source in place of or in addition to BLOCK 3360). Otherwise, the method 3300 includes attempting to restore utility source connection (BLOCK 3365). This may be accomplished according to the method 3200B.

In some instances, the microgrid 100 may reconnect to the utility source 105 according to the method 3200B. In other instances, the microgrid 100 may reconnect to the utility source 105 based on an example method 3400 described by a flowchart illustrated by FIG. 32. The method 3400 includes controlling the first battery 150 and/or the second battery 155 to reenergize to feed a medium-voltage loop of the microgrid 100 (BLOCK 3405). The method 3400 also includes determining whether the relay 220a of the first switchgear 115 is functional (BLOCK 3410). The method 3400 also includes biasing a frequency of the first battery 150 and/or the second battery 155 such that the frequency is faster than a frequency of the utility source 105 (BLOCK 3415). The method 3400 also includes sending an instruction to the relay 220a to prepare to close the first switchgear 115 (BLOCK 3420). The method 3400 also includes monitoring a voltage and the frequency of the utility source 105 via the relay 220a (BLOCK 3425). The method 3400 also includes determining whether the voltage and the frequency of the utility source 105 are within a predetermined threshold (BLOCK 3430). If not, the method 3400 returns to block 3425. Otherwise, the method 3400 includes closing the first switchgear 115 (BLOCK 3435). The method 3400 also includes transitioning at least one inverter 1215 of the first battery 150 or the second battery 155 to a grid-following mode (BLOCK 3440). The method 3400 also includes connecting a load on the microgrid 100 to the utility source 105 (BLOCK 3445).

Figure 33:
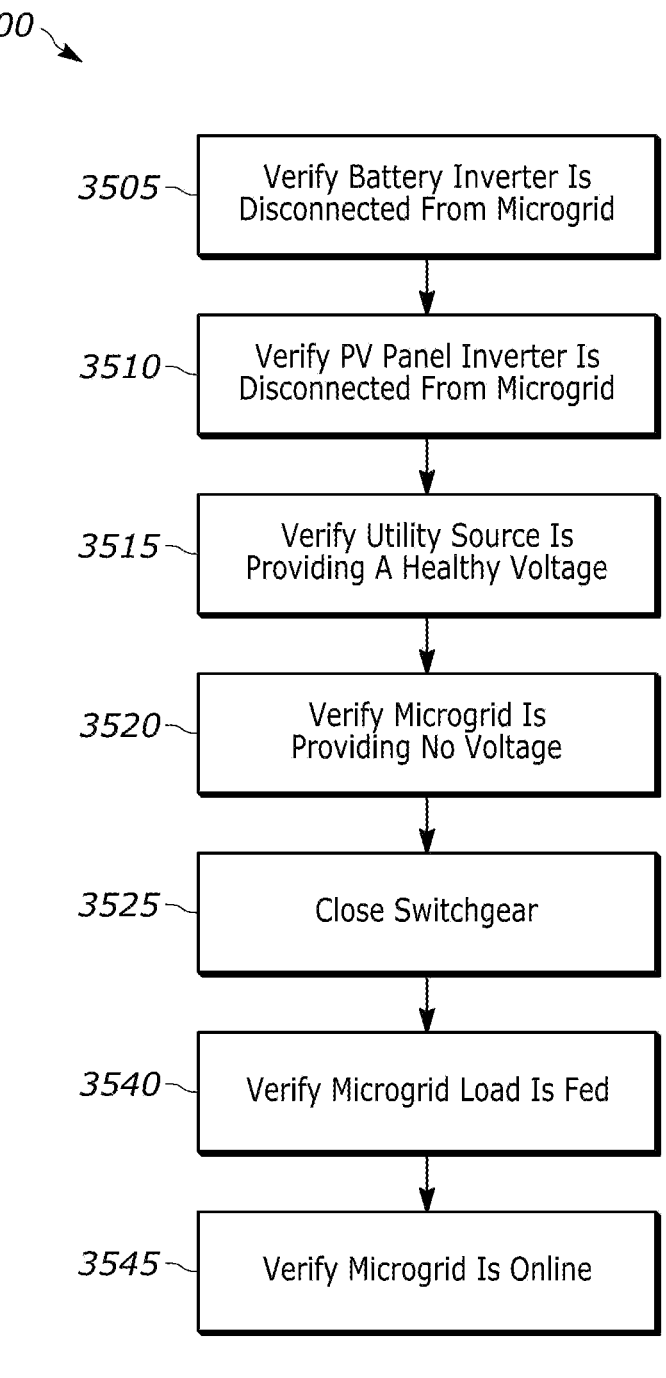
FIG. 33 is a flowchart illustrating a method of controlling a microgrid to reconnect to an external utility source, according to some aspects.

In yet other instances, the microgrid 100 may reconnect to the utility source 105 based on an example method 3500 described by a flowchart illustrated by FIG. 33. The method 3500 includes verifying that each inverter 1215 of the first battery 150 and the second battery 155 are disconnected from the microgrid 100 (BLOCK 3505). The method 3500 also includes verifying that each inverter of the PV array 170 are disconnected from the microgrid 100 (BLOCK 3510). The method 3500 also includes verifying that the utility source 105 is providing a healthy voltage (BLOCK 3515). The method 3500 also includes verifying that the microgrid 100 is providing no voltage (BLOCK 3520). The method 3500 also includes closing the first switchgear 115 (BLOCK 3525). The method 3500 also includes verifying that the first load 140 and the second load 165 are fed (BLOCK 3540). The method 3500 also includes verifying that the microgrid 100 is online (BLOCK 3545).

Figure 34:
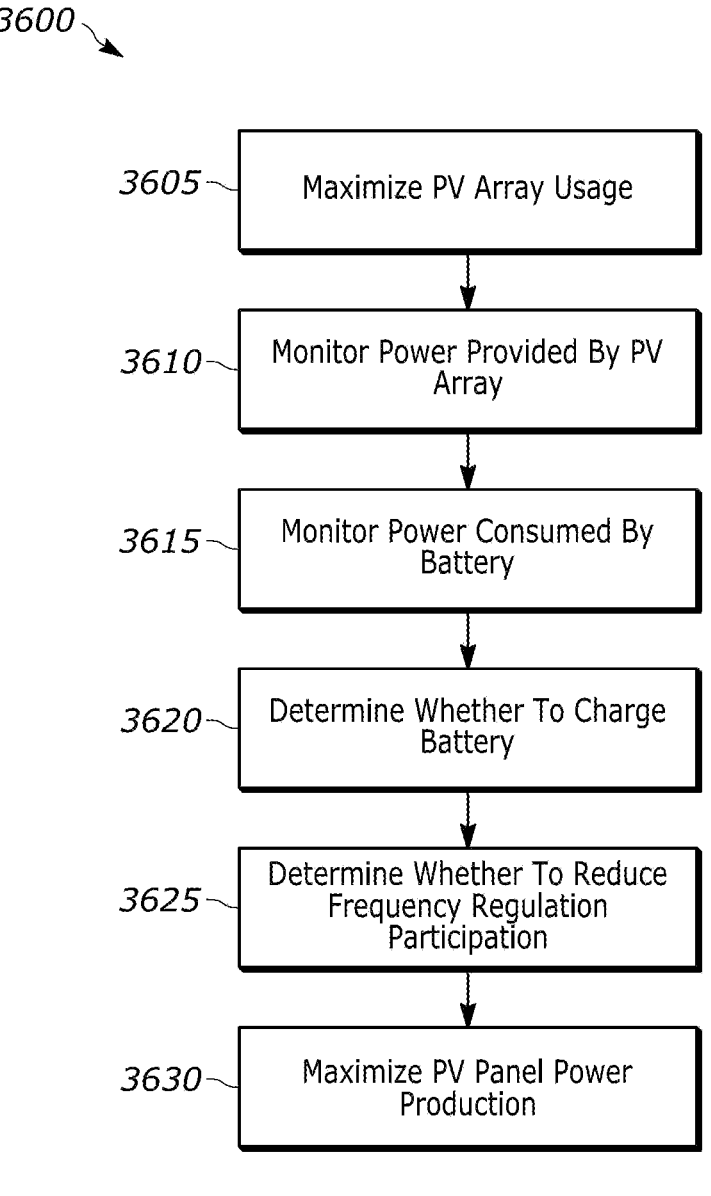
FIG. 34 is a flowchart illustrating a method of controlling a microgrid to maximize utilization of a PV array, according to some aspects.

In any operating mode, it is useful to ensure that the power produced by the PV array 170 is maximized. FIG. 34 is a flowchart illustrating an example method 3600 of maximizing utilization of the PV array 170. The method 3600 includes maximizing PV array 170 usage (BLOCK 3605). The method 3600 also includes monitoring a total supply power provided the PV array 170 (BLOCK 3610) and monitoring a total load power consumed by the first battery 150 and the second battery 155 (BLOCK 3615). The total supply power is a total power generated by the PV array 170 over the course of a year, and the total load power is a total power consumed by the first battery 150 and the second battery 155 over the course of the year. The method 3600 also includes determining whether to charge the first battery 150 and the second battery 155 only while PV array 170 is generating power and only to a predetermined SOC (BLOCK 3620). The method 3600 also includes determining whether to reduce frequency regulation participation to reduce a predicted total load power consumed by the first battery 150 and the second battery 155 for the following year (BLOCK 3625). The method 3600 also includes maximizing a production level of the PV array 170 (BLOCK 3630).

Figure 35:
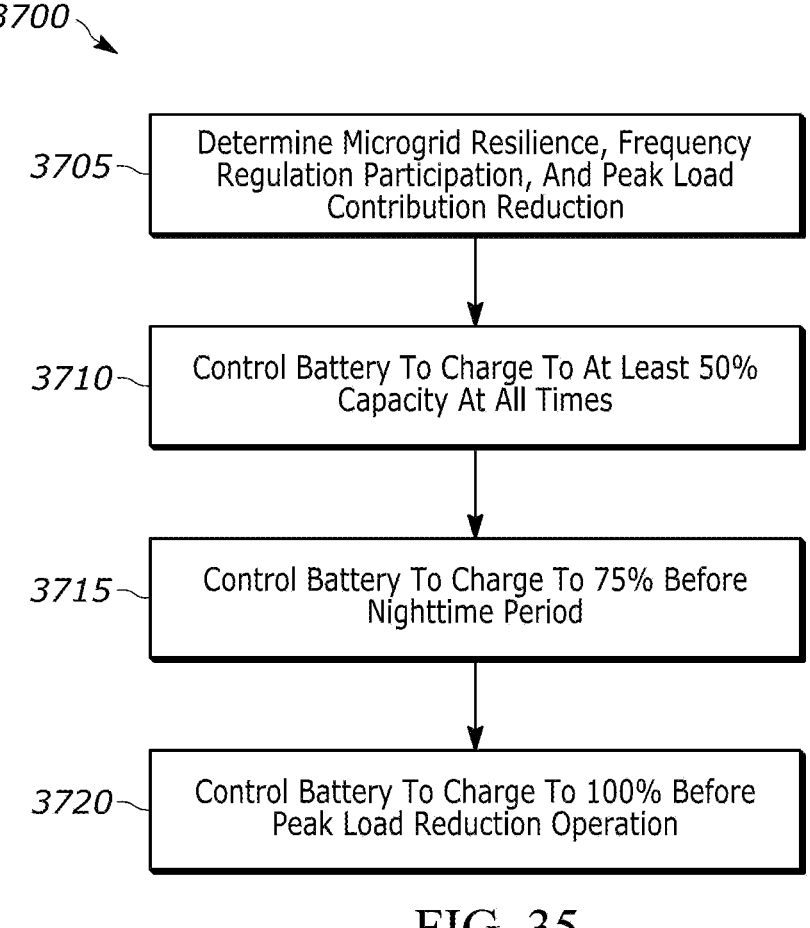
FIG. 35 is a flowchart illustrating a method of controlling a state of charge of a battery of a microgrid, according to some aspects.

In any instance, the target SOC of the first battery 150 and the second battery 155 may be determined by several factors. FIG. 35 is a flowchart illustrating an example method 3700 of controlling the SOC of the first battery 150 and the second battery 155. The method 3700 includes determining, with an SOC management controller, a microgrid resilience, a frequency regulation participation, and a peak load contribution reduction (BLOCK 3705). The SOC management controller may be a component of the microgrid controller 112. The method 3700 also includes controlling, via the SOC management controller, the first battery 150 and the second battery 155 to charge to at least 50% capacity at all times (BLOCK 3710). The method 3700 also includes controlling, via the SOC management controller, the first battery 150 and the second battery 155 to charge to at least 75% before the beginning of a nighttime period (BLOCK 3715). The method 3700 may only include block 3715 when the frequency regulation participation is limited to 800 kW. The method 3700 also includes controlling, via the SOC management controller, the first battery 150 and the second battery 155 to charge to at least 100% in preparation for a max load reduction operation (for example, the method 3000 or the method 3100) (BLOCK 3720).

Figure 36:
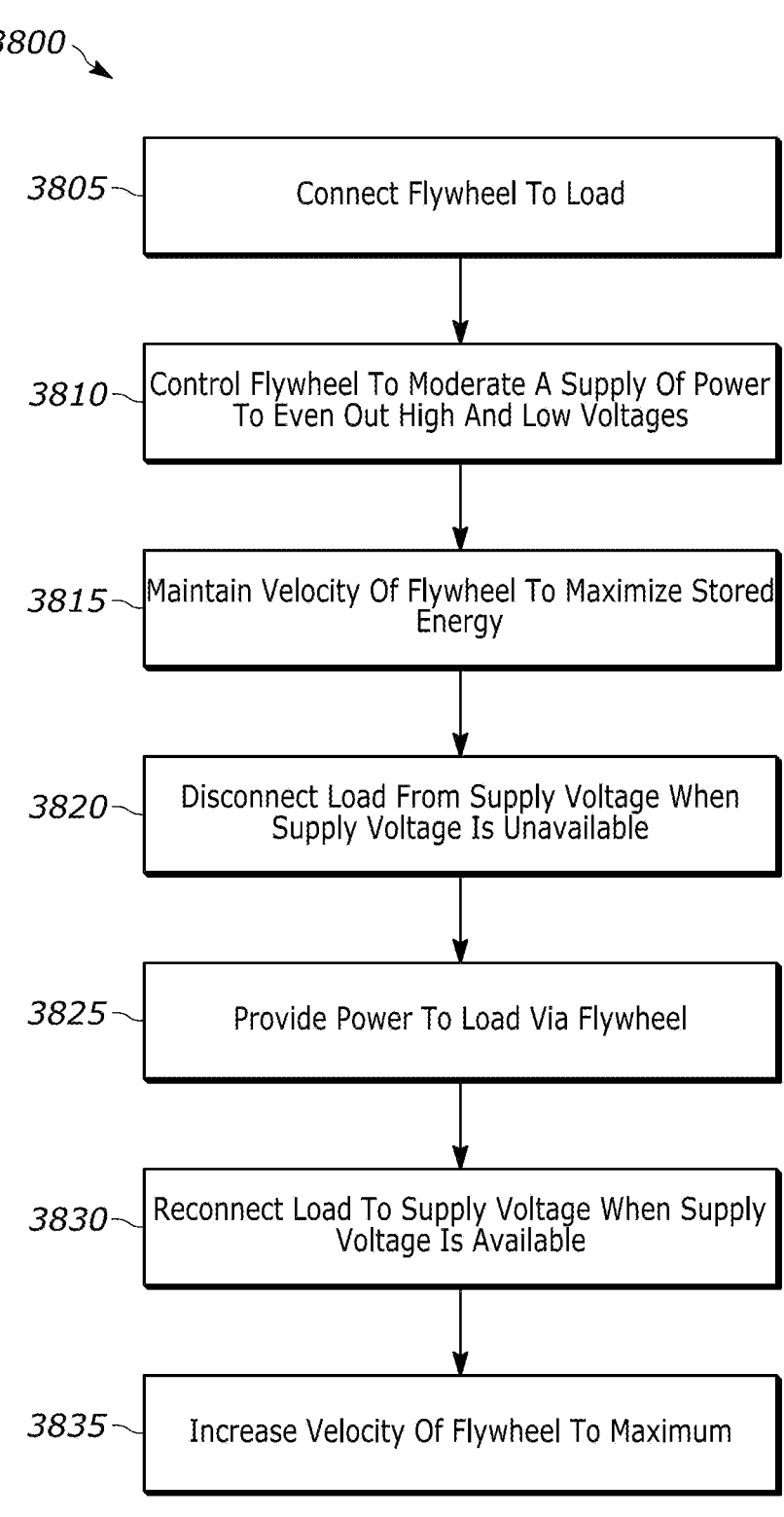
FIG. 36 is a flowchart illustrating a method of maximizing an uptime of a load of a microgrid, according to some aspects.

Implementing the microgrid 100 allows the owner of the microgrid 100 to ensure that an uptime of a load of the microgrid 100 is maximized. FIG. 36 is a flowchart illustrating an example method 3800 of maximizing the uptime of a load of the microgrid 100, such as the first load 140 or the second load 165. The method 3800 includes connecting the flywheel 135 to the load (BLOCK 3805). The flywheel 135 may be configured to provide 1300 kW for sixty seconds. In response to determining that the microgrid 100 is operating under normal conditions (such as by method 2600) the method 3800 includes moderating, via the flywheel 135, a supply power to even out high and low voltages of the power from the utility source 105 (BLOCK 3810) and maintaining a velocity of a spinning mass of the flywheel 135 to maximize an energy stored in the flywheel 135 (BLOCK 3815). In response to determining that the utility source 105 has become unavailable, the method 3800 includes disconnecting, with a breaker of the flywheel 135, the load from the utility source 105 (BLOCK 3820). The method also includes providing power to the load via the flywheel 135 (BLOCK 3825). In response to determining that the supply power has become available, the method 3800 includes synchronizing the flywheel 135 to the utility source 105 and reconnecting, via the breaker of the flywheel 135, the load to the utility source 105 (BLOCK 3830). The method 3800 then includes increasing the velocity of the spinning mass of the flywheel 135 to a maximum speed (BLOCK 3835.

As previously noted, the microgrid 100 may be configured to operate with a frequency regulation participation (that is, selling power produced by the PV array 170 to the owner of the utility source 105). FIG. 37 is a flowchart illustrating an example method 3900 of scheduling a dispatch of a frequency response period. The method 3900 includes reserving, via the frequency regulation module 312, a dispatch period (BLOCK 3905). The method 3900 also includes controlling the SOC of the first battery 150 and/or the second battery 155 to prepare for the dispatch period (BLOCK 3910). The method 3900 also includes dispatching, via the prediction module 310 during the dispatch period, the first battery 150 and/or the second battery 155 to follow market signals.

FIG. 38 is a flowchart illustrating a method 4000 of curtailing a distributed energy resource (DER) in a microgrid, such as the microgrid 100. In the example shown, the method 4000 includes receiving a command to curtail DER (BLOCK 4005). The method 4000 also includes establishing a mirrored bit connection to a utility source, such as the utility source 105 (BLOCK 4010). In some instances, the mirrored bit connection is made with a line recloser and a tie recloser of the utility source 105. The method 4000 also includes receiving a status and trip command from the utility source (BLOCK 4015). The method 4000 also includes disconnecting the DER in response to receiving a signal from the utility source (BLOCK 4020). The signal may be one selected from a group consisting of a DER trip command from the line recloser, an indication that the line recloser is not three-phase closed, an indication that the tie recloser has at least one phase closed, and an indication that the first switchgear is closed. The method 4000 also includes reducing a line recloser trip timer to three seconds and a tie recloser close timer to five seconds (BLOCK 4025). The method 4000 also includes reducing the tie recloser close timer in response to receiving a signal from the line recloser (BLOCK 4030). The method 4000 also includes closing the tie recloser in response to receiving a confirmation from the microgrid 100 (BLOCK 4035).

Various features and advantages of the embodiments and aspects described herein are set forth in the following claims.

What is claimed is:

1. A microgrid comprising:
a microgrid controller;
a primary junction;
a high-voltage supply line;
a high-voltage output line;
one or more switchgear connecting the primary junction to at least one other component of the microgrid, wherein the one or more switchgear includes a first switchgear, a second switchgear, and a third switchgear, and wherein the primary junction includes a first conductor connecting the first switchgear to the second switchgear, a second conductor connecting the first switchgear to the third switchgear, and a third conductor connecting the second switchgear to the third switchgear;
a plurality of photovoltaic (PV) panels, wherein each of the plurality of PV panels is connected to one of a plurality of PV panel inverters;
a breaker connected to the plurality of PV panel inverters;
a first load connected to the breaker;
one or more battery banks, each comprising a plurality of battery cells; and
a ground bank transformer configured to provide a ground current path.

2. The microgrid of claim 1, wherein the high-voltage supply line is configured to receive high-voltage power from an external power grid.

3. The microgrid of claim 1, wherein the high-voltage output line is configured to output high-voltage power generated by the microgrid to an external power grid.

4. The microgrid of claim 1, wherein the one or more switchgear includes the first switchgear connecting the primary junction to the high-voltage supply line and the high-voltage output line.

5. The microgrid of claim 4, wherein the one or more switchgear includes the second switchgear connecting the primary junction to the breaker.

6. The microgrid of claim 4, further comprising a second breaker, wherein the third switchgear connects the primary junction to the second breaker, wherein the second breaker connecting the primary junction to the breaker a flywheel configured to store electrical energy as potential energy.

7. The microgrid of claim 1, wherein the one or more battery banks includes a first battery bank and a second battery bank.

8. The microgrid of claim 7, further comprising a flywheel configured to store electrical energy as potential energy; and
a second load connected to the flywheel.

9. The microgrid of claim 8, wherein the one or more switchgear includes the third switchgear connecting the primary junction to the first battery bank, the second battery bank, and the flywheel.

10. The microgrid of claim 1, wherein each of the first switchgear, the second switchgear, and the third switchgear include a plurality of switches configured to be controlled by the microgrid controller such that the microgrid controller can selectively control the charging or discharging of one or more components of the microgrid.

11. A control system for a microgrid, the control system comprising:
a microgrid controller;
a market participation module including a prediction module and a frequency regulation module, the market participation module configured to predict, using at least one of the prediction module and the frequency regulation module, a frequency regulation participation of the microgrid and a coincidence peak load time of two or more of an external utility, an independent system operator (ISO), and a regional transmission organization;
a monitoring module;
one or more inverters for controlling one or more photovoltaic (PV) panels of the microgrid;

a generator auto transfer control;

a generator controller;

one or more flow battery controllers; and one or more switchgear configured to switchably connect one or more components of the microgrid based on signals received from the microgrid controller.

12. The control system of claim 11, wherein the market participation module is configured to predict a power production level and a power consumption level of the microgrid, wherein the market participation module predicts the coincidence peak load time based on a peak load time of the microgrid, wherein the peak load time is a time during a defined time interval where power consumption for loads of the microgrid exceeded a defined threshold.

13. The control system of claim 11, wherein the monitoring module is configured to provide a status of the external utility source and a status of the microgrid to the microgrid controller.

14. The control system of claim 11, wherein the generator controller is configured to control a generator of the microgrid based on signals received from the microgrid controller.

15. The control system of claim 14, wherein the signals include at least one selected from a group consisting of a local detection of primary voltage, a local decision, and an under-voltage timer.

16. The control system of claim 11, further comprising a flywheel controller configured to control a flywheel of the microgrid based on signals received from the microgrid controller.

17. The control system of claim 11, wherein the one or more flow battery controllers are configured to control a charge/discharge state of one or more batteries of the microgrid based on signals received from the microgrid controller.

18. The control system of claim 17, wherein the signals include a local decision.

19. The control system of claim 18, wherein the one or more switchgear includes a first switchgear, a second switchgear, and a third switchgear, wherein a first conductor connects the first switchgear to the second switchgear, a second conductor connects the first switchgear to the third switchgear, and a third conductor connecting the second switchgear to the third switchgear, wherein the first switchgear configured to switchably connect the microgrid to an external utility source based on signals received from the microgrid controller;

the second switchgear configured to switchably connect the microgrid to the one or more PV panels based on signals received from the microgrid controller; and the third switchgear configured to switchably connect the microgrid to one or more batteries and a flywheel based on signals received from the microgrid controller.

\* \* \* \* \*